US008423485B2

(12) United States Patent
Harada et al.

(10) Patent No.: US 8,423,485 B2
(45) Date of Patent: Apr. 16, 2013

(54) CORRESPONDENCE LEARNING APPARATUS AND METHOD AND CORRESPONDENCE LEARNING PROGRAM, ANNOTATION APPARATUS AND METHOD AND ANNOTATION PROGRAM, AND RETRIEVAL APPARATUS AND METHOD AND RETRIEVAL PROGRAM

(75) Inventors: Tatsuya Harada, Tokyo (JP); Hideki Nakayama, Tokyo (JP); Rie Matsumoto, Tokyo (JP); Yasuo Kuniyoshi, Tokyo (JP); Nobuyuki Otsu, Tsukuba (JP)

(73) Assignees: The University of Tokyo, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 559 days.

(21) Appl. No.: 12/733,561

(22) PCT Filed: Sep. 12, 2008

(86) PCT No.: PCT/JP2008/066597
§ 371 (c)(1),
(2), (4) Date: Jun. 21, 2010

(87) PCT Pub. No.: WO2009/035108
PCT Pub. Date: Mar. 19, 2009

(65) Prior Publication Data
US 2011/0010319 A1 Jan. 13, 2011

(30) Foreign Application Priority Data
Sep. 14, 2007 (JP) ................................. 2007-240272

(51) Int. Cl.
*G06F 15/18* (2006.01)

(52) U.S. Cl.
USPC .......................................................... 706/12

(58) Field of Classification Search ................ 706/12
See application file for complete search history.

(56) References Cited

U.S. PATENT DOCUMENTS

| 6,070,161 | A | 5/2000 | Higashio | |
|---|---|---|---|---|
| 7,120,626 | B2* | 10/2006 | Li et al. | 1/1 |
| 7,343,296 | B2* | 3/2008 | Peyton | 705/1.1 |
| 7,536,371 | B2* | 5/2009 | Hartman et al. | 706/47 |
| 7,617,168 | B2* | 11/2009 | Cho et al. | 706/45 |

(Continued)

FOREIGN PATENT DOCUMENTS

| JP | A-11-213131 | 8/1999 |
|---|---|---|
| WO | WO 2004/095374 A1 | 11/2004 |

OTHER PUBLICATIONS

Kurita et al., "Sense Retrieval on a Image Database of Full Color Paintings," Transactions of Information Processing Society of Japan, 1992. vol. 33, No. 11, pp. 1373-1383.

(Continued)

*Primary Examiner* — Michael B Holmes
(74) *Attorney, Agent, or Firm* — Oliff & Berridge, PLC

(57) ABSTRACT

An image data processing system has a learning storage apparatus that stores projection matrixes obtained by canonical correlation analysis so as to derive, based on at least one of an image feature and a word feature, a latent variable as an abstract concept used for associating an image with a word corresponding thereto and that further stores information required for obtaining the latent variable acquired by use of the projection matrixes, a probability of occurrence of an arbitrary image feature from a certain latent variable and a probability of occurrence of an arbitrary word feature from a certain latent variable. In this way, a probability of the image feature and word feature being simultaneously outputted can be easily and quickly determined, thereby executing a high-speed annotation or retrieval with high precision.

38 Claims, 21 Drawing Sheets

U.S. PATENT DOCUMENTS 7,805,394 B2 * 9/2010 Hartman et al. .............. 706/48
2006/0195858 A1 8/2006 Takahashi et al.

OTHER PUBLICATIONS

Hardoon et al., "A Correlation Approach for Automatic Image Annotation," Lecture Notes in Computer Science, 2006, LNA14093, pp. 681-692.

International Search Report issued in International Application No. PCT/JP2008/066597 on Oct. 14, 2008 (with English-language translation).

International Preliminary Report on Patentability issued in International Application No. PCT/JP2008/066597 on Apr. 7, 2010 (with English-language translation).

* cited by examiner

| | | | | |
|---|---|---|---|---|
| zero-order | <br>No.1 | | | |
| 1st-order | <br>No.2 | <br>No.3 | <br>No.4 | <br>No.5 |
| 2nd-order | <br>No.6 | <br>No.7 | <br>No.8 | <br>No.9 |
| | <br>No.10 | <br>No.11 | <br>No.12 | <br>No.13 |
| | <br>No.14 | <br>No.15 | <br>No.16 | <br>No.17 |
| | <br>No.18 | <br>No.19 | <br>No.20 | <br>No.21 |
| | <br>No.22 | <br>No.23 | <br>No.24 | <br>No.25 |

FIG. 11

|  | CRM | MBRM | SML | Proposed (1st order) | Proposed (2nd order) |
|---|---|---|---|---|---|
| words with recall > 0 | 119 | 122 | 137 | 130 | 141 |
| Result on best 49 words ||||||
| Mean per word recall | 0.75 | 0.78 | -- | 0.89 | 0.91 |
| Mean per word precision | 0.72 | 0.74 | -- | 0.85 | 0.89 |
| Result on best 260 words ||||||
| Mean per word recall | 0.23 | 0.25 | 0.3 | 0.3 | 0.33 |
| Mean per word precision | 0.22 | 0.24 | 0.27 | 0.27 | 0.3 |
| Mean F-value | 0.22 | 0.24 | 0.28 | 0.28 | 0.31 |

CORRESPONDENCE LEARNING APPARATUS AND METHOD AND CORRESPONDENCE LEARNING PROGRAM, ANNOTATION APPARATUS AND METHOD AND ANNOTATION PROGRAM, AND RETRIEVAL APPARATUS AND METHOD AND RETRIEVAL PROGRAM

TECHNICAL FIELD

The present invention relates to correspondence learning apparatus and method and correspondence learning program for learning a correspondence between real-world information and symbols corresponding to the real-world information, annotation apparatus and method and annotation program for assigning a symbol as metadata to real-world information, and retrieval apparatus and method and retrieval program capable of retrieving real-world information to which a symbol as metadata is not assigned based on the symbol.

BACKGROUND ART

An image data, a sound data and the like indicate real-world information such as visual information and hearing information. In order to allow a retrieval of this kind of real-world information, there is a necessity to assign symbols as metadata to data indicating the real-world information. When metadata are assigned to data indicating the real-world information, a reference of metadata allows a retrieval of a desired image data from many image data and the like with an entry of symbols such as words indicating objects in the image. However, producers of the image data or sound data do not always perform an annotation to assign the metadata to the image data and the like. Therefore, there are proposed techniques for assigning the symbol as the metadata to the data indicating the real-world information. One example of the techniques is a video annotation giving device that automatically assigns the metadata to the video data (for example, refer to Patent Document 1). The video annotation giving device stores visual feature information as information on a visual feature of an object digitalized, and addition information as information added to the object and correlated with the visual feature information in advance. When the video data is inputted to the apparatus, partial video data which is video data of a part of video region is extracted from the video data and visual feature information on the extracted partial video data is created. The visual feature information on the partial video data is compared to the visual feature information on the object stored. Then, the object contained in the video data is identified and the identified object is correlated with the stored additional information based on a similarity between the partial video data and the object obtained by the comparison. Further, there is a known technique that allows a labeling of paintings and a retrieval of an image from sense using a higher-order local auto-correlation feature (HLAC) and a canonical correlation analysis (for example, refer to Non-Patent Document 1).

[Patent Document 1] WO 2004/095374 pamphlet
[Non-Patent Document 1] KURITA TAKIO, KATO TOSHIKAZU, FUKUDA IKUMI, SAKAKURA AYUMI "Sense Retrieval on a Image Database of Full Color Paintings" Transactions of Information Processing Society of Japan Vol. 33, NO. 11, p. 1373-1383 (1992)

DISCLOSURE OF THE INVENTION

When using the technique (segmentation) that extracts partial video data which is video data of a part of video region is extracted from the video data as the above conventional video annotation giving device, an accuracy and a processing speed of the annotation have a dependence on an extracting accuracy of the partial video data and a speed required for extracting the partial video data. However, it is not easy to accurately extract the partial video data from the video data and the extracting process requires enormous amounts of calculation time. Therefore, it is difficult to perform a high-speed and high-accuracy annotation and a high-speed and high-accuracy retrieval by using the conventional video annotation giving device. The conventional technique using the higher-order local auto-correlation feature and the principal component analysis allows a high-speed process, but the technique only performs a maximum likelihood estimation based on a simple probability density distribution between the image and the sense. Accordingly, it is difficult to perform a high-speed and high-accuracy annotation and a high-speed and high-accuracy retrieval by using the technique.

The present invention has a main object to provide techniques allows a high-speed and high-accuracy annotation and a high-speed and high-accuracy retrieval.

The present invention accomplishes the above main object by the following configurations.

A correspondence learning apparatus according to the invention is a correspondence learning apparatus that learns a correspondence between real-world information and symbols corresponding to the real-world information. The apparatus includes: a first feature storage that stores a plurality of first features respectively extracted from first data as a feature of the first data that indicates the real-world information; a second feature storage that stores a plurality of second features respectively extracted from second data as a feature of the second data that corresponds to the first data and indicates at least one symbol corresponding to the real-world information; a canonical correlation analysis module that performs a canonical correlation analysis based on a plurality of combinations of the first and second features so as to obtain a transformation to derive latent variables based on at least one of the first and second features, the latent variables respectively indicating an abstract concept that connects the real-world information with the symbol corresponding to the real-world information; an analysis result storage that stores the transformation obtained by the canonical correlation analysis module and the latent variables obtained using the transformation for each of the combinations of the first and second features; an information deriving module that derives information required to obtain a probability of occurrence of an arbitrary first feature from the latent variable and a probability of occurrence of an arbitrary second feature from the latent variable for each of the latent variables; and an information storage that stores information derived by the information deriving module.

The correspondence learning apparatus treats the correspondence between the real-world information and the symbols as a problem of a probability of simultaneous occurrence of a certain real-world information and a certain symbol in order to perform a high-speed and high-accuracy annotation that assigns symbols corresponding to the real-world information, that is, words corresponding to indications of the real-world information to the real-world information such as an image data and a sound data, and a high-speed and high-accuracy retrieval that retrieving real-world information to which a symbol as metadata is not assigned based on the symbol. By treating the correspondence between the real-world information and the symbols as the problem of the probability and obtaining the probability of simultaneous occurrence of the certain real-world information and the certain symbol, it is possible to assign the symbol to the real-world information in decreasing order of the probability and retrieve an image corresponding to a desired symbol in decreasing order of the probability. Here, x represents the first feature extracted from the first data as the feature of the first data that indicates the real-world information, y represents the second feature extracted from the second data as the feature of the second data that corresponds to the first data and indicates at least one symbol corresponding to the real-world information such as words indicating objects in the image, and P(x,y) represents a probability of simultaneous occurrence of the first feature x and the second feature y. In this case, the probability P(x,y) can be used as the probability of simultaneous occurrence of the certain real-world information and the certain symbol.

Further, the correspondence learning apparatus introduces the abstract concept that connects the real-world information with the symbol corresponding to the real-world information on the first and second features instead of finding a direct connection between the first feature (real-world information) and the second feature (symbol). The abstract concept is obtained as the latent variables based on the transformations obtained by the canonical correlation analysis as transformations that project the first and second feature (two variates) that are not closely associated with each other on variates different from each other on a common space (canonical space) and maximize a correlation between the variates, and at least one of the first and second features. The probability of simultaneous occurrence of the real-world information and the symbol can be expressed as following equation (0) where L represents the abstract concept. In the equation (0), P(x|L) represents a probability of occurrence of the first feature x from the abstract concept L, P(y|L) represents a probability of occurrence of the second feature y from the abstract concept L, and P(L) represents a probability of occurrence of the abstract concept L itself. Assuming all occurrence probabilities of the abstract concepts L are identical to each other, the probability P(L) can be regarded as a constant. Thus, the probability P(x,y) of simultaneous occurrence of the certain first feature x and the certain second feature y can be easily obtained by finding the probability of occurrence of the arbitrary first feature from the latent variable as the abstract concept and the probability of occurrence of the arbitrary second feature from the latent variable.

$$P(x,y)=\int P(x|y,L)P(y|L)P(L)dL=\int P(x|L)P(y|L)P(L)dL \quad (0)$$

Accordingly, the correspondence learning apparatus performs the canonical correlation analysis based on the plurality of combinations of the first and second features so as to obtain the transformation to derive latent variables respectively indicating an abstract concept that connects the real-world information with the symbol corresponding to the real-world information based on at least one of the first and second features, obtains the latent variables using the transformation for each of the combinations of the first and second features, and derives information required to obtain the probability of occurrence of the arbitrary first feature from the latent variable and the probability of occurrence of the arbitrary second feature from the latent variable for each of the latent variables. Thus, the apparatus easily and speedily obtains the probability P(x, y) of simultaneous occurrence of the first feature x and the second feature y, that is, a probability of simultaneous occurrence of the certain real-world information and the certain symbol. Thus, by learning the correspondence between the real-world information and the symbols using the correspondence learning apparatus, it is possible to perform the high-speed and high-accuracy annotation that, for example, assigns the symbol to the real-world information in decreasing order of the probability, and the high-speed and high-accuracy retrieval that, for example, retrieves the real-world information corresponding to the desired symbol in decreasing order of the probability.

The canonical correlation analysis module may obtain first and second transformations that maximize a correlation between first variates and second variates by the canonical correlation analysis, where the first variate represents a variate obtained by projecting the first feature on a canonical space, the first transformation represents a transformation to obtain the first variate from the first feature, the second variate represents a variate obtained by projecting the second feature on the canonical space, the second transformation represents a transformation to obtain the second variate from the second feature. The analysis result storage may store the obtained first and second transformations, and the first or second variates as the latent variables obtained by projecting the first or second features on the canonical space. Thus, it is possible to obtain and store the latent variables as the abstract concept that connects the real-world information with the symbol corresponding to the real-world information.

In this case, the canonical correlation analysis module may assume that the first transformation satisfies a following equation (1) and the second transformation satisfies a following equation (2) and solves an eigenvalue problem of a following equation (3) to obtain a projection matrix A in the equation (1) as the first transformation and to obtain a projection matrix B in the equation (2) as the second transformation, where $x_i$ (i=1, . . . , n, the same shall apply hereinafter) represents the first feature, $y_i$ represents the second feature, $s_i$ represents the first variate, and $t_i$ represents the second variate. In the equation (3), $\Lambda^2$ represents a diagonal matrix having diagonal elements equal to eigenvalues, I represents a unit matrix, and covariance matrices $C_{xx}$, $C_{yy}$, $C_{xy}$ and $C_{yx}$ are given in a following equation (4). Thus, the transformations to derive the latent variables can be easily and speedily obtained based on at least one of the first and second features.

$$s_i = A^T(x_i - m_x) = A^T \tilde{x}_i \left( \text{where } m_x = 1/n \sum_{i=1}^{n} x_i \right) \quad (1)$$

$$t_i = B^T(y_i - m_y) = B^T \tilde{y}_i \left( \text{where } m_y = 1/n \sum_{i=1}^{n} y_i \right) \quad (2)$$

$$\left. \begin{array}{l} C_{xy} C_{yy}^{-1} C_{yx} A = C_{xx} A \Lambda^2 \quad (A^T C_{xx} A = I) \\ C_{yx} C_{xx}^{-1} C_{xy} B = C_{yy} B \Lambda^2 \quad (B^T C_{yy} B = I) \end{array} \right\} \quad (3)$$

$$\left. \begin{array}{l} C_{xx} = \frac{1}{n} \sum_{i=1}^{n} \tilde{x}_i \tilde{x}_i^T, \quad C_{yy} = \frac{1}{n} \sum_{i=1}^{n} \tilde{y}_i \tilde{y}_i^T \\ C_{xy} = \frac{1}{n} \sum_{i=1}^{n} \tilde{x}_i \tilde{y}_i^T, \quad C_{yx} = \frac{1}{n} \sum_{i=1}^{n} \tilde{y}_i \tilde{x}_i^T \end{array} \right\} \quad (4)$$

The canonical correlation analysis module may obtain first and second transformations that maximize a correlation between first variates and second variates by the canonical correlation analysis and a center of a normal distribution defined by one combination of the first and second feature in the canonical space, where the first variate represents a variate obtained by projecting the first feature on a canonical space, the first transformation represents a transformation to obtain the first variate from the first feature, the second variate represents a variate obtained by projecting the second feature on the canonical space, the second transformation represents a transformation to obtain the second variate from the second feature. The analysis result storage may store the obtained first and second transformation, and the center of the normal distribution obtained for each of the combinations of the first and second features. In a probabilistic canonical correlation analysis framework, one combination of the first and second features forms a normal distribution having a certain center and a certain variance on the canonical space. Instead of using at least one of the first and second features as the latent variable, the center of the normal distribution obtained for each of the combinations of the first and second features can be used as the latent variable, thereby optimizing the abstract concept that connects the real-world information with the symbol corresponding to the real-world information.

In this case, the canonical correlation analysis module may assume that the first transformation satisfies a following equation (1) and the second transformation satisfies a following equation (2), solve an eigenvalue problem of a following equation (3) to obtain a projection matrix A in the equation (1) as the first transformation and to obtain a projection matrix B in the equation (2) as the second transformation and obtain a center $z_i$ of the normal distribution for each combination of the first and second feature $x_i$ and $y_i$ in accordance with a following equation (101), where $x_i$ represents the first feature, $y_i$ represents the second feature, $s_i$ represents the first variate, $t_i$ represents the second variate, and $z_i$ represents the center of the normal distribution, $\Lambda^2$ in the equation (3) represents a diagonal matrix having diagonal elements equal to eigenvalues, I represents a unit matrix, covariance matrices $C_{xx}$, $C_{yy}$, $C_{xy}$ and $C_{yx}$ are given in a following equation (4), and $M_x$ and $M_y$ are arbitrary matrices that satisfy $M_x M_y^T = \Lambda$ and have a spectrum norm of less than value "1". Thus, it is possible to speedily obtain the transformations to derive latent variables based the first and second features and the centers of the normal distribution as the latent variables.

$$s_i = A^T(x_i - m_x) = A^T \tilde{x}_i \left( \text{where } m_x = 1/n \sum_{i=1}^{n} x_i \right) \quad (1)$$

$$t_i = B^T(y_i - m_y) = B^T \tilde{y}_i \left( \text{where } m_y = 1/n \sum_{i=1}^{n} y_i \right) \quad (2)$$

$$\left. \begin{array}{l} C_{xy} C_{yy}^{-1} C_{yx} A = C_{xx} A \Lambda^2 \quad (A^T C_{xx} A = I) \\ C_{yx} C_{xx}^{-1} C_{xy} B = C_{yy} B \Lambda^2 \quad (B^T C_{yy} B = I) \end{array} \right\} \quad (3)$$

$$\left. \begin{array}{l} C_{xx} = \frac{1}{n} \sum_{i=1}^{n} \tilde{x}_i \tilde{x}_i^T, \quad C_{yy} = \frac{1}{n} \sum_{i=1}^{n} \tilde{y}_i \tilde{y}_i^T \\ C_{xy} = \frac{1}{n} \sum_{i=1}^{n} \tilde{x}_i \tilde{y}_i^T, \quad C_{yx} = \frac{1}{n} \sum_{i=1}^{n} \tilde{y}_i \tilde{x}_i^T \end{array} \right\} \quad (4)$$

$$z_i = \begin{pmatrix} M_x \\ M_y \end{pmatrix}^T \begin{pmatrix} (I-\Lambda^2)^{-1} & -(I-\Lambda^2)^{-1}\Lambda \\ -(I-\Lambda^2)^{-1}\Lambda & (I-\Lambda^2)^{-1} \end{pmatrix} \begin{pmatrix} s_i \\ t_i \end{pmatrix} \quad (101)$$

The information deriving module may include a probability density distribution setting module that sets a probability density distribution indicating a probability of occurrence of the arbitrary first feature from the latent variable for each of the latent variables, and a symbol occurrence probability calculating module that calculates a symbol occurrence probability being probability of occurrence of the symbol from the latent variable for each of symbols different from each other among all of the second data. The information storage may store the probability density distribution and the symbol occurrence probability as the information for each of the latent variables. Thus, it is possible to easily and speedily obtain the probability of occurrence of the arbitrary first feature from the certain latent variable and the probability of occurrence of the arbitrary second feature from the certain latent variable.

The probability density distribution setting module may set a normal distribution around the latent variable. It is rational to consider that a latent variable obtained by projecting a new first feature is apt to occur from an already-calculated latent variable if the closer the new latent variable is to the already-calculated latent variable, for example. Accordingly, the normal distribution can be used as the probability density distribution, thereby optimizing the probability of occurrence of the arbitrary first feature from the latent variable so as to reflect real-world situations.

When x represents the arbitrary first feature and $s_i$ represents the latent variable, the probability density distribution setting module may set a probability density distribution $P(x|s_i)$ indicating a probability of occurrence of the arbitrary first feature x from the latent variable $s_i$ in accordance with a following equation (5), where, in the equation (5), p represents an order of the first feature x, $W_x = C_{xx} A$, and $\xi_x = C_{xx} - W_x W_x^T$.

$$P(x|s_i) = \frac{1}{\left(\sqrt{2\pi}\right)^p \sqrt{|\xi_x|}} \exp\left( -\frac{1}{2}(x - W_x s_i - \bar{x})^T \xi_x^{-1} (x - W_x s_i - \bar{x}) \right) \quad (5)$$

When x represents the arbitrary first feature, $s_i$ represents the latent variable, and s represents a variate obtained by projecting the arbitrary first feature on the canonical space, the probability density distribution setting module may set a probability density distribution $P(x|s_i)$ indicating a probability of occurrence of the arbitrary first feature from the latent variable $s_i$ in accordance with a following equation (6), where, in the equation (6), m represents an order of the canonical space (order of s and $s_i$) and $\Sigma$ represents a variance.

$$P(x|s_i) = \frac{1}{\left(\sqrt{2\pi}\right)^m \sqrt{|\Sigma|}} \exp\left( -\frac{1}{2}(s - s_i)^T \Sigma^{-1} (s - s_i) \right) \quad (6)$$

When the center of the normal distribution obtained for each of the combinations of the first and second features is used as the latent variable, x represents an arbitrary first feature, y represents an arbitrary second feature, $z_i$ represents the latent variable, and $\Phi_{xy}$ represents a variance of the normal distribution defined one combination of the first and second feature in the canonical space, the information deriving module may include a probability density distribution setting module that obtains the variance $\Phi_{xy}$ in accordance with a following equation (102) and sets a probability density distribution $P(x|z_i)$ indicating a probability of occurrence of the arbitrary first feature x from the latent variable $z_i$ for each latent variable $z_i$, and a symbol occurrence probability calculating module that calculates a symbol occurrence probability being a probability of occurrence of the symbol from the latent variable $z_i$ for each of symbols different from each other among all of the second data in accordance with a following equation (103), where, in the equation (103), K represents a normalization constant to normalize a sum of the probabilities, $\Phi x$ represents a variance of a normal distribution defined by the arbitrary first feature x in the canonical space and is given in a following equation (104), zc represents a center of the normal distribution and is given in a following equation (104). The information storage may store the probability density distribution $P(x|z_i)$ and the symbol occurrence probability as the information for each latent variable $z_i$. Thus, it is possible to optimize the probability of occurrence of the arbitrary first feature from the latent variable when the center of the normal distribution obtained for each of the combinations of the first and second features is used as the latent variable.

$$\Phi_{xy} = I - \begin{pmatrix} M_x \\ M_y \end{pmatrix}^T \begin{pmatrix} (I-\Lambda^2)^{-1} & -(I-\Lambda^2)^{-1}\Lambda \\ -(I-\Lambda^2)^{-1}\Lambda & (I-\Lambda^2)^{-1} \end{pmatrix} \begin{pmatrix} M_x \\ M_y \end{pmatrix} \quad (102)$$

$$P(x|z_i) = K \cdot \exp\left(-\frac{1}{8}(zc-z_i)^T \left(\frac{\Phi_x + \Phi_{xy}}{2}\right)^{-1}(zc-z_i)\right) \quad (103)$$

$$\left. \begin{array}{l} \Phi_x = I - M_x M_x^T \\ zc = M_x^T A^T (x - m_x) \end{array} \right\} \quad (104)$$

when w represents the second feature of the second data indicating a single symbol, and $sz_i$ represents the latent variable $s_i$ or $z_i$, the symbol occurrence probability calculating module may calculate a probability $P(w|sz_i)$ of occurrence of the second feature w from the latent variable $sz_i$ for each of symbols different from each other among all of the second data in accordance with a following equation (7) as the symbol occurrence probability, where, in the equation (7), n represent a total number of the symbols occurring in the second data, $n_w$ represents an occurrence number of the symbols corresponding to the second features in all of the second data, $n_{szi}$ represents a total number of the symbols included in the second features corresponding to the latent variables $sz_i$, $\delta_{w,szi}$ represents a variable set to value "1" when the symbol corresponding to the second feature w is included in the second feature corresponding to the latent variable $sz_i$ and set to value "0" when the symbol corresponding to the second feature w is not included in the second feature corresponding to the latent variable $sz_i$, $\mu$ represents a real number selected from value "0" to value "1". Thus, it is possible to optimally calculate the symbol occurrence probability being the probability of occurrence of the symbol from the certain latent variable.

$$P(w|sz_i) = \mu \frac{\delta_{w,szi}}{n_{szi}} + (1-\mu) \frac{n_w}{n} \quad (7)$$

When $y_i$ represents the second feature, w represents the second feature of the second data indicating a single symbol, $t_i$ represents the second variate obtained by projecting the second feature $y_i$ on the canonical space, and $sz_i$ represents the latent variable $s_i$ or $z_i$, the symbol occurrence probability calculating module may calculate a probability $P(w|sz_i)$ of a following equation (8) as the symbol occurrence probability for each of symbols different from each other among all of the second data, where, in the equation (8), q represents an order of the second feature w, $W_y = C_{yy}B$, and $\xi_y = C_{yy} - W_y W_y^T$. That is, the probability of occurrence of the arbitrary second feature from the certain latent variable may be calculated using the probability density distribution being normal distribution.

$$P(w|sz_i) = \frac{1}{(\sqrt{2\pi})^q \sqrt{|\xi_y|}} \exp\left(-\frac{1}{2}(w - W_y t_i - \bar{y})^T \xi_y^{-1}(w - W_y t_i - \bar{y})\right) \quad (8)$$

The correspondence learning apparatus may further include an information update module that updates at least the transformation to derive the latent variables when a combination of a new first feature and a new second feature corresponding to the new first feature occurs. The information update module may update the transformation based on the new first and second features. The combination of the first data indicating the real-world information and the second data corresponding to the first data, that is, the combination of the first and second features basically increases to an unlimited extent. Therefore, the correspondence learning apparatus requires an enormous amount of computational cost if calculating the information to obtain the transformations, the latent variables, and the information for obtaining the probability by the canonical correlation analysis and the like for all combinations including a combination of the new first feature and the new second feature every occurrence of the new first feature and the new second feature corresponding to the new first feature. On the other hand, in the correspondence learning apparatus including the information update module that updates at least the transformation to derive the latent variables based on the new first feature and the new second feature when the combination of the new first and second features, the computational cost can be lightened and the transformations, the latent variables, and the information for obtaining the probability can be optimally updated every occurrence of the new first and second features.

The information update module may include: a first uncorrelated component obtaining module that performs a obtainment process of a new first uncorrelated component being the first uncorrelated component for the new first feature; a second uncorrelated component obtaining module that performs a obtainment process of a new second uncorrelated component being the second uncorrelated component for the new second feature; a singular value decomposition module that performs a singular value decomposition process for covariance matrices for the first and second uncorrelated components based on the obtained new first and second uncorrelated components; and a transformation update module that updates the transformation to derive the latent variables based on a result of the obtainment processes by the first and second uncorrelated component obtaining modules and a result of the singular value decomposition process by the singular value decomposition module. The first uncorrelated component represents a component obtained by an uncorrelation of an arbitrary first feature through a principal component analysis and the second uncorrelated component represents a component obtained by an uncorrelation of an arbitrary second feature through the principal component analysis. The analysis result storage may store the updated transformation and the latent variables obtained using the updated transformation for each of the combinations of the first and second features. The information deriving module may update the information for each of the obtained latent variables.

When it is assumed that a $n^{th}$ combination of a new first feature $x(n)$ and a new second feature $y(n)$ occurs in the presence of n−1 combinations of the first features 135 $x(1), \ldots, x(i), \ldots, x(n-1)$ and the second feature $y(1), \ldots, y(i), \ldots, y(n-1)$, p represents an order of the first feature $x(i)$, q represents an order of the second feature $y(i)$, r represents a smaller one of p and q, l represents a decay rate, u(n) represents the new first uncorrelated component, and v(n) represents the new second uncorrelated component, the first uncorrelated component obtaining module may obtain a matrix $E_x(n)$ and a diagonal matrix $\Lambda_x(n)$ that are solutions of an eigenvalue problem of $C_{xx}E_x = E_x\Lambda_x$ for n first features $x(i)$ including the new first feature $x(n)$ and the new first uncorrelated component $u(n)$ respectively given in a following equation (9), where, in the equation (9), $j=1, \ldots, p$, $x_1\tilde{\ }(n) = x(n) - m_x(n)$, and $m_x(n)$ represents a mean value of n first features $x(i)$. The second uncorrelated component obtaining module may obtain a matrix $E_y(n)$ and a diagonal matrix $\Lambda_y(n)$ that are solutions of an eigenvalue problem of $C_{yy}E_y = E_y\Lambda_y$ for n second features $y(i)$ including the new second feature $y(n)$ and the new second uncorrelated component $v(n)$ respectively given in a following equation (10), where, in the equation (10), $j=1, \ldots, q$, $y_1\tilde{\ }(n) = y(n) - m_y(n)$, and $m_y(n)$ represents a mean value of n second features $y(i)$. The singular value decomposition module may obtain matrices $E_u(n)$ and $E_v(n)$ given in a following equation (11) based on the obtained new first uncorrelated component $u(n)$ and the obtained new second uncorrelated component $v(n)$, where, in the equation (11), $j=1, \ldots, r$, $Z_{uj}(n)$ represents a $j^{th}$ canonical correlation coefficient vector for the first uncorrelated component based on the n combination of the first and second uncorrelated components, and $Z_{vj}(n)$ represents a $j^{th}$ canonical correlation coefficient vector for the second uncorrelated component based on the n combination of the first and second uncorrelated components. The transformation update module may obtain a first transformation $A(n)$ to project the first feature $x(i)$ on the canonical space and a second transformation $B(n)$ to project the second feature $y(i)$ on the canonical space as new transformations based on the matrices $E_x(n)$, $E_y(n)$ and the diagonal matrices $\Lambda_x(n)$, $\Lambda_y(n)$ obtained by the first and second uncorrelated component obtaining modules and the matrices $E_u(n)$, $E_v(n)$ obtained by the singular value decomposition module in accordance with a following equation (12).

$$\left.\begin{aligned}
E_x(n) &= (e_{x1}(n), \ldots, e_{xj}(n), \ldots, e_{xp}(n)) \\
\Lambda_x(n) &= \mathrm{diag}(\lambda_{x1}(n), \ldots, \lambda_{xj}(n), \ldots, \lambda_{xp}(n)) \\
u(n) &= \Lambda_x^{-1/2}(n)E_x^T(n)\tilde{x}_1(n)
\end{aligned}\right\} \quad (9)$$

$$\left.\begin{aligned}
E_y(n) &= (e_{y1}(n), \ldots, e_{yj}(n), \ldots, e_{yq}(n)) \\
\Lambda_y(n) &= \mathrm{diag}(\lambda_{y1}(n), \ldots, \lambda_{yj}(n), \ldots, \lambda_{yq}(n)) \\
v(n) &= \Lambda_y^{-1/2}(n)E_y^T(n)\tilde{y}_1(n)
\end{aligned}\right\} \quad (10)$$

$$\left.\begin{aligned}
E_u(n) &= (e_{u1}(n), \ldots, e_{uj}(n), \ldots, e_{ur}(n)) \\
E_v(n) &= (e_{v1}(n), \ldots, e_{vj}(n), \ldots, e_{vr}(n)) \\
e_{uj}(n) &= \frac{z_{uj}(n)}{\|z_{uj}(n)\|} \\
e_{vj}(i) &= \frac{z_{vj}(n)}{\|z_{vj}(n)\|}
\end{aligned}\right\} \quad (11)$$

$$\left.\begin{aligned}
A(n) &= E_x(n)\Lambda_x^{-1/2}(n)E_u(n) \\
B(n) &= E_y(n)\Lambda_y^{-1/2}(n)E_v(n)
\end{aligned}\right\} \quad (12)$$

The correspondence learning apparatus may further include a information update module that updates the covariance matrices $C_{xx}$, $C_{yy}$, $C_{xy}$ and $C_{yx}$ in accordance with a following equation (105) and solves the eigenvalue problem of the equation (3) to obtain the transformation to derive the latent variables when a $n^{th}$ combination of a new first feature $x(n)$ and a new second feature $y(n)$ occurs in the presence of $n-1$ combinations of the first features $x(1), \ldots, x(i), \ldots, x(n-1)$ and the second feature $y(1), \ldots, y(i), \ldots, y(n-1)$, where $n >= 2$, $l$ represents a decay rate, $\tilde{x}(n)$ and $\tilde{y}(n)$ are given in a following equation (106), and $m_x(n)$ and $m_y(n)$ are given in a following equation (107). Only the covariance matrices can be sequentially updated every occurrence of the new first and second features, thereby lightening the computational cost and optimally updating the transformations, the latent variables, and the information for obtaining the probability.

$$\left.\begin{aligned}
C_{xx}(n) &= \frac{n-1-l}{n}C_{xx}(n-1) + \frac{1+l}{n}\tilde{x}(n)\tilde{x}^T(n) \\
C_{yy}(n) &= \frac{n-1-l}{n}C_{yy}(n-1) + \frac{1+l}{n}\tilde{y}(n)\tilde{y}^T(n) \\
C_{xy}(n) &= \frac{n-1-l}{n}C_{xy}(n-1) + \frac{1+l}{n}\tilde{x}(n)\tilde{y}^T(n) \\
C_{yx}(n) &= C_{xy}^T(n)
\end{aligned}\right\} \quad (105)$$

$$\left.\begin{aligned}
\tilde{x}(n) &= x(n) - m_x(n) \\
\tilde{y}(n) &= y(n) - m_y(n)
\end{aligned}\right\} \quad (106)$$

$$\left.\begin{aligned}
m_x(n) &= \frac{n-1-l}{n}m_x(n-1) + \frac{1+l}{n}x(n) \\
m_y(n) &= \frac{n-1-l}{n}m_y(n-1) + \frac{1+l}{n}y(n)
\end{aligned}\right\} \quad (107)$$

In this case, the information update module updates the covariance matrices associated with the second feature in accordance with a following equation (108) when, the order of the second feature increases with an occurrence of the new first feature $x(n)$ and the new second feature $y(n)$, where $m_y(n)$ is given in a following equation (109). By sequentially updating only the covariance matrices and updating the transformation to derive latent variables and the like, it is possible to deal with an increase of the order of the second feature with the occurrence of the new first and second features. Typically, the order of the first feature may not increase with the occurrence of the new first and second features. Needless to say, it is also possible to deal with the increase of the order of the first feature as in the case with the second feature.

$$\left.\begin{aligned}
C_{yy}(n) &= \frac{n-1-l}{n}\begin{pmatrix} C_{yy}(n-1) & 0 \\ 0 & 0 \end{pmatrix} + \frac{1+l}{n}\tilde{y}(n)\tilde{y}^T(n) \\
C_{xy}(n) &= \frac{n-1-l}{n}( C_{xy}(n-1) \;\; 0 ) + \frac{1+l}{n}\tilde{x}(n)\tilde{y}^T(n)
\end{aligned}\right\} \quad (108)$$

$$m_y(n) = \frac{n-1-l}{n}\begin{pmatrix} m_y(n-1) \\ 0 \end{pmatrix} + \frac{1+l}{n}y(n) \quad (109)$$

The first feature may indicate a higher-order local auto-correlation feature of the first data. The higher-order local auto-correlation feature (HLAC) has a position invariance property of independent of a position of a target and an additive property ensuring that a feature of two objects corresponds to a sum of two feature vectors and does not depend on a segmentation for extracting the target (feature) from the first data. Accordingly, the first feature indicating the feature of the first data can be speedily and accurately extracted without enormous amount of computational cost by using the higher-order local auto-correlation feature.

The first data may be image data, and the first feature may be generated based on a luminance gradient direction of each pixel of the image data. Thus, the first feature extracted from the image data can be robust against a general change of a lightness due to a lighting condition.

The second features may be generated by assigning a predetermined value other than value "0" to an arrangement of the symbols that are different from each other and are extracted from all of the second data when a target second data includes a target symbol, and setting value "0" to the arrangement of the symbols when the target second data does not includes a target symbol. Thus, it is optimally extract the feature of the second data indicating at least one symbol.

The first data may be image data, and the second data may include at least one word indicating an object in an image of the image data as the symbol. That is, the correspondence learning apparatus is advantageous to lean the correspondence between the image and word indicating the object in the image.

The correspondence learning apparatus may further include a clustering module that classifies a plurality of latent variables obtained for each of the combinations of the first and second features into a plurality of clusters and obtains a representative latent variable of each of the plurality of clusters. The information storage may store the representative latent variables and information on an imputed cluster of the latent variable.

A correspondence learning method according to the invention is a correspondence learning method for learning a correspondence between real-world information and symbols corresponding to the real-world information. The method includes the steps of:

(a) performing a canonical correlation analysis based on a plurality of combinations of first and second features so as to obtain a transformation to derive latent variables based on at least one of the first and second features, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;
(b) obtaining the latent variables for each of the combinations of the first and second features using the transformation obtained at Step (a); and
(c) deriving information required to obtain a probability of occurrence of an arbitrary first feature from the latent variable and a probability of occurrence of an arbitrary second feature from the latent variable for each of the latent variables.

By learning the correspondence between the real-world information and the symbols using the correspondence learning method, it is possible to easily and speedily obtains the probability of simultaneous occurrence of the first feature and the second feature and perform the high-speed and high-accuracy annotation that, for example, assigns the symbol to the real-world information in decreasing order of the probability, and the high-speed and high-accuracy retrieval that, for example, retrieves the real-world information corresponding to the desired symbol in decreasing order of the probability.

A correspondence learning program according to the invention is a correspondence learning program that causes a computer to function as an apparatus that learns a correspondence between real-world information and symbols corresponding to the real-world information. The program includes: a transformation obtaining module that performs a canonical correlation analysis based on a plurality of combinations of first and second features so as to obtain a transformation to derive latent variables based on at least one of the first and second features, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information; a latent variable obtaining module that obtains the latent variables for each of the combinations of the first and second features using the obtained transformation; and an information deriving module that derives information required to obtain a probability of occurrence of an arbitrary first feature from the latent variable and a probability of occurrence of an arbitrary second feature from the latent variable for each of the latent variables.

By learning the correspondence between the real-world information and the symbols using the computer installed with the correspondence learning program, it is possible to easily and speedily obtains the probability of simultaneous occurrence of the first feature and the second feature and perform the high-speed and high-accuracy annotation that, for example, assigns the symbol to the real-world information in decreasing order of the probability, and the high-speed and high-accuracy retrieval that, for example, retrieves the real-world information corresponding to the desired symbol in decreasing order of the probability.

An annotation apparatus according to the invention is an annotation apparatus that assigns a symbol as metadata to real-world information. The apparatus includes: a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information; an input reception module that receives an input of a new first data; a first feature extracting module that extracts a new first feature indicating a feature of the new first data based on the received new first data; a probability calculating module that calculates a probability of occurrence of the second feature of the second data indicating a single symbol from the extracted new first feature based on the learning information stored in the learning information storage; and a symbol assignment module that assigns the symbol to the new first data based on the probability calculated by the probability calculating module.

The annotation apparatus includes the learning information storage that stores learning information including a transformation obtained by the canonical correlation analysis to derive latent variables respectively indicating the abstract concept that connects the real-world information with the symbol corresponding to the real-world information based on at least one of the first and second features, latent variables obtained for each of the combinations of the first and second features using the transformation, and information required to obtain the probability of occurrence of the arbitrary first feature from the latent variable and the probability of occurrence of the arbitrary second feature from the latent variable for each of the latent variables. According to the annotation apparatus, the probability of occurrence of the second feature of the second data indicating the single symbol from the extracted new first feature can be easily and speedily calculated in response to the reception of the input of the new first data. Thus, it is possible to perform the high-speed and high-accuracy annotation that, for example, assigns the symbol to the real-world information in decreasing order of the probability.

The latent variable may be a first or second variate obtained by projecting the first or second feature on the canonical space. The probability calculating module may calculate a probability $P(w|x_{new})$ in accordance with a following equation (13), where, in the equation (13), $s_i$ represents the latent variable, $x_{new}$ represents the extracted new first feature, w represents the second feature of the second data indicating a single symbol, $P(w|x_{new})$ represents a probability of occurrence of the second feature w from the new first feature $x_{new}$, $P(x_{new}|s_i)$ represents a probability of occurrence of the new first feature $x_{new}$ from the latent variable $s_i$, and $P(w|s_i)$ represents a probability of occurrence of the second feature w from the latent variable $s_i$. Thus, the probability $P(w|x_{new})$ of occurrence of the second feature w from the new first feature $x_{new}$ can be easily and speedily calculated using the learning information.

$$P(w|x_{new}) = \sum_{i=1}^{n} P(x_{new}|s_i)P(w|s_i) \quad (13)$$

The latent variable may be a center of a normal distribution defined by one combination of the first and second feature in the canonical space. The probability calculating module may calculate a probability $P(w|x_{new})$ in accordance with a following equation (110), where, in the equation (110), $z_i$ represents the latent variable, $x_{new}$ represents the extracted new first feature, w represents the second feature of the second data indicating a single symbol, $P(w|x_{new})$ represents a probability of occurrence of the second feature w from the new first feature $x_{new}$, $P(x_{new}|z_i)$ represents a probability of occurrence of the new first feature $x_{new}$ from the latent variable $z_i$, and $P(w|z_i)$ represents a probability of occurrence of the second feature w from the latent variable $z_i$.

$$P(w|x_{new}) = \sum_{i=1}^{n} P(x_{new}|z_i)P(w|z_i) \quad (110)$$

In the annotation apparatus, a plurality of latent variables obtained for each of the combinations of the first and second features may be classified into a plurality of clusters and a representative latent variable may be obtained for each of the plurality of clusters. The learning information storage may store the representative latent variables and information on an imputed cluster of the latent variable. The probability calculating module may calculate the probability of occurrence of the second feature of the second data indicating a single symbol from the new first feature based on the latent variables belonging to the cluster in which a probability of occurrence of the new first feature from the representative latent variable is equal to or more than a predetermined threshold value. Thus, it is possible to omit a calculation of the probability with respect to the latent variable (combination of the first and second features) that have no or little influence on the accuracy of the annotation, thereby lightening the computational cost and speeding processes while ensuring the accuracy of the annotation.

The symbol assignment module may extract the symbol indicated by the second feature of the second data indicating the single symbol in decreasing order of the probability in accordance with a predetermined criterion and generate a new second feature corresponding to the new first feature based on the extracted symbol.

The annotation apparatus may further include an information update module that updates the learning information based on the new first and second features. Thus, the transformations, the latent variables, and the information for obtaining the probability can be optimally updated based on the combination of the new first feature and the new second feature accurately set with respect to the new first feature.

An annotation method according to the invention is an annotation method for assigning a symbol as metadata to real-world information. The method includes the steps of:
(a) storing learning information in a storage, the learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;
(b) calculating a probability of occurrence of the second feature of the second data indicating a single symbol from a new first feature extracted as a feature of a new first data based on the learning information; and
(c) assigning the symbol to the new first data based on the probability calculated at Step (b).

According to the annotation method, the probability of occurrence of the second feature of the second data indicating the single symbol from the extracted new first feature can be easily and speedily calculated using the learning information in response to the occurrence of the new first data. Thus, it is possible to perform the high-speed and high-accuracy annotation that, for example, assigns the symbol to the real-world information in decreasing order of the probability.

An annotation program according to the invention is an annotation program that causes a computer to function as an apparatus that assigns a symbol as metadata to real-world information. The computer includes a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information. The program includes: a probability calculating module that calculates a probability of occurrence of the second feature of the second data indicating a single symbol from a new first feature extracted as a feature of a new first data based on the learning information; and a symbol assignment module that assigns the symbol to the new first data based on the calculated probability.

According to the computer installed with the annotation program, the probability of occurrence of the second feature of the second data indicating the single symbol from the extracted new first feature can be easily and speedily calculated using the learning information in response to the occurrence of the new first data. Thus, it is possible to perform the high-speed and high-accuracy annotation that, for example, assigns the symbol to the real-world information in decreasing order of the probability.

A retrieval apparatus according to the invention is a retrieval apparatus capable of retrieving real-world information to which a symbol as metadata is not assigned based on the symbol. The apparatus includes: a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information; a non-annotated first data storage that stores at least one non-annotated first data being the first data that has no correspondence with the second data; a non-annotated first feature storage that stores a non-annotated first feature extracted from the non-annotated first data as a feature of the non-annotated first data; an input reception module that receives at least one symbol as a retrieval query; a retrieval second feature setting module that sets a retrieval second feature to the second feature of the second data indicating the received at least one symbol based on the at least one symbol; a probability calculating module that calculates a probability of occurrence of the set retrieval second feature from the non-annotated first feature based on the learning information stored in the learning information storage; and a data retrieving module that retrieves the non-annotated first data based on the calculated probability from the non-annotated first data storage.

The retrieval apparatus includes the learning information storage that stores learning information including a transformation obtained by the canonical correlation analysis to derive latent variables respectively indicating the abstract concept that connects the real-world information with the symbol corresponding to the real-world information based on at least one of the first and second features, latent variables obtained for each of the combinations of the first and second features using the transformation, and information required to obtain the probability of occurrence of the arbitrary first feature from the latent variable and the probability of occurrence of the arbitrary second feature from the latent variable for each of the latent variables. According to the retrieval apparatus, the probability of occurrence of the retrieval second feature based on the symbol as the retrieval query from the non-annotated first feature being the feature of the non-annotated first data can be easily and speedily calculated using the learning information in response to the reception of the at least one symbol as the retrieval query. Thus, it is possible to perform the high-speed and high-accuracy retrieval that, for example, retrieves the real-world information corresponding to the desired symbol in decreasing order of the probability.

The latent variable may be a first or second variate obtained by projecting the first or second feature on the canonical space. The probability calculating module may calculate a probability $P(y_{new}|x_j)$ in accordance with a following equation (14), where, in the equation (14), $s_i$ represents the latent variable, $y_{new}$ represents the retrieval second feature, $x_j$ represents the non-annotated first feature (where $j=1, \ldots, N$, N represents total numbers of the non-annotated first features), $P(y_{new}|x_j)$ represents a probability of occurrence of the retrieval second feature $y_{new}$ from the non-annotated first feature $x_j$, $P(x_j|s_i)$ represents a probability of occurrence of the non-annotated first feature $x_j$ from the latent variable $s_i$, and $P(y_{new}|s_i)$ represents a probability of occurrence of the retrieval second feature $y_{new}$ from the latent variable $s_i$. Thus, the probability $P(y_{new}|x_j)$ of occurrence of the retrieval second feature $y_{new}$ from the non-annotated first feature $x_j$ can be easily and speedily calculated using the learning information.

$$P(y_{new} | x_j) = \frac{\sum_{i=1}^{n} P(x_j | s_i) P(y_{new} | s_i)}{\sum_{i=1}^{n} P(x_j | s_i)} \qquad (14)$$

The latent variable may be a center of a normal distribution defined by one combination of the first and second feature in the canonical space. The probability calculating module may calculate a probability $P(y_{new}|x_j)$ in accordance with a following equation (111), where, in the equation (111), $z_i$ represents the latent variable, $y_{new}$ represents the retrieval second feature, $x_j$ represents the non-annotated first feature (where $j=1, \ldots, N$, N represents total numbers of the non-annotated first features), $P(y_{new}|x_j)$ represents a probability of occurrence of the retrieval second feature $y_{new}$ from the non-annotated first feature $x_j$, $P(x_j|z_i)$ represents a probability of occurrence of the non-annotated first feature $x_j$ from the latent variable $z_i$, and $P(y_{new}|z_i)$ represents a probability of occurrence of the retrieval second feature $y_{new}$ from the latent variable $z_i$.

$$P(y_{new} | x_j) = \frac{\sum_{i=1}^{n} P(x_j | z_i) P(y_{new} | z_i)}{\sum_{i=1}^{n} P(x_j | z_i)} \qquad (111)$$

In the retrieval apparatus, a plurality of latent variables obtained for each of the combinations of the first and second features may be classified into a plurality of clusters and a representative latent variable may be obtained for each of the plurality of clusters. The learning information storage may store the representative latent variables and information on an imputed cluster of the latent variable. The probability calculating module may calculate the probability of occurrence of the set retrieval second feature from the non-annotated first feature based on the latent variables belonging to the cluster in which a probability of occurrence of the non-annotated first feature from the representative latent variable is equal to or more than a predetermined threshold value. Thus, it is possible to omit a calculation of the probability with respect to the latent variable (combination of the first and second features) that have no or little influence on the accuracy of the retrieval, thereby lightening the computational cost and speeding processes while ensuring the accuracy of the retrieval.

A retrieval method according to the invention is a retrieval method capable of retrieving real-world information to which a symbol as metadata is not assigned based on the symbol. The method includes the steps of:

(a) storing learning information in a storage, the learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;

(b) setting a retrieval second feature to the second feature of the second data indicating at least one designated symbol based on the at least one symbol;

(c) calculating a probability of occurrence of the set retrieval second feature from a non-annotated first feature based on the learning information, the non-annotated first feature extracted from a non-annotated first data as a feature of the non-annotated first data that has no correspondence with the second data; and (d) retrieving the non-annotated first data based on the probability calculated at Step (c) from the storage.

According to the retrieval method, the probability of occurrence of the retrieval second feature based on the designated symbol from the non-annotated first feature being the feature of the non-annotated first data can be easily and speedily calculated using the learning information in response to a designation of the at least one symbol. Thus, it is possible to perform the high-speed and high-accuracy retrieval that, for example, retrieves the real-world information corresponding to the desired symbol in decreasing order of the probability.

A retrieval program according to the invention is a retrieval program that causes a computer to function as an apparatus capable of retrieving real-world information to which a symbol as metadata is not assigned based on the symbol. The computer includes a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information. The program includes: a retrieving second feature setting module that sets a retrieval second feature to the second feature of the second data indicating at least one designated symbol based on the at least one symbol; a probability calculating module that calculates a probability of occurrence of the set retrieval second feature from a non-annotated first feature based on the learning information, the non-annotated first feature extracted from a non-annotated first data as a feature of the non-annotated first data that has no correspondence with the second data; and a data retrieving module that retrieves the non-annotated first data based on the calculated probability.

According to the computer installed with the annotation program, the probability of occurrence of the retrieval second feature based on the designated symbol from the non-annotated first feature being the feature of the non-annotated first data can be easily and speedily calculated using the learning information in response to a designation of the at least one symbol. Thus, it is possible to perform the high-speed and high-accuracy retrieval that, for example, retrieves the real-world information corresponding to the desired symbol in decreasing order of the probability.

BRIEF DESCRIPTION OF THE DRAWINGS

FIG. 11 is a view illustrating experimental results using "Corel5k" data sets;

BEST MODES OF CARRYING OUT THE INVENTION

Now, the best mode for carrying out the present invention will be described with reference to an embodiment.

Figure 1:
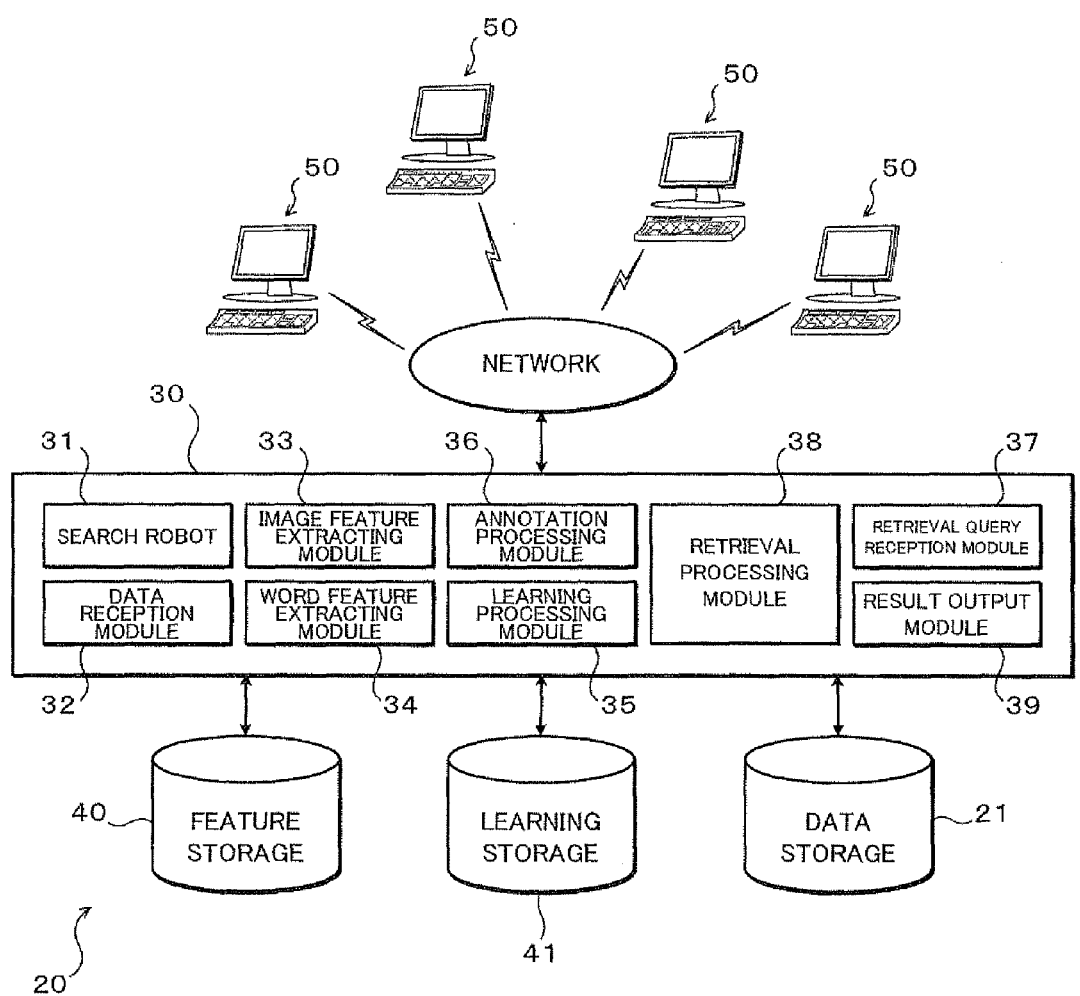
FIG. 1 is a schematic block diagram of an image data processing system 20 according to an embodiment of the present invention.

FIG. 1 is a schematic block diagram of an image data processing system 20 according to an embodiment of the present invention. The image data processing system 20 shown in the figure is configured with a data storage 21 that stores multiple image data and multiple word group data in databases and a management computer 30 that manages the databases in the data storage 21 and allows an annotation on a new image data and a retrieval of the databases. The management computer 30 includes one or more CPUs, ROMs, RAMs, system buses, various interfaces, storages and the like (not shown) and is configured to be accessible from a terminal device 50 via networks such as an internet. In the management computer 30, as shown in FIG. 1, one or both of hardware such as the CPU, the ROM, the RAM, the various interfaces, the storage and software such as a correspondence learning program, an annotation program and a retrieval program of the invention which are previously installed on the computer 30 cooperate to configure a search robot 31, a data reception module 32, an image feature extracting module 33, a word feature extracting module 34, a learning processing module 35, an annotation processing module 36, a retrieval query reception module 37, a retrieval processing module 38 and a result output module 39. Further, the management computer 30 connects with a feature storage 40 and a learning storage 41.

The search robot 31 collects data including an image that is not stored in the database of the data storage 21 via the network and the like and updates the database. That is, the search robot 31 classifies new collected data into the image data (first data) indicating the image and the word group data indicating at least one word (symbol) as a metadata that indicates an object in the image and brings both data into correspondence with each other. The image data and the word group data are respectively stored in predetermined storage locations by the search robot 31. When the metadata (symbols) are not assigned to the data collected by the search robot 31, only the image data are stored in the data storage 21. Hereinafter, "non-annotated image data" represents such an image data which has no assigned metadata (symbol) and no correspondence with the word group data as the second data. The data reception module 32 receives an input of the image data (first data) through an input device operated by an user and an input of word group data indicating at least one word (symbol) as the metadata that indicates the object in the image and corresponds to the image data, and stores the received data in the data storage 21. The image data as the first data received by the data reception module 32 may include the non-annotated image data which has no correspondence with the word group data as the second data.

The image feature extracting module 33 extracts a image feature (first feature) indicating a feature of the image data from the data and stores the image feature in the feature storage 40. The image feature extracting module of the embodiment extracts a higher-order local auto-correlation feature (Hereinafter referred to as "HLAC" as necessary) from the image data to generate the first feature as a vector and stores the generated first feature in the feature storage 40. The image feature extracted by the image feature extracting module 33 includes a feature corresponding to the non-annotated image data (Hereinafter referred to as "non-annotated image feature"). The word feature extracting module 34 extracts a word feature (second feature) indicating a feature of the word group data from the data and stores the word feature in the feature storage 40.

The learning processing module 35 performs a canonical correlation analysis based on a plurality of combinations of the first and second features so as to learn a correspondence between the image data and the word group data and obtains learning information necessary for the annotation that assigns a word group as the metadata to the non-annotated image data and the retrieval of the non-annotated image data based on the word. The learning processing module 35 stores the obtained learning information in the learning information storage 41. Further, in response to an occurrence of a combination of the new image data and a new word group data, the learning processing module 35 updates the learning information based on the new combination. The annotation processing module 36 performs the annotation on the non-annotated image data based on the learning information stored in the learning information storage 41. The retrieval query reception module 37 receives at least one word (symbol) as a retrieval query from the terminal device 50 and the like. The retrieval processing module 38 performs the retrieval of the image data including the non-annotated image data based on the retrieval query received by the retrieval query reception module 37. The result output module 39 outputs a result of the process of the retrieval processing module 38 to the terminal device 50 and the like.

In the above-described management computer 30, the learning processing module previously executes a initial learning routine based on the plurality of the combination of the image feature and the word feature in order to allow the annotation on the image data by the annotation processing module 36 and the retrieval of the non-annotated age data by the retrieval processing module 38. The annotation processing module 36 executes an annotation routine based on the learning information stored in the learning storage 41 in response to an occurrence of the non-annotated image data. The retrieval processing module 38 executes a retrieval routine for retrieving the non-annotated image data based on the retrieval query when the query reception module 37 receives the retrieval query. Further, the learning processing module 35 executes a learning information update routine for updating the learning information based on a new image feature extracted from the new image data and a new word feature extracted from the new word group data every acquisitions of the combination of the new image data and the new word group data by the search robot 31, the data reception module 32 and the like. Hereinafter, details of these routines will be described in turn.

(Initial Learning Routine)

First, a basic theory of the initial learning routine will be described before a detailed explanation of the initial learning routine. The initial learning routine is previously executed as a process for learning the correspondence between the image data as the first data indicating the real-world information and the word group data as the second data indicating the symbol in order to allow the annotation on the image and the retrieval of the non-annotated image data. In the embodiment, the correspondence between the image data and the word group data, that is, the correspondence between the image and the symbol is dealt with as a problem of simultaneous occurrence of the image feature extracted from the image data and the word feature extracted from the word group data. Assuming the correspondence between the image and the word as the problem of the probability, it is possible to assign the word as the metadata to the image and retrieve an image corresponding to a desired word in decreasing order of the probability by obtaining the probability of simultaneous occurrence of a certain image and a certain word. Here, x represents the image feature extracted from the image data as a feature of the image data, y represents the word feature extracted from the word group data as a feature of the word group data indicating at least one word (symbol) that indicates an object in the image, and P(x,y) represents a probability of simultaneous occurrence of the image feature x and the word feature y.

Figure 2:
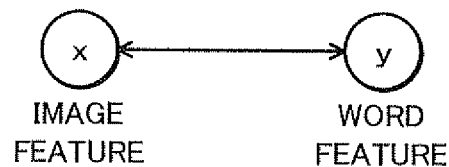
FIG. 2 is a view illustrating a correspondence between an image feature and a word feature.

Further, in the embodiment, an abstract concept that connects the image with the word corresponding to the image is introduced between the image feature x and the word feature y instead of finding a direct connection between the image feature x (image data) and the word feature y (word group data). That is, in the case of dogs for example, "Chihuahua" and "St. Bernard" are different in a size, a shape and a color of fur although they are the same dog. Therefore, it is not easy to directly connect the feature (image feature x) of the object in the image such as the shape, the size and the color with the word "Dog" (word feature y) as shown in FIG. 2. On the other hand, humans can basically recognize any dog as the "Dog" whichever dog they see. This may be because the humans have already acquired an abstract concept (Latent) indicating a definition of "Dog", that is, latent information that is not directly observed from features on a plurality of images and word "Dog".

Figure 3:
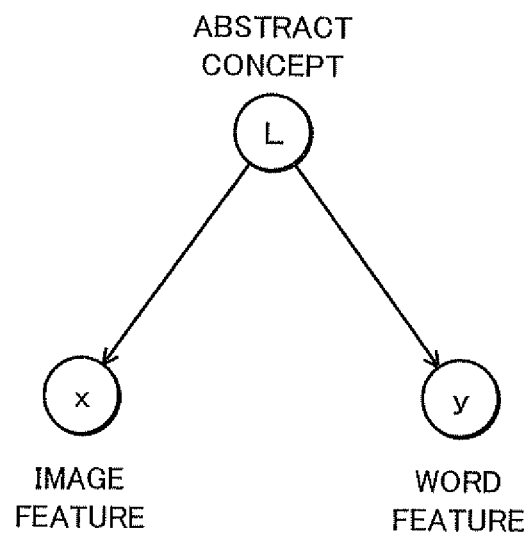
FIG. 3 is a view illustrating a model that introduces an abstract concept between the image feature and the word feature.

In consideration of these points, in the embodiment, the correspondence between the image (real-world information) and the word (symbol) is learned using a model that introduces the abstract concept L between the image feature x and the word feature y instead of finding the direct connection between the image feature x and the word feature y. FIG. 3 illustrates the model that introduces the abstract concept L between the image feature x and the word feature y. When using the abstract concept L, the probability P(x,y) of simultaneous occurrence of the image feature x and the word feature y can be expressed as the above equation (0). In the equation (0), P(x|L) represents a probability of occurrence of the image feature x from the abstract concept L, P(y|L) represents a probability of occurrence of the word feature y from the abstract concept L, and P(L) represents a probability of occurrence of the abstract concept L itself. The equation (0) is deformed using a relationship "P(x|y, L)=P(x|L)". The relationship is established because the image features x and the word features y are not directly associated with each other (assumption of conditional independence).

The "Dog" is taken as an example and the equation (0) will be described in detail. For example, probability of simultaneous occurrence of "Color is white" and "Chihuahua" can be expressed in accordance with the equation (0) as: "P(white, Chihuahua)=P(white|Dog-concept)×P(Chihuahua|Dog-concept)"×P(Dog-concept)", where "white" corresponds to the image feature (first feature) x, "Chihuahua" corresponds to the word feature (second feature) y and "Dog-concept" corresponds to the abstract concept L. However, there are many concepts such as not only the concept of "Dog" but also a concept of "Cat", a concept of "Mouse" and the like in the real world. Accordingly, there is necessity to take account of probabilities of occurrence of "white" and "Chihuahua" from the concept of "Cat", probabilities of occurrence of "white" and "Chihuahua" from the concept of "Mouse", etc. with respect to the probability P(white, Chihuahua). When taking account of another abstract concepts, the probability P(white, chihuahua) can be expressed as "P(white,Chihuahua)=P(white|Dog-concept)×P(Chihuahua|Dog-concept)"×P(Dog-concept)+P(white|Cat-concept)×P(Chihuahua|Cat-concept)"×P(Cat-concept)+P(white|Mouse-concept)×P(Chihuahua|Mouse-concept)"×P(Mouse-concept)+ . . . ". From the above viewpoint, the equation (0) is defined to integrate all of probabilities on all known abstract concepts. Of course, the probability P(Chihuahua|Cat-concept) of occurrence of "Chihuahua" from the concept of "Cat", the probability P(Chihuahua|Mouse-concept) of occurrence of "Chihuahua" from the concept of "Mouse", and the like are very low and do not have no or little influence on a value of the probability P(white|Chihuahua).

Figure 4:
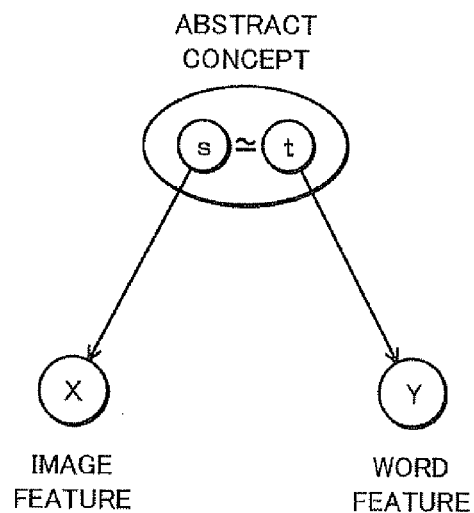
FIG. 4 is a view illustrating a model that introduces the abstract concept between the image feature and the word feature.
Figure 5:
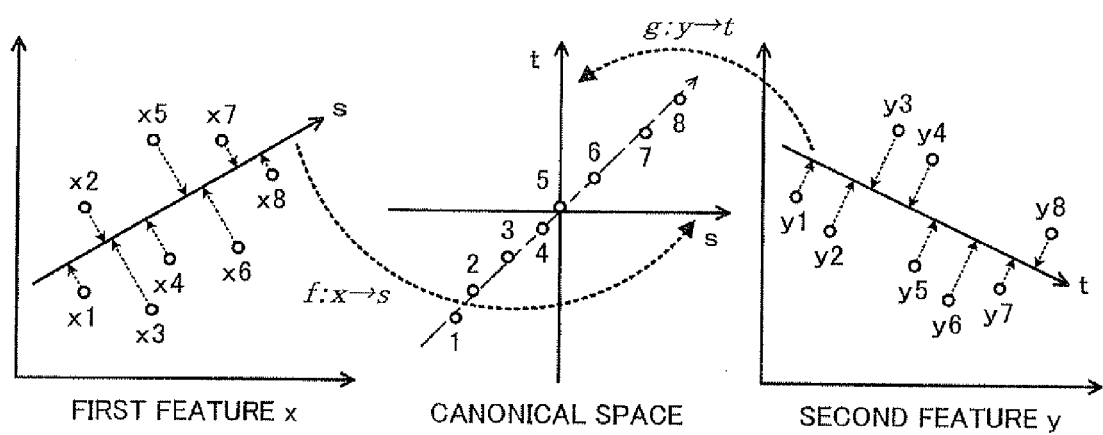
FIG. 5 is a view illustrating a canonical correlation analysis.

As described above, there is necessity to obtain the abstract concept L when introducing the abstract concept L between the image feature x and the word feature y. In the embodiment, the canonical correlation analysis is used for obtaining the abstract concept L. That is, the canonical correlation analysis is used for obtaining transformations that project two variates (the first feature x and the second feature y as vectors, in this case) that are not closely associated with each other on variates different from each other on a common space (canonical space) and maximize a correlation between the variates. In the embodiment, as shown in FIGS. 4 and 5, a first variate represents a variate obtained by projecting the image feature x on the canonical space, f:x->s represents the transformation for this projection, a second variate t represents a variate obtained by projecting the word feature y on the canonical space, and g:y->s represents the transformation for this projection. The transformations f and g are obtained by the canonical correlation analysis. The transformations f and g that maximize a correlation (correspondence) between first variate and second variate (match the first variate s with the second variate t corresponding to the first variate s) are obtained by the canonical correlation analysis. Further, at least one of the first and second variates is used as a latent variable indicating the abstract concept L obtained based on the image feature x and the word feature y.

A procedure for obtaining the transformation f and g will be described in detail. When obtaining the above transformation f and g by applying the canonical correlation analysis to a data set $\{x_i, y_i\}^n_{i=1}$ including the image feature $x_i=(a_1, \ldots, a_p)^T$ as a vector having p-piece variates, and the word feature $y_i=(b_1, \ldots, b_q)^T$ as a vector having q-piece variates, two linear transformations are set as in the above equations (1) and (2). The projection matrix (coefficient matrix) A in the equation (1) corresponds to the transformation f and the projection matrix (coefficient matrix) B in the equation (2) corresponds to the transformation g. Then, the projection matrices A and B that maximize an absolute value of a trace of a correlation matrix between the first variate $s_i(=(s_1, \ldots, s_p))$ projected on the canonical space by the projection matrix A and the second variate $t_i(=(t_1, \ldots, t_q))$ projected on the canonical space by the projection matrix B are calculated. In this case, optimal projection matrices A and B are obtained as solutions of the eigenvalue problem in the above equation (3), where, in the equation (3), $\Lambda^2$ represents the diagonal matrix having diagonal elements equal to eigenvalues, I represents the unit matrix, and covariance matrices $C_{xx}$, $C_{yy}$, $C_{xy}$ and $C_{yx}$ are given in a following equation (4) (where $m_x=x_1$, $m_y=y_1$, $C_{xx}=C_{yy}=C_{xy}=C_{yx}=0$ when n=1). According to the canonical correlation analysis, it is possible to obtain the transformations f and g (projection matrices A and B) for the data set $\{x_i, y_i\}^n_{i=1}$ by solving the eigenvalue problem of the matrix at once and to speedily solve the eigenvalue problem even if the data set $\{x_i, y_i\}^n_{i=1}$ (value n, that is, the number of the combinations of the image feature x and the word feature y corresponding to the image feature x) is large.

The projection matrices A and B are obtained as described above by applying the canonical correlation analysis to the data set $\{x_i, y_i\}^n_{i=1}$ including the image feature $x_i$ and the word feature $y_i$ and a data set $\{s_i, t_i\}^n_{i=1}$ including the first and second variates $s_i$, $t_i$ can be obtained using the data set $\{x_i, y_i\}^n_{i=1}$, projection matrices A and B. The projection matrices A and B corresponding to the transformations f and g match the latent variable s with the latent variable t corresponding to the latent variable s. Accordingly, one of the data sets $\{s_i\}^n_{i=1}$ and $\{t_i\}^n_{i=1}$ can be used as the abstract concept L. When using the first variate $s_i$ as the abstract concept L and defining $s_i$ as the latent variable, the above equation (0) becomes a simple a calculation equation for an addition, not a calculation equation for an integration. Therefore, the equation (0) can be deformed as a following equation (15). Further, assuming all occurrence probabilities of the latent variables $s_i$ are identical to each other, the equation (15) can be deformed as a following equation (16). The probability P(x,y) of simultaneous occurrence of the certain image feature x and the certain word feature y can be obtained using the equation (16).

$$P(x, y) = \sum_{i=1}^{n} P(x|s_i)P(y|s_i)P(s_i) \quad (15)$$

$$P(x, y) = \frac{1}{n}\sum_{i=1}^{n} P(x|s_i)P(y|s_i) \quad (16)$$

Assuming the correspondence between the image and the word (correspondence between the image feature x and the word feature y) as the problem of the probability under the above described basic theory, it is possible to assign the word to the image and retrieve the image corresponding to the desired word in decreasing order of the probability by obtaining the probability P(x, y) of simultaneous occurrence of the certain image feature x and the certain word feature y. In order to obtain the probability P(x, y) in accordance with the equation (16), there is necessity to ensure a easy and speedy calculation of a probability $P(x|s_i)$ of occurrence of an arbitrary image feature x from the latent variable $s_i$ as the abstract concept L and a probability $P(y|s_i)$ of occurrence of an arbitrary word feature y from the latent variable $s_i$. Accordingly, the initial learning routine in the embodiment is defined to previously acquire required information for the easy and speedy calculation of the probability P(x, y) as described below.

Figure 6:
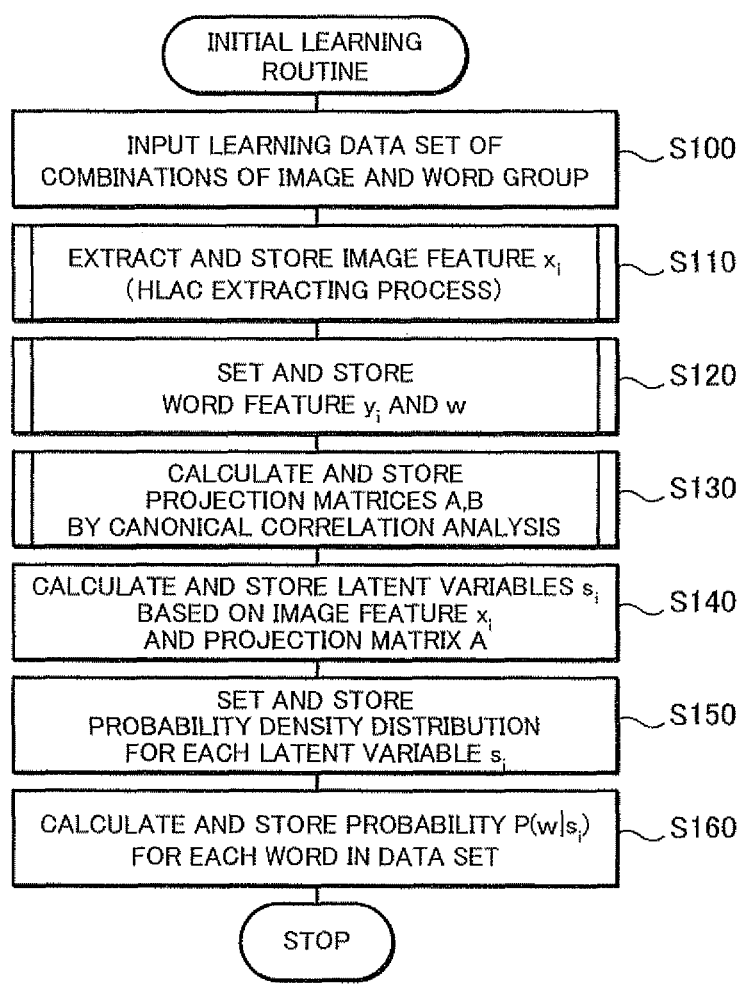
FIG. 6 is a flowchart illustrating an example of an initial learning routine executed by a management computer 30 in the embodiment.

Next, the initial learning routine will be described in detail with reference to FIG. 6 and the like. The initial learning routine is previously executed by the learning processing module 35 of the management computer 30 at once before a start of a substantial service of the image data processing system 20. At a start of the initial learning routine, the learning processing module 35 receives a data set for a learning from the data reception module 32 or the data storage 21 (Step S100). The data set for the learning includes a plurality of combinations of the image data and the word group data including as least one word that indicates the object in the image and corresponds to the image data. Each of the combinations of the image data and the word group is preferably optimized by hand so that the image and the word accurately correspond to each other. After the input of the data set for the learning, the learning processing module 35 directs the image feature extracting module 33 to extract the image feature $x_i$ from the image data. The image feature extracting module 33 extracts the image feature $x_i$ from each image data input at Step S100 and stores the extracted image feature $x_i$ in predetermined storage locations of the feature storage 40 (Step S110). Further, the learning processing module 35 directs the word feature extracting module 34 to set the word feature $y_i$ based on the word group data and the word feature w for a single word. The word feature extracting module 34 sets the word feature $y_i$ and w based on the word group data input at Step S100 and stores the set word feature $y_i$ and w in predetermined storage locations of the feature storage 40 (Step S120).

Figure 7:
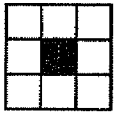
FIG. 7 is a view exemplifying local patterns in a higher-order local auto-correlation feature.
Figure 7:
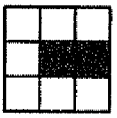
Figure 7:
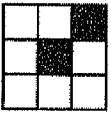
Figure 7:
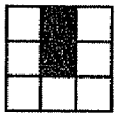
Figure 7:
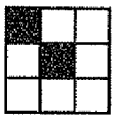
Figure 7:
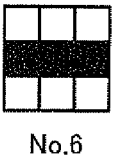
Figure 7:
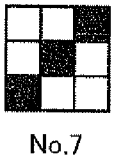
Figure 7:
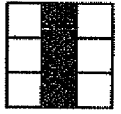
Figure 7:
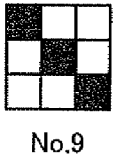
Figure 7:
Figure 7:
Figure 7:
Figure 7:
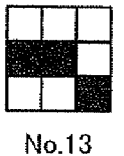
Figure 7:
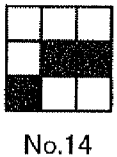
Figure 7:
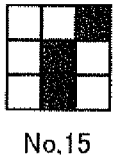
Figure 7:
Figure 7:
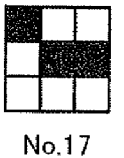
Figure 7:
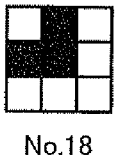
Figure 7:
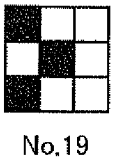
Figure 7:
Figure 7:
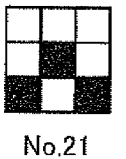
Figure 7:
Figure 7:
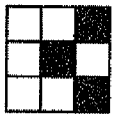
Figure 7:
Figure 7:
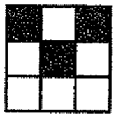

An extraction of the image feature $x_i$ by the image feature extracting module 33 at Step S110 will be described. In the embodiment, the image feature $x_i$ is extracted from the image data as a vector that indicates the higher-order local auto-correlation feature (HLAC) disclosed Japanese Patent No. 2834153 and the Japanese Patent No. 2982814. The HLAC corresponds to an extension of a self-correlation function. When H(θ) represent a luminance value of a target image at a reference point θ, N-order self-correlation function $\zeta_N(\alpha_1, \alpha_2, \ldots, \alpha_N)$ with respect to N-piece displacements $(\alpha_1, \alpha_2, \ldots, \alpha_N)$ around the reference point θ can be defined as a following equation (17), where displacement $\alpha_i$ represents a vector such as $\alpha_1=(1,1)$, $\alpha_2=(1,-1)$, .... The high-order self-correlation function as the equation (17) may be infinitely defined in accordance with definitions of the order N and the displacement $(\alpha_1, \alpha_2, \ldots, \alpha_N)$. Regarding the image data, a local correlation between pixels adjacent to each other seems of great importance in general. In the embodiment, the order N is defined as value "2", the displacement is limited to a local area of 3×3=9 pixels around the reference point θ, and correlations up to three points in the local area are extracted as the feature. Thus, regarding a binary image, the number of local patterns indicating the feature of the image becomes 25 as shown in FIG. 7 with exceptions of patterns regarded as equivalence by a translation. In FIG. 7, a central pixel of each local area represents the reference point, and the reference point and solidly shaded areas except for the reference point represent scanning targets. Regarding a grayscale image (not shown), the number of local patterns indicating the feature of the image becomes 35 with exceptions of patterns regarded as equivalence by the translation. The first feature $x_i$ of the $i^{th}$ image data is obtained by scanning whole of the target image at once and taking a sum of a product of luminance value of the local pattern for each of the local pattern. In the case of the binary image for example, the first feature $x_i$ of the certain image is defined as a vector "$x_i$=(total number of No. 1 pattern, total number of No. 2 pattern, . . . , total number of No. 25 pattern)$^T$". The first feature $x_i$ extracted as described above and indicating the HLAC has a position invariance property of independent of a position of a target and an additive property ensuring that a feature of two objects corresponds to a sum of two feature vectors. Accordingly, there is no need to use a segmentation for extracting the target (feature) from the image data when using the first feature xi indicating the HLAC extracted from the image data as in the embodiment, thereby improving an accuracy of an image recognition and lightening a computational cost of a process for obtaining the image feature. Regarding a color image, a color HLAC disclosed Japanese Patent Application Laid-Open No. 2006-163452 may be extracted as the image feature from the image data. Regarding a moving image and a range image, a CHLAC (Cubic Higher-order Local auto-Correlation feature) disclosed Japanese Patent Application Laid-Open No. 2006-79272 may be extracted as the image feature from the image data.

$$\zeta_N(\alpha_1, \alpha_2, \ldots, \alpha_N) = \int H(\theta) H(\theta+\alpha_1) H(\theta+\alpha_2) \ldots H(\theta+\alpha_N) d\theta \quad (17)$$

An extraction of the word feature $y_j$ and w by the word feature extracting module 34 at Step S120 will be described. At Step S120, all of words included in all word group data input as Step S100 are extracted at first. Then, the extracted words are arranged in an extracted order for example. In the embodiment, the word feature $y_i$ is set for each word group data by assigning value "1" as an evaluation value (weight) to a word in an arrangement of all the words that is included in the word group data and assigning value "0" as the evaluation value to a word in the arrangement of the all the words that is not included in the word group data. For example, when words such as "Sky", "Airplane", "cloud" and the like are included in the word group data corresponding to the certain image data and the arrangement of all the words is expressed as (Sky, . . . , ○, Airplane, . . . , Δ, . . . , Cloud, . . . , Mountain, . . . , Sea, . . . , □), the word feature $y_i$ becomes a vector $y_i$=(1, . . . , 0, . . . , 1, 0, . . . , 1, . . . , 0, . . . , 0, . . . , 0)$^T$. When the word group data respectively have evaluation values such as "Sky-like=0.31", "Airplane-like=0.87" and the like, the word feature $y_i$ may be set by assigning the corresponding evaluation value to the word in the arrangement of all the words that is included in the word group data and assigning value "0" to the word in the arrangement of the all the words that is not included in the word group data, instead of assigning value "1" as the evaluation value to the word included in the word group data as described above. The word feature w for the single word is set for each of all the extracted words as described above as a feature of the word group data indicating only single symbol. The number of the word features w is identical to the number of the extracted words. That is, the word feature w of the word group data indicating word "Sky" becomes a vector w=(1, 0, 0, 0, . . . 0)$^T$ when the arrangement of all the words is expressed as (Sky, . . . , ○, Airplane, . . . , Δ, . . . , Cloud, . . . , Mountain, . . . , Sea, . . . , □).

After the extraction of the image feature $x_i$ and word feature $y_i$ as described above, the learning processing module 35 performs the canonical correlation analysis based on a plurality of combinations of the image feature $x_i$ and the word feature $y_i$ so as to obtain the transformation to derive latent variables respectively indicating the abstract concept L that connects the image and the word based on at least one of the image feature $x_i$ and the word feature $y_i$ (Step S130). That is, at Step S130, the learning processing module 35 solves the eigenvalue problem in the above equation (3) so as to calculate the projection matrix A in the above equation (1) as a first transformation and the projection matrix B in the above equation (2) as a second transformation and stores the calculated projection matrices A and B in predetermined storage locations of the learning storage 41. Further, the learning processing module 35 calculates the latent variables $s_i$ as the abstract concept L obtained by projecting each image feature $x_i$ on the canonical space using the projection matrix A calculated at Step S130 for each of the combination of the image feature $x_i$ and the word feature $y_i$ (for i=1-n) and stores the calculated latent variables $s_i$ in predetermined storage locations of the learning storage 41 (Step S140).

Figure 8:
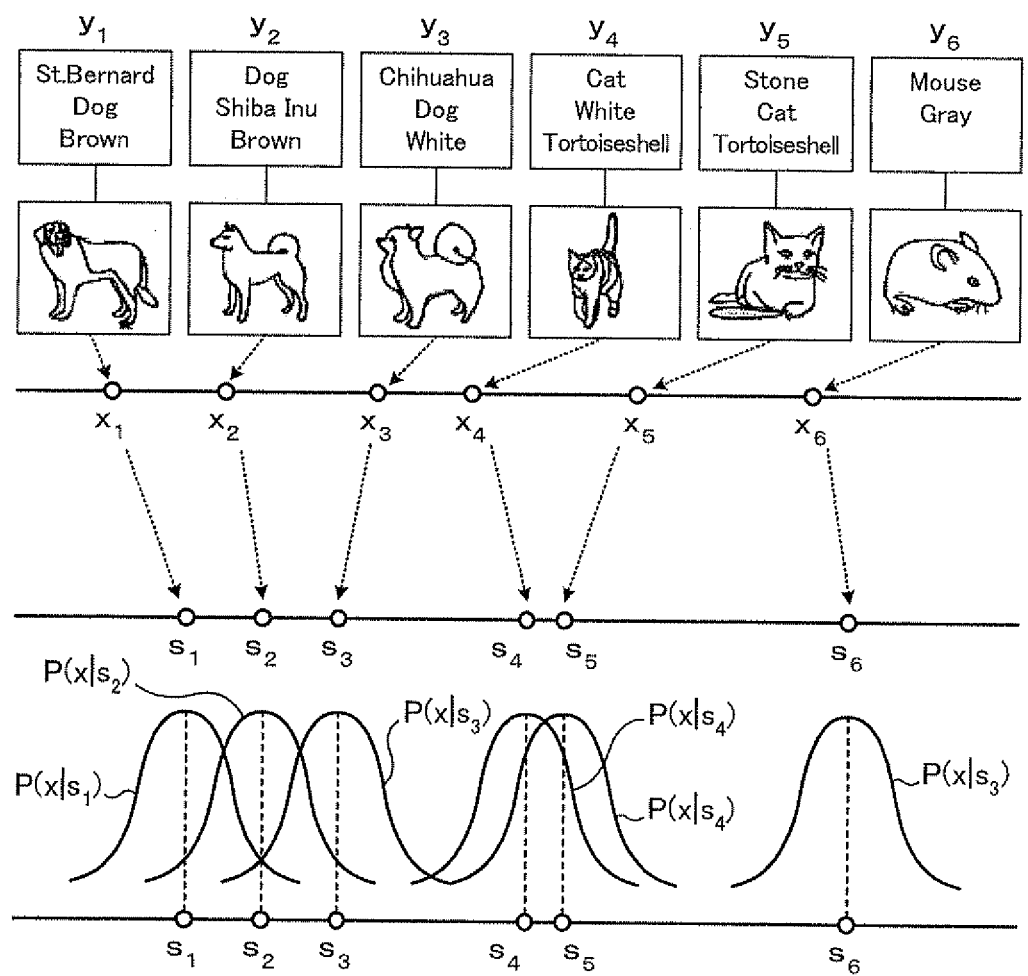
FIG. 8 is a view exemplifying probability density distributions assigned for each latent variable $s_j$.

Here, in order to obtain the probability P(x,y) in accordance with the equation (16), there is necessity to ensure the easy and speedy calculation of the probability P(x|$s_i$) of occurrence of the arbitrary image feature x from the latent variable $s_i$ and the probability P(y|$s_i$) of occurrence of the arbitrary word feature y from the latent variable $s_i$. Assuming a new first feature $x_{new}$ occurs, it is rational to consider that a latent variable $s_{new}$ obtained by projecting the new first feature $x_{new}$ is apt to occur from the already-calculated latent variable $s_i$ if the closer new latent variable $x_{new}$ is to the already-calculated latent variable $s_i$. Accordingly, in the embodiment, the probability P(x|$s_i$) is expressed as a normal distribution (Gaussian distribution) around the latent variable $s_i$ as shown in FIG. 8. The learning processing module 35 set a probability density distribution for each latent variable $s_i$ calculated as Step S140 (Step S150). In a probabilistic canonical correlation analysis framework, the probability P(x|$s_i$) can be obtained as a simple normal distribution shown in the above equation (5) using the projection matrix A calculated at Step S130. At Step S150, the probability density distribution is set for each latent variable $s_i$ in accordance with the equation (5).

After setting the probability density distribution for each latent variable $s_i$, the learning processing module 35 calculates occurrence probabilities P(w|$s_i$) for each of all the words includes the word group data input at Step S100, that is, a probability of occurrence of the word feature w from the latent variable $s_i$ in order to easily and speedily obtain the probability P(y|$s_i$) of occurrence of the arbitrary word feature y from the latent variable $s_i$ in accordance with the above equation (7) (in this case $sz_i$ in the equation (7) corresponds to $s_i$), and stores the calculated occurrence probabilities P(w|$s_i$) in a predetermined storage location of the learning storage 41 (Step S160). When using CRM (Continuous-space Relevance Model) that is one of language models, the probability P(y|$s_i$) of occurrence of the arbitrary word feature y from the latent variable $s_i$ can be expressed as a following equation (18). Further, the probability P(y|$s_i$) of occurrence of the arbitrary word feature y from the latent variable $s_i$ can be expressed as a following equation (19) when using MBRM (Multiple Bernoulli Relevance Model) that is one of language models. P(w|$s_i$) in the equations (18) and (19) represents the occurrence probability of each word common in both CRM and MBRM and is calculated in accordance with the above equation (7) (in this case $sz_i$ in the equation (7) corresponds to $s_i$). In the equation (7), μ represents a real number selected from value "0" to value "1". In the embodiment, μ is set to value 0.8 for example. Greater importance is put on the word group (word feature) assigned the image data of the data set if the closer μ is to value "1". On the other hand, greater importance is put on a whole occurrence frequency if the closer μ is to value "0". Thus, the occurrence probabilities $P(w|s_i)$ for each of all the words are calculated and stored, so that the learning of the correspondence between the image and the word reaches completion. Then, the learning processing module 35 terminates the routine.

$$P(y|s_i) = \prod_{w \in y} P(w|s_i) \quad (18)$$

$$P(y|s_i) = \prod_{w \in y} P(w|s_i) \prod_{w \notin y} (1 - P(w|s_i)) \quad (19)$$

As has been described above, the image data processing system 20 of the embodiment performs the canonical correlation analysis based on a plurality of combinations of the image feature $x_i$ and the word feature $y_i$ so as to obtain the projection matrices A and B as the transformation to derive latent variables $s_i$ respectively indicating the abstract concept L that connects the image and the word corresponding the image based on at least one of the image feature $x_i$ and the word feature $y_i$ (Step S130). Then, the latent variables $s_i$ are obtained for each of the combination of the image feature $x_i$ and the word feature $y_i$ using the projection matrices A and B (Step S140). Further, the system calculates information required to obtain the probability $P(x|s_i)$ of occurrence of the arbitrary image feature x from the latent variable $s_i$ and the probability $P(y|s_i)$ of occurrence of the arbitrary word feature y from the latent variable $s_i$ for each latent variable $s_i$ (Steps S150 and S160). Thus, the probability $P(x,y)$ of simultaneous occurrence of the image feature x and the word feature y, that is, the probability of simultaneous occurrence of the certain image and the word as the symbol can be easily and speedily obtained in accordance with the above equation (16). Accordingly, in the image data processing system 20 of the embodiment, it is possible to perform the high-speed and high-accuracy annotation that, for example, assigns the word to the image in decreasing order of the probability, and the high-speed and high-accuracy retrieval that, for example, retrieves the image corresponding to the desired word in decreasing order of the probability.

In the embodiment, the projection matrices A and B as the transformation to derive latent variables $s_i$ based on at least one of the image feature $x_i$ and the word feature $y_i$ can be speedily obtained using the canonical correlation analysis, thereby optimally obtaining and storing the latent variables $s_i$ as the abstract concept L that connects the image with the word corresponding to the image. Further, it is possible to easily and speedily obtain the probability of occurrence of the arbitrary image feature x from the certain latent variable $s_i$ and the probability of occurrence of the arbitrary word feature y from the certain latent variable $s_i$ by storing the probability density distribution $P(x|s_i)$ indicating the probability of occurrence of the arbitrary image feature x from the latent variable $s_i$ and the occurrence probability $P(w|s_i)$ of occurrence of the arbitrary word feature w from the latent variable $s_i$ as the learning information. In this case, the normal (Gaussian) distribution can be used as the probability density distribution $P(x|s_i)$ and the probability density distribution can be set for each latent variable $s_i$ in accordance with the above equation (5), thereby optimizing the probability of occurrence of the arbitrary image feature x from the certain latent variable $s_i$ so as to reflect real-world situations. However, the probability density distribution $P(x|s_i)$ may be set in accordance with the above equation (6). When using the equation (6), an order m of the canonical space (order of s and $s_i$) and a variance Σ in the equation are preferably obtained by applying a cross-validation to the data set for the learning. Further, the occurrence probability $P(w|s_i)$ of the word feature w can be optimally calculated using the above equation (7). However, the probability of occurrence of the arbitrary word feature y from the latent variable $s_i$ may be obtained using the probability density distribution of the normal (Gaussian) distribution. In the case of using the normal distribution, the probability $P(w|s_i)$ can be calculated in accordance with the above equation (8) (in this case $sz_i$ in the equation (8) corresponds to $s_i$).

The higher-order local auto-correlation feature (HLAC) used in the embodiment has the position invariance property of independent of the position of the target and the additive property ensuring that the feature of two objects corresponds to the sum of two feature vectors and does not depend on the segmentation for extracting the target (feature) from the first data. Accordingly, the feature of the image data can be speedily and accurately extracted without enormous amount of computational cost by extracting the vector indicating the higher-order local auto-correlation feature from the image data and using it as the image feature $x_i$. However, the image feature $x_i$ may be a feature extracted by another method other than the higher-order local auto-correlation. Further, it is possible to optimally extract the feature of the word group data indicating at least one word as the symbol by assigning a predetermined value except for value "0" to the arrangement of the words different from each other extracted from all of the word group data when a target word is included in a target word group data and assigning value "0" to the arrangement when the target word is not included in the target word group so as to set the word feature $y_i$.

(Annotation Routine)

Subsequently, the annotation routine executed by the annotation processing module 36 of the management computer 30 routine will be described. First, a basic theory of the annotation routine will be described before a detailed explanation of the annotation routine. As described above, when the new first feature $x_{new}$ represents the image feature (HLAC) extracted from the non-annotated image data for example, it is possible to assign an appropriate word group to the non-annotated image data by calculating a probability $P(w|x_{new})$ of occurrence of the word feature w of the word group data indicating the single word from the new first feature $x_{new}$ and assigning the words corresponding to the word feature to the non-annotated image data corresponding to the new first feature $x_{new}$ in decreasing order of the probability. Here, the probability $P(w|x_{new})$ of occurrence of the word feature w from the new first feature $x_{new}$ can be expressed as a following equation (20) in accordance with Bayes' theorem an the equation (20) can be deformed as a following equation (21) using the equation (16). In the equation (21), the probabilities $P(x_{new})$ takes an identical value with respect to every word feature w. Therefore, assuming the probability $P(x_{new})$ as a constant, the probability $P(w|x_{new})$ of occurrence of the word feature w from the new first feature $x_{new}$ can be finally expressed as the above equation (13).

$$P(w \mid x_{new}) = \frac{P(w, x_{new})}{P(x_{new})} \qquad (20)$$

$$P(w \mid x_{new}) = \frac{P(w, x_{new})}{P(x_{new})} = \frac{\frac{1}{n}\sum_{i=1}^{n} P(x_{new} \mid s_i) P(w \mid s_i)}{P(x_{new})} \qquad (21)$$

Figure 9:
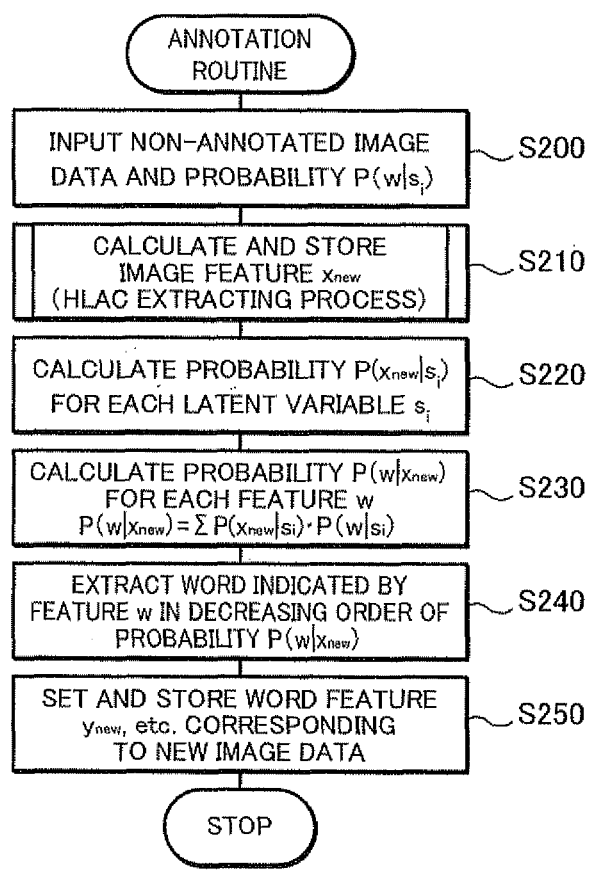
FIG. 9 is a flowchart illustrating an example of an annotation routine executed by a management computer 30 in the embodiment.

Next, the annotation routine based on the above basic theory will be described with reference to FIG. 9. The annotation routine shown in FIG. 9 is basically executed by the annotation processing module 36 of the management computer 30 in response to the input of the non-annotated image data that has no correspondence with the word group data. However, the annotation routine may be executed with respect to the image data that has already corresponded to the word group data in order to improve the accuracy of the annotation. At a start of the annotation routine of FIG. 9, the annotation processing module 36 receives a target non-annotated image data from the data reception module 32 or the data storage 21 and receives occurrence probabilities P(w|$s_i$) for all the word features w from the learning storage 41 (Step S200). After the input of the data required for the annotation, the annotation processing module 36 directs the image feature extracting module 33 to extract the new image feature $x_{new}$ from the non-annotated image data. The image feature extracting module 33 extracts a vector indicating the higher-order local auto-correlation feature as the new image feature $x_{new}$ from the non-annotated image data and stores the extracted new image feature $x_{new}$ in a predetermined storage location of the feature storage 40 (Step S210).

Figure 10:
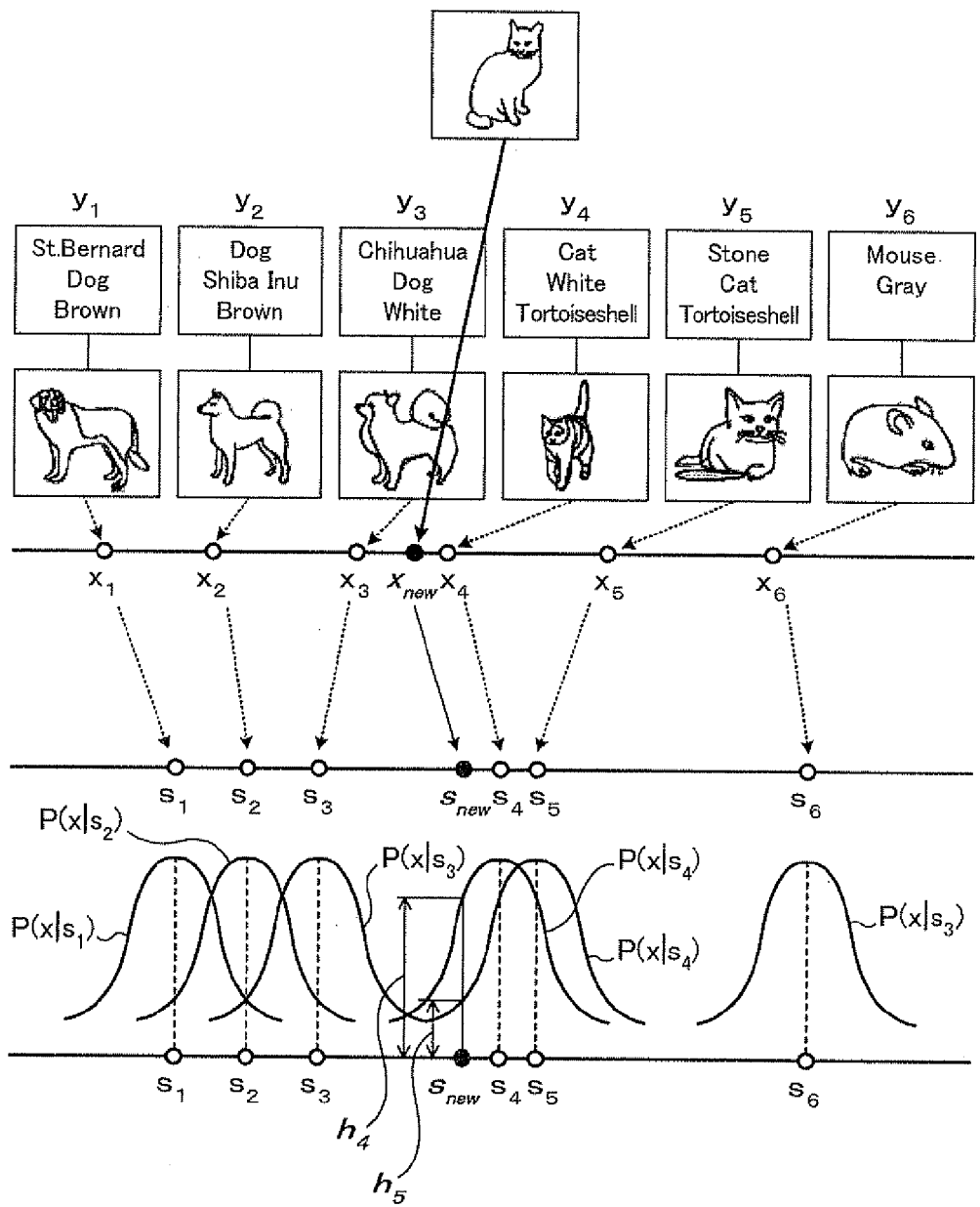
FIG. 10 is a view illustrating a procedure for assigning a word as a symbol to a non-annotated image data.

After extracting and storing the new image feature $x_{new}$, the annotation processing module 36 calculates the probability P($x_{new}$|$s_i$) of occurrence of the new first feature $x_{new}$ from the latent variable $s_i$ for each latent variable $s_i$ stored in the learning storage 41 (Step S220). At Step S220, the probability P($x_{new}$|$s_i$) for each latent variable $s_i$ is calculated using the probability density distribution P(x|$s_i$) for each latent variable $s_i$ stored in the learning storage 41. After calculating the probability P($x_{new}$|$s_i$) for each latent variable $s_i$, the annotation processing module 36 calculates the probability P(w|$x_{new}$) of occurrence of the word feature w from the image feature $x_{new}$ for each word feature w (for each of all the words) in accordance with the above equation (13) (Step S230). Assuming that the probability density distribution P(x|$s_i$) is set in accordance with the equation (6), the non-annotated image shown in FIG. 10 occurs in the presence of combinations of the image feature $x_i$ and the word feature $y_i$ as shown in FIG. 10 for example, and a new latent variable $s_{new}$ satisfies $s_{new}$=A·$x_{new}$, the probability P($x_{new}$|$s_i$)=$h_i$ can be obtained as shown in FIG. 10. Further, probabilities of occurrence of the word features w from the image feature $x_{new}$ can be respectively calculated as follows.

P(Dog|$x_{new}$)=$h_1$×P(Dog|$s_i$)+$h_2$×P(Dog|$s_2$)+$h_3$×P(Dog|$s_3$)+$h_4$×P(Dog|$s_4$)+$h_5$×P(Dog|$s_5$)+$h_6$×P(Dog|$s_6$)...

P(Cat|$x_{new}$)=$h_1$×P(Cat|$s_i$)+$h_2$×P(Cat|$s_2$)+$h_3$×P(Cat|$s_3$)+$h_4$×P(Cat|$s_4$)+$h_5$×P(Cat|$s_5$)+$h_6$×P(Cat|$s_6$)...

P(Mouse|$x_{new}$)=$h_1$×P(Mouse|$s_i$)+$h_2$×P(Mouse|$s_2$)+$h_3$×P(Mouse|$s_3$)+$h_4$×P(Mouse|$s_4$)+$h_5$×P(Mouse|$s_5$)+$h_6$×P(Mouse|$s_6$)...

After calculating the probability P(w|$x_{new}$) for all of the words (all of the word features w), the annotation processing module 36 extracts the word that is indicated by the word feature w in decreasing order of the probability in accordance with a predetermined determination criteria (Step S240). The determination criteria in Step S240 may be arbitrarily defined. That is, the words may be extracted in decreasing order of the probability P(w|$x_{new}$). Further, it is possible to extract the words corresponding to probabilities P(w|$x_{new}$) higher than a threshold value that is predetermined with regard to the probability P(w|$x_{new}$). In the example of FIG. 10, the words are extracted in an order of "Cat", "Mouse", and "Dog" when P(Cat|$x_{new}$)>P(Mouse|$x_{new}$)>P(Dog|$x_{new}$). The annotation processing module 36 sets the new word feature $y_{new}$ and the word feature w corresponding to the new image feature $x_{new}$ and the new word group data corresponding to the new image data based on the extracted words at Step S240 as with Step S120 in FIG. 6 and stores the data in the feature storage 40 and the data storage 21 (Step S250). Then, annotation processing module 36 terminates the routine. Thus, the words as symbols are assigned to the non-annotated image data.

As has been described above, in the image data processing system 20, the learning storage 41 stores the learning information including the projection matrices A and B obtained by the canonical correlation analysis to derive latent variables $s_i$ as the abstract concept L that connects the image with the word corresponding to the image based on at least one of the image feature $x_i$ and the word feature $y_i$, the latent variables $s_i$ obtained for each of the combinations of the image feature $x_i$ and the word feature $y_i$ using the projection matrices A and B, and information required to obtain the probability P(x|$s_i$) of occurrence of the arbitrary image feature x from the latent variable $s_i$ and the probability P(y|$s_i$) of occurrence of the arbitrary word feature y from the latent variable $s_i$. Accordingly, in the image data processing system 20, the probability P(w|$x_{new}$) of occurrence of the word feature w from the image feature $x_{new}$ can be easily and speedily calculated using the learning information in accordance with the above equation (13) in response to the reception of the non-annotated image data into the management computer 30. Thus, it is possible to perform the high-speed and high-accuracy annotation that, for example, assigns the word to the non-annotated image in decreasing order of the probability P(w|$x_{new}$). Further, in the embodiment, the new word feature $y_{new}$ corresponding to the new image feature $x_{new}$ is set (Step S250), so that new image feature $x_{new}$ and the new word feature $y_{new}$ can be used as a new data set when performing a learning information update routine that will be described later.

FIG. 11 illustrates results of experiments for evaluating correctness of the annotation routine using "Corel5k" data sets. As shown in FIG. 11, the results of "Proposed (1$^{st}$ order)" and "Proposed (2$^{nd}$ order)" respectively have a larger "Mean F-value" indicating a comprehensive experimental result and a higher annotation performance than another conventional method. "Proposed (1$^{st}$ order)" in FIG. 11 uses the higher-order local auto-correlation feature of 1$^{st}$-order as the image feature and "Proposed (2$^{nd}$ order)" in FIG. 11 uses the higher-order local auto-correlation feature of 2$^{nd}$-order as the image feature. In this case, "Proposed (1$^{st}$ order)" allows a faster processing in comparison with "Proposed (2$^{nd}$ order)".

(Retrieval Routine)

Subsequently, the retrieval routine executed by the retrieval processing module 38 of the management computer 30 will be described. First, a basic theory of the retrieval routine will be described before a detailed explanation of the retrieval routine. As described above, the retrieval for retrieving the image data corresponding to the desired word group from a plurality of non-annotated image data can be performed by calculating the probability of occurrence of the word feature based on the word group from the image feature of the non-annotated image data. That is, it is possible to retrieve the non-annotated image data corresponding to the desired word group from multiple non-annotated image data by calculating the probability of occurrence of the word feature based on the word group from the image feature of the non-annotated image data for each image feature and retrieving the non-annotated image data in decreasing order of the probability. When $x_j$ represents the non-annotated image feature (where j=1, . . . , N, N represents total numbers of the non-annotated image features) and $y_{new}$ represents a retrieval word feature that is the word feature based on the word group corresponding to the retrieval query for retrieving the image data, a probability $P(y_{new}|x_j)$ of occurrence of the retrieval word feature $y_{new}$ from the non-annotated first feature $x_j$ can be expressed as a following equation (22) using the Bayes theorem and the above equation (0). Further, the probability $P(y_{new}|x_i)$ can be calculated in accordance with a following equation (23) that is obtained by deforming the equation (22) by using the latent variables $\{s_i\}^n_{i=1}$ as the abstract concept L and $P(s_i)=1/n$.

$$P(y_{new} | x_j) = \frac{P(y_{new}, x_j)}{P(x_j)} \quad (22)$$

$$= \frac{\int P(x_j | L) P(y_{new} | L) P(L) dL}{P(x_j)}$$

$$= \frac{\int P(x_j | L) P(y_{new} | L) P(L) dL}{\int P(x_j | L) P(L) dL}$$

$$P(y_{new} | x_j) = \frac{\int P(x_j | L) P(y_{new} | L) P(L) dL}{\int P(x_j | L) P(L) dL} \quad (23)$$

$$= \frac{\frac{1}{n}\sum_{i=1}^{n} P(x_j | s_i) P(y_{new} | s_i)}{\frac{1}{n}\sum_{i=1}^{n} P(x_j | s_i)}$$

$$= \frac{\sum_{i=1}^{n} P(x_j | s_i) P(y_{new} | s_i)}{\sum_{i=1}^{n} P(x_j | s_i)}$$

Figure 12:
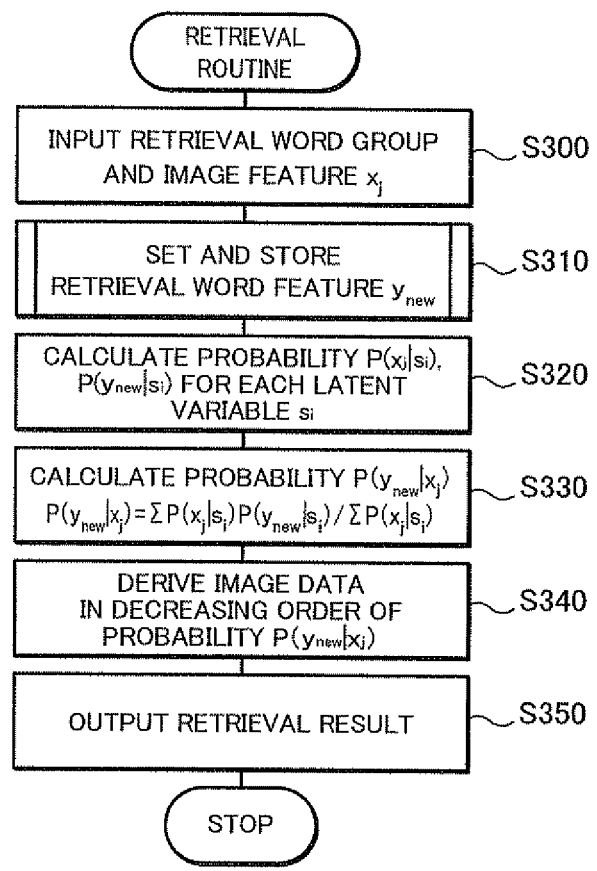
FIG. 12 is a flowchart illustrating an example of a retrieval routine executed by a management computer 30 in the embodiment.

Next, the retrieval routine based on the above basic theory will be described with reference to FIG. 12. The annotation routine shown in FIG. 12 is basically executed by the retrieval processing module 38 of the management computer 30 in response to the input of at least one word as the retrieval query from an user via the terminal device 50 and the like to the retrieval query reception module 37. At a start of the retrieval routine of FIG. 12, the retrieval processing module 38 receives a word group (at least one word) as the retrieval query from the retrieval query reception module 37 and all of the non-annotated image features $x_j$ from the feature storage 40 (Step S300). Then, the retrieval processing module 38 directs the word feature extracting module 34 to set the retrieval word feature $y_{new}$. The word feature extracting module 34 sets the retrieval word feature $y_{new}$ based on the word group input at Step S300 as with Step S120 of FIG. 6 and stores the set retrieval word feature $y_{new}$ in the data storage 21 (Step S310).

Figure 13:
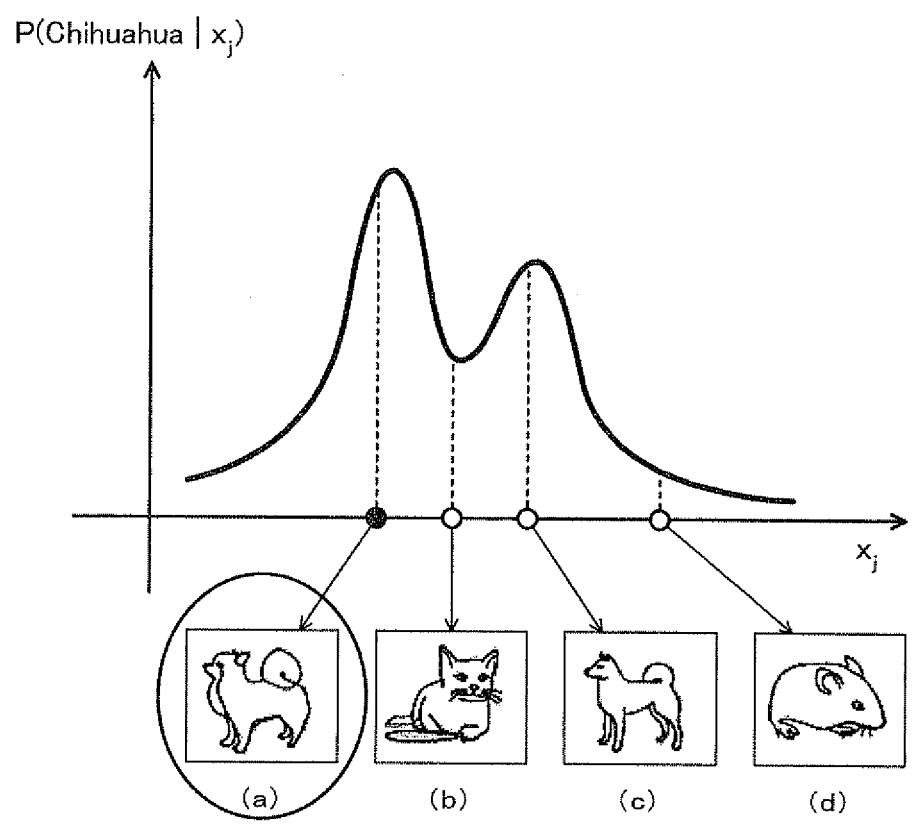
FIG. 13 is a view illustrating a procedure for retrieving a non-annotated image data based on a word as a symbol.

After setting the retrieval word feature $y_{new}$, the retrieval processing module 38 calculates probabilities of $P(x_j|s_i)$ of occurrence of the non-annotated image feature $x_j$ from the latent variable $s_i$ for all of the latent variables $s_i$ and all of the non-annotated image features $x_j$ and probabilities $P(y_{new}|s_i)$ of occurrence of the retrieval word feature $y_{new}$ from the latent variable $s_i$ for each of the latent variables $s_i$ using the probability density distribution $P(x|s_i)$ stored in the learning storage 41 for each latent variable $s_i$ (Step S320). After the process of Step S320, the retrieval processing module 38 calculates the probability $P(y_{new}|x_j)$ of occurrence of the retrieval word feature $y_{new}$ from the non-annotated image feature $x_j$ for each non-annotated image feature $x_j$ in accordance with the above equation (23) (Step S330). After calculating the probability $P(y_{new}|x_j)$ for each non-annotated image feature $x_j$, the retrieval processing module 38 derives the non-annotated image data corresponding to the non-annotated image feature $x_j$ from the data storage 21 in decreasing order of the probability $P(y_{new}|x_j)$ in accordance with a predetermined determination criteria (Step S340) and provides the result output module 39 with derived data. The determination criteria in Step S340 may be arbitrarily defined. That is, a predetermined number of the non-annotated image data may be derived in decreasing order of the probability $P(y_{new}|x_j)$. Further, it is possible to derive the non-annotated image data corresponding to probabilities $P(y_{new}|x_j)$ higher than a threshold value that is predetermined with regard to the probability $F(y_{new}|x_j)$. Assuming that a calculation result a probability $P(Chihuahua|x_j)$ becomes as shown in FIG. 13 when deriving the non-annotated image data by ranking with an entry of word "Chihuahua" (as the retrieval word feature $y_{new}$), the non-annotated image data are derived in order of image (a), image (c), image (b) and image (d) for example because P(Chihuahua|image (a))>P(Chihuahua|image (c))>P(Chihuahua|image (b))>P(Chihuahua|image (d)) as shown in FIG. 13. The result output module 39 provides the terminal device 50 and the like as an inquiry with the result of the retrieval process in a predetermined form (Step S350). Then, retrieval processing module 38 terminates the routine.

As has been described above, in the image data processing system 20, the learning storage 41 stores the learning information including the projection matrices A and B obtained by the canonical correlation analysis to derive latent variables $s_i$ as the abstract concept L that connects the image with the word corresponding to the image based on at least one of the image feature $x_i$ and the word feature $y_i$, the latent variables $s_i$ obtained for each of the combinations of the image feature $x_i$ and the word feature $y_i$ using the projection matrices A and B, and information required to obtain the probability $P(x|s_i)$ of occurrence of the arbitrary image feature x from the latent variable $s_i$ and the probability $P(y|s_i)$ of occurrence of the arbitrary word feature y from the latent variable $s_i$. Accordingly, in the image data processing system 20, the probability $P(y_{new}|x_j)$ of occurrence of the retrieval word feature $y_{new}$ from the non annotated image feature $x_j$ can be easily and speedily calculated using the learning information in accordance with the above equation (14) in response to the reception of the input of at least one word (retrieval query) by the retrieval query reception module 37. Thus, it is possible to perform the high-speed and high-accuracy retrieval that, for example, derives the non-annotated image data corresponding to the non-annotated image feature $x_j$ in decreasing order of the probability $P(y_{new}|x_j)$.

(Learning Information Update Routine)

Subsequently, the learning information update routine executed in the image data processing system 20 will be described. The combination of the image data as the first data indicating the real-world information and the word group data as the second data corresponding to the first data dealt with in the image data processing system 20, that is, the combination of the image feature $x_i$ and the word feature $y_i$ basically increases to an unlimited extent. Accordingly, the management computer 30 requires an enormous amount of computational cost if calculating the information to obtain the transformations, the latent variables, and the information for obtaining the probabilities by the canonical correlation analysis and the like for all combinations including the combination of the new image feature and the new word feature every occurrence of the combination of the new image feature and the new word feature corresponding to the new image feature. Therefore, in the image data processing system 20 of the embodiment, the learning information update routine is performed to update the projection matrices A and B, latent variables $s_i$ and the like based on the new image feature and the new word feature every occurrence of the combination of the new image feature and the new word feature corresponding to the new image feature.

A basic theory of the learning information update routine will be described before a detailed explanation of the learning information update routine. In a principal component analysis of $\tilde{x}=x-m_x$ and $\tilde{y}=y-m_y$ in the above equations (1)-(4) where $E_x$ and $E_y$ respectively represent coefficient matrix, principal components g, h of the $\tilde{x}$, $\tilde{y}$ expressed as a following equation (24) and the coefficient matrices $E_x$ and $E_y$ are obtained as solutions of an eigenvalue problem of a following equation (25) ($\Lambda_x$ and $\Lambda_y$ respectively represent a diagonal matrix having diagonal elements equal to eigenvalues in the equation (25)). When projecting the principal components g, h in accordance with a following equation (26), the coefficient matrix becomes the unit matrix in the projection space. Further, in a canonical correlation analysis (refer to a following equation (27)) between a first uncorrelated component u obtained by an uncorrelation of the first feature (image feature) x and a second uncorrelated component v obtained by the uncorrelation of the second feature (word feature) y, the eigenvalue problem of the equation (3) can be simplified as a following equation (28) that corresponds to a singular value decomposition (SVD) of a covariance matrix $C_{uv}$. Accordingly, the canonical correlation analysis for solving the eigenvalue problem of the equation (3) can be dealt with as the singular value decomposition of the covariance matrix $C_{uv}$ in a normalized space. The canonical correlation analysis can be sequentially performed as follow by separating a process for the uncorrelation that solves the eigenvalue problem of the first and second feature x, y and the singular value decomposition of the covariance matrix $C_{uv}$ from each other.

$$\left.\begin{aligned} g &= E_x^T \tilde{x} \\ h &= E_y^T \tilde{y} \end{aligned}\right\} \quad (24)$$

$$\left.\begin{aligned} C_{\tilde{x}\tilde{x}} E_x &= E_x \Lambda_x \ (E_x^T E_x = I_p) \\ C_{\tilde{y}\tilde{y}} E_y &= E_y \Lambda_y \ (E_y^T E_y = I_q) \end{aligned}\right\} \quad (25)$$

$$\left.\begin{aligned} u &= \Lambda_x^{-1/2} g \\ v &= \Lambda_y^{-1/2} h \end{aligned}\right\} \quad (26)$$

$$\left.\begin{aligned} s &= E_u^T u \\ t &= E_v^T v \end{aligned}\right\} \quad (27)$$

$$\left.\begin{aligned} C_{uv} C_{vu} E_u &= E_u \Lambda^2 \\ C_{vu} C_{uv} E_v &= E_v \Lambda^2 \\ C_{uv} &= \frac{1}{n} \sum_{i=1}^{n} u_i v_i^T \\ &= C_{vu}^T \end{aligned}\right\} \quad (28)$$

Processes for sequentially uncorrelating the first and second features x and y (first and second uncorrelated component obtaining processes) will be described. In the embodiment, the matrix $E_x$ having eigenvectors as column vectors shown in a following equation (29) and the matrix $\Lambda_x$ obtained by diagonalizing eigenvalues are obtained by solving the eigenvalue problem for the first feature x in the above equation (25) in the presence of n−1-pieces first features $x_i$ using CCIPCA (J. Weng, Y. Zhang, and W. Hwang. Candid Covariance-Free Incremental Principal Component Analysis. IEEE Trans, on. PAMI, Vol. 25, No. 8, pp. 1034-1040, 2003.). Further, $j^{th}$ eigenvector $\omega_{xj}(n-1)$ (where j=1, ..., p) is calculated based on the each column vector of the matrix $E_x$ and the matrix $\Lambda_x$ in accordance with a following equation (31) where p represents an order of the first feature x.

$$E_x = (e_{x1}(n-1), e_{x2}(n-1), \ldots, e_{xp}(n-1)) \quad (29)$$

$$\Lambda_x = \mathrm{diag}(\lambda_{x1}(n-1), \ldots, \lambda_{xp}(n-1)) \quad (30)$$

$$\left.\begin{aligned} \omega_{x1}(n-1) &= \lambda_{x1}(n-1) e_{x1}(n-1) \\ &\vdots \\ \omega_{xp}(n-1) &= \lambda_{xp}(n-1) e_{xp}(n-1) \end{aligned}\right\} \quad (31)$$

Assuming that $n^{th}$ first feature $x_n$ occurs together with the second feature $y_n$ corresponding to the $n^{th}$ first feature $x_n$ when the matrices $E_x$, $\Lambda_x$ and an eigenvector $\omega_{xj}(n-1)$ are previously obtained for n−1-pieces first feature $x_i$, a mean value $m_x(i)$ of n-pieces first feature $x_i$ is estimated and obtained in accordance with a following equation (32) and a deviation $\tilde{x}_1(n)$ for j=1 is obtained in accordance with a following equation (33). Then, $j^{th}$ eigenvector $\omega_{xj}(n)$ in a following equation (34), an eigenvalue $\lambda_{xj}(n)$ in a following equation (35), a normalized eigenvector $e_{xj}(n)$ in a following equation (36), and a residual vector $\tilde{x}_{j+1}(n)$ in a following equation (37) are repeatedly calculated for j:1-p. Thus, the matrices $E_x(n)$, $\lambda_x(n)$ as mappings on an eigen space with regard to n-pieces first feature $x_i$ and a new first uncorrelated component u(n) can be obtained as the above equation (9).

$$m_x(n) = \frac{n-1}{n} m_x(n-1) + \frac{1}{n} x(n) \quad (32)$$

$$\tilde{x}_1(n) = x(n) - m_x(n) \quad (33)$$

$$\omega_{xj}(n) = \frac{n-1-l}{n} \omega_{xj}(n-1) + \frac{1+l}{n} \tilde{x}_j(n) \tilde{x}_j^T(n) \frac{\omega_{xj}(n-1)}{\|\omega_{xj}(n-1)\|} \quad (34)$$

$$\lambda_{xj}(n) = \|\omega_{xj}(n)\| \quad (35)$$

$$e_{xj}(n) = \frac{\omega_{xj}(n)}{\|\omega_{xj}(n)\|} \quad (36)$$

$$\tilde{x}_{j+1}(n) = \tilde{x}_j(n) - \tilde{x}_j^T(n) \frac{\omega_{xj}(n-1)}{\|\omega_{xj}(n-1)\|} \frac{\omega_{xj}(n-1)}{\|\omega_{xj}(n-1)\|} \quad (37)$$

Similarly, when the matrices $E_y$, $\Lambda_y$ and an eigenvector $\omega_{yj}(n-1)$ are previously obtained for n−1-pieces second feature $y_i$ using following equations (38)-(40) and $n^{th}$ second feature $y_n$ occurs together with the first feature $x_n$ corresponding to the $n^{th}$ second feature $y_n$, calculation of following equations (41) and (42) are executed, $j^{th}$ eigenvector $\omega_{yj}(n)$ in a following equation (43), an eigenvalue $\lambda_{yj}(n)$ in a following equation (44), a normalized eigenvector $e_{yj}(n)$ in a following equation (45), and a residual vector $y_{j+1}^\sim(n)$ in a following equation (46) are repeatedly calculated for j:1-q (where q represents an order of the second feature y). Thus, the matrices $E_y(n)$, $\lambda_y(n)$ as mappings on an eigen space with regard to n-pieces second feature $y_i$ and a new second uncorrelated component v(n) can be obtained as the above equation (10).

$$Ey = (e_{y1}(n-1), e_{y2}(n-1), \ldots, e_{yq}(n-1)) \quad (38)$$

$$\Lambda_y = \mathrm{diag}(\lambda_{y1}(n-1), \ldots, \lambda_{yq}(n-1)) \quad (39)$$

$$\left.\begin{array}{c}\omega_{y1}(n-1) = \lambda_{y1}(n-1)e_{y1}(n-1) \\ \vdots \\ \omega_{yq}(n-1) = \lambda_{yq}(n-1)e_{yq}(n-1)\end{array}\right\} \quad (40)$$

$$m_y(n) = \frac{n-1}{n}m_y(n-1) + \frac{1}{n}y(n) \quad (41)$$

$$\tilde{y}_1(n) = y(n) - m_y(n) \quad (42)$$

$$\omega_{yj}(n) = \frac{n-1-l}{n}\omega_{yj}(n-1) + \frac{1+l}{n}\tilde{y}_j(n)\tilde{y}_j^T(n)\frac{\omega_{yj}(n-1)}{\|\omega_{yj}(n-1)\|} \quad (43)$$

$$\lambda_{yj}(n) = \|\omega_{yj}(n)\| \quad (44)$$

$$e_{yj}(n) = \frac{\omega_{yj}(n)}{\|\omega_{yj}(n)\|} \quad (45)$$

$$\tilde{y}_{j+1}(n) = \tilde{y}_j(n) - \tilde{y}_j^T(n)\frac{\omega_{yj}(n-1)}{\|\omega_{yj}(n-1)\|}\frac{\omega_{yj}(n-1)}{\|\omega_{yj}(n-1)\|} \quad (46)$$

Next, a procedure for sequentially performing the singular value decomposition of the covariance matrix $C_{uv}$ will be described. The procedure sequentially solves the above equation (28). Here, column vectors a, b of each element of each of the projection matrices A and B are dealt with instead of the matrices A and B. Thus, the equation (28) can be deformed as a following equation (47). In the equation (47), $\lambda^2$ represents an eigenvalue corresponding to vectors a, b. In a equation (48) that is an upper equation in the equation (47), covariance matrices $C_{uv}$, $C_{vu}$ are respectively replaced by an expression using a sample, the vector a is replaced by an estimate a(n) at an acquisition of a $n^{th}$ sample. When $Z_u(n)$ represents a canonical correlation coefficient vector regarding the new first uncorrelated component u(n) and an equation: $Z_u(n) = \lambda^2 a = C_{uv}C_{vu}a$ is satisfied, the canonical correlation coefficient vector $Z_u(n)$ can be expressed as a following equation (49). Further, the equation (49) can be deformed as a following equation (50). After obtaining the equation (50), there is a necessity to obtain the estimate a(n). In this case, a(n)=$Z_u$(n−1)/||$Z_u$(n−1)|| based on a relationship of a=$Z_u$/||$Z_u$|| can be substituted into the equation (50), so that a following equation (51) can be obtained. Further, a following equation (52) is satisfied from the equation (48) and $C_{vu}$=$\lambda$b is satisfied in the process of obtaining the canonical correlation analysis equation (47). Using these relationships, a following equation (53) is satisfied. Moreover, an estimate of $\lambda$(n−1) can be expressed as a following equation (54). Thus, the equation (53) can be deformed as a following equation (55) using the equation (54).

$$\left.\begin{array}{c}C_{uv}C_{vu}a = \lambda^2 a \\ C_{vu}C_{uv}b = \lambda^2 b\end{array}\right\} \quad (47)$$

$$C_{uv}C_{vu}a = \lambda^2 a \quad (48)$$

$$z_u(n) = \left(\frac{1}{n}\sum_{i=1}^{n}u(i)v^T(i)\right)\left(\frac{1}{n}\sum_{i=1}^{n}v(i)u^T(i)\right)a(n) \quad (49)$$

$$z_u(n) = \left(\frac{1}{n}\sum_{i=1}^{n}u(i)v^T(i)\right)\left(\frac{1}{n}\sum_{i=1}^{n}v(i)u^T(i)\right)a(n) \quad (50)$$

$$= \left(\frac{n-1}{n}\frac{1}{n-1}\sum_{i=1}^{n-1}u(i)v^T(i) + \frac{1}{n}u(n)v^T(n)\right)$$

$$\left(\frac{n-1}{n}\frac{1}{n-1}\sum_{i=1}^{n-1}v(i)u^T(i) + \frac{1}{n}v(n)u^T(n)\right)a(n)$$

$$= \left(\frac{n-1}{n}C_{uv}(n-1) + \frac{1}{n}u(n)v^T(n)\right)$$

$$\left(\frac{n-1}{n}C_{vu}(n-1) + \frac{1}{n}v(n)u^T(n)\right)a(n)$$

$$= \begin{pmatrix}\left(\frac{n-1}{n}\right)^2 C_{uv}(n-1)C_{vu}(n-1) + \\ \frac{n-1}{n}\frac{1}{n}C_{uv}(n-1)v(n)u^T(n) + \\ \frac{1}{n}\frac{n-1}{n}u(n)v^T(n)C_{vu}(n-1) + \\ \left(\frac{1}{n}\right)^2 u(n)v^T(n)v(n)u^T(n)\end{pmatrix}a(n)$$

$$z_u(n) = \begin{pmatrix}\left(\frac{n-1}{n}\right)^2 C_{uv}(n-1)C_{vu}(n-1) + \\ \frac{n-1}{n}\frac{1}{n}C_{uv}(n-1)v(n)u^T(n) + \\ \frac{1}{n}\frac{n-1}{n}u(n)v^T(n)C_{vu}(n-1) + \\ \left(\frac{1}{n}\right)^2 u(n)v^T(n)v(n)u^T(n)\end{pmatrix}\frac{z_u(n-1)}{\|z_u(n-1)\|} \quad (51)$$

$$C_{uv}(n-1)C_{vu}(n-1)\frac{z_u(n-1)}{\|z_u(n-1)\|} = z_u(n-1) \quad (52)$$

$$C_{vu}(n-1)\frac{z_u(n-1)}{\|z_u(n-1)\|} = \frac{1}{\|z_u(n-1)\|}\lambda(n-1)z_v(n-1) \quad (53)$$

$$\lambda(n-1) \approx \|z_u(n-1)\|^{1/2} = \|z_v(n-1)\|^{1/2} \quad (54)$$

$$C_{vu}(n-1)\frac{z_u(n-1)}{\|z_u(n-1)\|} = \frac{z_v(n-1)}{\|z_v(n-1)\|^{1/2}} \quad (55)$$

When rearranging the equation (51) by applying the equations (52) and (55) to the equation (51), the canonical correlation coefficient vector $Z_u(n)$ can be expressed as a following equation (56). Similarly, when, in a lower equation ($C_{vu}C_{uv}b = \lambda^2 b$) of the above equation (47), $Z_v(n)$ represents a canonical correlation coefficient vector regarding the new second uncorrelated component v(n) and an equation: $Z_v(n) = \lambda^2 b = C_{vu}C_{uv}b$ is satisfied, the canonical correlation coefficient vector $Z_v(n)$ can be expressed as a following equation (57). When the number of the samples (total number of the data set) is enormous, relationships of $((n-1)/n)^2 \approx (n-2)/n$ and $(n-1)/n^2 \approx 1/n$ are satisfied. By using these relationships, the equation (56) and (57) can be deformed as following equations (58) and (59). It is interpretable that the equations (58) and (59) indicate a relationship: (new canonical coefficient vector)=(weight)×(old canonical coefficient vector)+(1-weigh)× (canonical coefficient vector obtained from input data u(n) and v(n)).

$$z_u(n) = \left(\frac{n-1}{n}\right)^2 z_u(n-1) + \frac{n-1}{n^2} u(n) v^T(n) \frac{z_v(n-1)}{\|z_v(n-1)\|^{1/2}} + \frac{1}{n} C_{uv}(n) v(n) u^T(n) \frac{z_u(n-1)}{\|z_u(n-1)\|} \quad (56)$$

$$z_v(n) = \left(\frac{n-1}{n}\right)^2 z_v(n-1) + \frac{n-1}{n^2} v(n) u^T(n) \frac{z_u(n-1)}{\|z_u(n-1)\|^{1/2}} + \frac{1}{n} C_{vu}(n) u(n) v^T(n) \frac{z_v(n-1)}{\|z_v(n-1)\|} \quad (57)$$

$$z_u(n) = \left(\frac{n-2}{n}\right) z_u(n-1) + \frac{2}{n}\left(\begin{array}{l}\frac{1}{2} u(n) v^T(n) \frac{z_v(n-1)}{\|z_v(n-1)\|^{1/2}} + \\ \frac{1}{2} C_{uv}(n) v(n) u^T(n) \frac{z_u(n-1)}{\|z_u(n-1)\|}\end{array}\right) \quad (58)$$

$$z_v(n) = \left(\frac{n-2}{n}\right) z_v(n-1) + \frac{2}{n}\left(\begin{array}{l}\frac{1}{2} v(n) u^T(n) \frac{z_u(n-1)}{\|z_u(n-1)\|^{1/2}} + \\ \frac{1}{2} C_{vu}(n) u(n) v^T(n) \frac{z_v(n-1)}{\|z_v(n-1)\|}\end{array}\right) \quad (59)$$

Further examining the equation (58), when using relationships of following equations (60) and (61), the equation (58) can be expressed as a following equation (62). In the equation (62), $v^T(n) \cdot Z_v(n-1)$ represents an inner product between $v(n)$ and $Z_v(n-1)$ and is a scalar indicating a similarity between the two vectors, that is, an amount indicating how the a new input vector $v(n)$ resembles the canonical correlation coefficient vector $Z_v(n-1)$. Therefore, the component $1/\lambda(n-1) \cdot u(n) \cdot v^T(n) \cdot Z_v(n-1)$ in the second term of the equation (62) is obtained by scaling $u(n)$ in accordance with the similarity between the input vector $v(n)$ at the other end and the canonical correlation coefficient vector $Z_v(n-1)$ at the other end, and the front-end component $1/\lambda(n-1)$ represents a normalized term for setting a norm of the vector of the component to $\lambda^2$. Further, the second term of the equation (62) $1/n(1/\lambda(n-1) \cdot u(n) \cdot v^T(n) \cdot Z_v(n-1) - Z_u(n-1))$ is equivalent to a product of $1/n$ and a difference between the input $u(n)$ that is scaled in accordance with the similarity to the canonical correlation coefficient vector $Z_v(n-1)$ of the input vector $V(n)$ at the other end and the canonical correlation coefficient vector $Z_u(n-1)$ at an $u(n)$ side. On the other hand, $u^T(n) \cdot Z_u(n-1)$ in the equation (62) represents an amount indicating how the a new input vector $u(n)$ resembles the canonical correlation coefficient vector $Z_u(n-1)$. Therefore, the component $\lambda^-(n)/\lambda^2(n-1) \cdot u^-(n) \cdot u^T(n) \cdot Z_u(n-1)$ in the third term of the equation (62) is obtained by scaling $u^-(n)$ in accordance with the similarity between the input vector $v(n)$ at the other end and the canonical correlation coefficient vector $Z_v(n-1)$ at the other end, and the front-end component $\lambda^-(n)/\lambda^2(n-1)$ represents a normalized term for setting a norm of the vector of the component to $\lambda 2$ (where the superscript "-" in $u^-(n)$ and $\lambda^-(n)$ denotes "upper line (estimate)", the same shall apply hereinafter). Considering that the $u^-(n)$ is obtained from the relationship of the above equation (61), the $u^-(n)$ is regarded as an u-side vector estimated from the $V(n)$. Therefore, the third term of the equation (62) $1/n(\lambda^-(n)/\lambda^2(n-1) \cdot u^-(n) \cdot u^T(n) \cdot Z_u(n-1) - Z_u(n-1))$ is equivalent to a product of $1/n$ and a difference between the vector $u^-(n)$ at this end that is estimated from input $v(n)$ scaled in accordance with the similarity to the canonical correlation coefficient vector $Z_u(n-1)$ of the input vector $u(n)$ at this end and the canonical correlation coefficient vector $Z_u(n-1)$. Accordingly, it is interpretable that the new canonical correlation coefficient vector $Z_u(n)$ is obtained by slightly pulling the old canonical correlation coefficient vector $Z_u(n-1)$ in a direction of the new input vector $u(n)$ and a direction of $u^-(n)$ estimated from the $v(n)$ in accordance with the similarity of the other end. Similarly, when using relationships of following equations (63) and (64), the above equation (59) can be expressed as a following equation (65). Accordingly, it is interpretable that the new canonical correlation coefficient vector $Z_v(n)$ is obtained by slightly pulling the old canonical correlation coefficient vector $Z_v(n-1)$ in a direction of the new input vector $v(n)$ and a direction of $v^-(n)$ estimated from the $u(n)$ in accordance with the similarity of the other end.

$$\lambda^2(n-1) = \|z_u(n-1)\| = \|z_v(n-1)\| \quad (60)$$

$$C_{uv}(n) v(n) = \bar{\lambda}(n) \bar{u}(n) \quad (61)$$

$$z_u(n) = z_u(n-1) + \frac{1}{n}\left(\frac{1}{\lambda(n-1)} u(n) v^T(n) z_v(n-1) - z_u(n-1)\right) + \frac{1}{n}\left(\frac{\bar{\lambda}(n)}{\lambda^2(n-1)} \bar{u}(n) u^T(n) z_u(n-1) - z_u(n-1)\right) \quad (62)$$

$$\lambda^2(n-1) = \|z_u(n-1)\| = \|z_v(n-1)\| \quad (63)$$

$$C_{vu}(n) u(n) = \bar{\lambda}(n) \bar{v}(n) \quad (64)$$

$$z_v(n) = z_v(n-1) + \frac{1}{n}\left(\frac{1}{\lambda(n-1)} v(n) u^T(n) z_u(n-1) - z_v(n-1)\right) + \frac{1}{n}\left(\frac{\bar{\lambda}(n)}{\lambda^2(n-1)} \bar{v}(n) v^T(n) z_v(n-1) - z_v(n-1)\right) \quad (65)$$

Now, it is possible to introduce a decay rate l (typically value 2-4) in the equations (58) and (59) interpreted as above in order to further improve a convergence as with CCIPCA. Further, an effect of the canonical correlation coefficient vector obtained from the input data becomes little when the number n of the samples is enormous. Therefore, it is preferable to introduce a sensitivity rate $\alpha$ (very small positive value) in the equations (58) and (59) in order to retain the effect even if the number n of the samples becomes large. By introducing the decay rate l and the sensitivity rate $\alpha$, the equations (58) and (59) can be deformed as following equations (66) and (67). By the equations (66) and (67) obtained as described above, it is possible to estimate the canonical correlation coefficient vector based on the new first uncorrelated component $u(n)$ and the new second uncorrelated component $v(n)$ obtained in response to the occurrence of the $n^{th}$ first feature $x^n$ and the $n^{th}$ second feature $y^n$. In order to estimate a higher-order canonical correlation coefficient vector than the canonical correlation coefficient vector estimated using the equations (66) and (67), the residual vector of the canonical correlation coefficient vector estimated using the equations (66) and (67) and the input vector may be introduced as the input vector in the equations (66) and (67) again as with CCIPA. Following equations (68) and (69) are used in order to obtain the residual vector from the $j^{th}$ canonical correlation coefficient vector and the $j^{th}$ input vector.

$$z_u(n) = \left(\frac{n-2-l}{n} - \alpha\right) z_u(n-1) + \left(\frac{2+l}{n} + \alpha\right) \quad (66)$$
$$\left(\frac{1}{n} u(n) v^T(n) \frac{z_v(n-1)}{\|z_v(n-1)\|^{1/2}} + \frac{1}{2} C_{uv}(n) v(n) u^T(n) \frac{z_u(n-1)}{\|z_u(n-1)\|}\right)$$

$$z_v(n) = \left(\frac{n-2-l}{n} - \alpha\right) z_v(n-1) + \left(\frac{2+l}{n} + \alpha\right) \quad (67)$$
$$\left(\frac{1}{2} v(n) u^T(n) \frac{z_u(n-1)}{\|z_u(n-1)\|^{1/2}} + \frac{1}{2} C_{vu}(n) u(n) v^T(n) \frac{z_v(n-1)}{\|z_v(n-1)\|}\right)$$

-continued $$u_{j+1}(n) = u_j(n) - u_j^T(n)\frac{z_{uj}(n)}{\|z_{uj}(n)\|}\frac{z_{uj}(n)}{\|z_{uj}(n)\|} \quad (68)$$

$$v_{j+1}(n) = v_j(n) - v_j^T(n)\frac{z_{vj}(n)}{\|z_{vj}(n)\|}\frac{z_{vj}(n)}{\|z_{vj}(n)\|} \quad (69)$$

In summary, the sequential singular value decomposition of the covariance matrix $C_{uv}$ can be performed as a following procedure. That is, in the presence of combinations of n–1-pieces new first uncorrelated component u(1)–u(n–1) and n–1-pieces new second uncorrelated component v(1)–v(n–1), the singular value decomposition (SVD) of the covariance matrix $C_{uv}$ in the equation (28) is performed based on the data, and an estimate of the covariance matrix is set in accordance with a following equation (70). Then, r is defined as r=min{p, q}, matrices Eu, Ev and Λ are defined as in an equation (71), and the $j_{th}$ (where j=1, . . . , r) canonical correlation coefficient vectors $Z_{u}j(n-1)$ and $Z_{v}j(n-1)$ are calculated in accordance with a following equation (72) from each column vector of the matrices Eu, Ev and the matrix Λ.

$$\left.\begin{array}{l}\overline{C}_{uv}(n-1) = E_u\Lambda E_v^T \\ \overline{C}_{vu}(n-1) = E_v\Lambda E_u^T\end{array}\right\} \quad (71)$$

$$\left.\begin{array}{l}E_u = (e_{u1}(n-1), e_{u2}(n-1), \ldots, e_{u\gamma}(n-1)) \\ E_v = (e_{v1}(n-1), e_{v2}(n-1), \ldots, e_{v\gamma}(n-1)) \\ \Lambda^2 = \text{diag}(\lambda_1^2(n-1), \ldots, \lambda_\gamma^2(n-1))\end{array}\right\} \quad (72)$$

$$\left.\begin{array}{l}z_{u1}(n-1) = \lambda_1^2(n-1)e_{u1}(n-1) \\ \vdots \\ z_{u\gamma}(n-1) = \lambda_\gamma^2(n-1)e_{u\gamma}(n-1) \\ z_{v1}(n-1) = \lambda_1^2(n-1)e_{v1}(n-1) \\ \vdots \\ z_{vr}(n-1) = \lambda_r^2(n-1)e_{vr}(n-1)\end{array}\right\} \quad (73)$$

Assuming that $n^{th}$ new first uncorrelated component u(n) and $n^{th}$ new second uncorrelated component v(n) occur when the matrices $E_u$, $E_v$ an Λ, canonical correlation coefficient vectors $Z_{uj}(n-1)$ and $Z_{vj}(n-1)$ for the combinations of n–1-pieces new first uncorrelated component u(1)–u(n–1) and n–1-pieces new second uncorrelated component v(1)–v(n–1) are previously obtained, $u_1(n)$ and $v_1(n)$ are initialized as $u_1(n) = u(n)$, $v_1(n) = v(n)$ using the new first uncorrelated component u(n) and the new second uncorrelated component v(n). Then, the covariance matrices are updated in accordance with following equations (73) and (74). In the equation (73) and (74), l represents the decay rate and α represents the sensitivity rate. Further, $j^{th}$ eigenvectors $Z_{uj}(n)$, $Z_{vj}(n)$ in following equations (75) and (76) based on the above equations (66) and (67), eigenvalues $\lambda_{uj}(n)$, $\lambda_{vj}n$ in a following equation (77), normalized eigenvectors $e_{uj}(n)$, $e_{vj}(n)$ in a following equation (78), and residual vectors $u_{j+1}(n)$ and $v_{j+1}(n)$ in the above equations (68) and (69) are repeatedly calculated for j:1–r. Thus, matrices $E_u(n)$, $E_v(n)$, $\Lambda_u(n)$, and $\Lambda_v(n)$ and estimates of covariance matrices $C^-_{uv}(n)$, $C^-_{vu}(n)$ are obtained as results of the singular value decomposition as in following equations (79), (80) and (81).

$$Cc_{uv}(n) = \left(\frac{n-1-l}{n} - \alpha\right)\overline{C}_{uv}(n-1) + \left(\frac{1+l}{n} + \alpha\right)u_1(i)v_1^T(n) \quad (73)$$

$$Cc_{vu}(n) = \left(\frac{n-1-l}{n} - \alpha\right)\overline{C}_{vu}(n-1) + \left(\frac{1+l}{n} + \alpha\right)v_1(n)u_1^T(n) \quad (74)$$

$$z_{uj}(n) = \left(\frac{n-2-l}{n} - \alpha\right)z_{uj}(n-1) + \quad (75)$$
$$\left(\frac{2+l}{n} + \alpha\right)\left(\begin{array}{l}\frac{1}{2}u_j(n)v_j^T(n)\frac{z_{vj}(n-1)}{\|z_{vj}(n-1)\|^{1/2}} + \\ \frac{1}{2}Cc_{uv}(n)v_j(n)u_j^T(n)\frac{z_{uj}(n-1)}{\|z_{uj}(n-1)\|}\end{array}\right)$$

$$z_{vj}(n) = \left(\frac{n-2-l}{n} - \alpha\right)z_{vj}(n-1) + \left(\frac{2+l}{n} + \alpha\right) \quad (76)$$
$$\left(\frac{1}{2}v_j(n)u_j^T(n)\frac{z_{uj}(n-1)}{\|z_{uj}(n-1)\|^{1/2}} + \frac{1}{2}Cc_{vu}(n)u_j(n)v_j^T(n)\frac{z_{vj}(n-1)}{\|z_{vj}(n-1)\|}\right)$$

$$\left.\begin{array}{l}\lambda_{uj}^2(n) = \|z_{uj}(n)\| \\ \lambda_{vj}^2(n) = \|z_{vj}(n)\|\end{array}\right\} \quad (77)$$

$$\left.\begin{array}{l}e_{uj}(n) = \frac{z_{uj}(n)}{\|z_{uj}(n)\|} \\ e_{vj}(n) = \frac{z_{vj}(n)}{\|z_{vj}(n)\|}\end{array}\right\} \quad (78)$$

$$\left.\begin{array}{l}E_u(i) = (e_{u1}(i), \ldots, e_{ur}(i)) \\ E_v(i) = (e_{v1}(i), \ldots, e_{vr}(i))\end{array}\right\} \quad (79)$$

$$\left.\begin{array}{l}\Lambda_u(i) = \text{diag}(\lambda_{u1}(i), \ldots, \lambda_{ur}(i)) \\ \Lambda_v(i) = \text{diag}(\lambda_{v1}(i), \ldots, \lambda_{vr}(i))\end{array}\right\} \quad (80)$$

$$\left.\begin{array}{l}\overline{C}_{uv}(i) = E_u(i)\Lambda_u(i)E_v'(i) \\ \overline{C}_{vu}(i) = E_v(i)\Lambda_v(i)E_u'(i)\end{array}\right\} \quad (81)$$

As described above, the matrices $E_x(n)$, $E_y(n)$, $\Lambda_x(n)$, and $\Lambda_y(n)$ as mappings on an eigen space with regard to n-pieces first feature $x_i$ and n-pieces second feature $y_i$, the new first uncorrelated component u(n) and the new second uncorrelated component v(n) are obtained by the first and second uncorrelated component obtaining processes, and the matrices $E_u(n)$, $E_v(n)$ are obtained by the sequential singular value decomposition of the covariance matrix $C_{uv}$. Thus, it is possible to obtain new projection matrices A(n) and B(n) corresponding to n-pieces combinations of the first and second features in accordance with the above equation (12) in response to the occurrence of the $n^{th}$ first feature $x^n$ and the $n^{th}$ second feature $y^n$. When using the results of the sequential singular value decomposition of the covariance matrix $C_{uv}$, the canonical correlation coefficient Λ(n) corresponding to n-pieces combinations of the first and second features can be estimated in accordance with a following equation (82).

$$\Lambda(n) = \frac{1}{2}(\Lambda_u(n) + \Lambda_v(n)) \quad (82)$$

Figure 14:
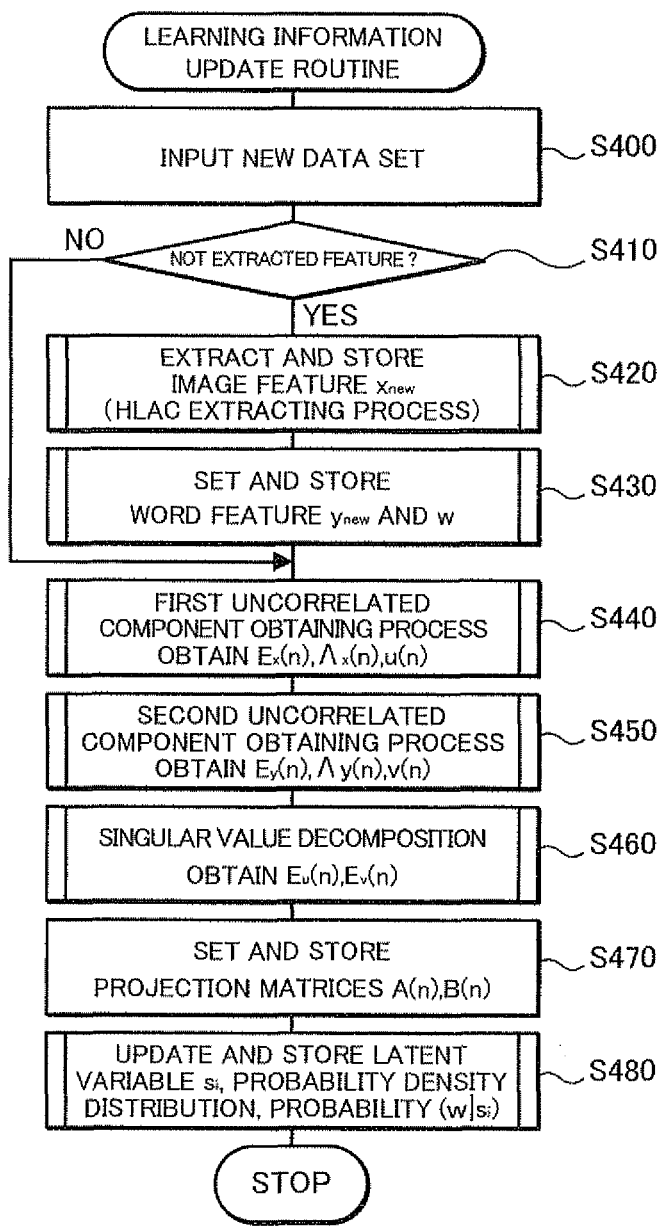
FIG. 14 is a flowchart illustrating an example of a learning information update routine executed by a management computer 30 in the embodiment.

Next, the learning information update routine based on the above basic theory will be described with reference to FIG. 14. The learning information update routine in FIG. 14 is executed by the learning processing module 35 of the management computer 30 when the new combination of the image data and the word group data is input to the management computer 30, or when the combination of the new image feature $x_{new}$ and the new word feature $y_{new}$ is set by the annotation routine. At a start of the learning information update routine, the learning processing module 35 receives the new image data and the new word group data from the data reception module 32 or the data storage 21, or the new image feature $x_{new}$ and the new word feature $y_{new}$ from the feature storage 40 (Step S400). When determined that the new image data and the new word group data are received from the data reception module 32 and the like (Step S410), the learning processing module 35 directs the image feature extracting module 33 to extract the new image feature $x_{new}$ (=$x_n$) from the image data. The image feature extracting module 33 extracts the new image feature $x_{new}$ from each image data input at Step S400 and stores the extracted new image feature $x_{new}$ in a predetermined storage location of the feature storage 40 (Step S420). Further, the learning processing module 35 directs the word feature extracting module 34 to set the new word feature $y_{new}$ based on the new word group data and the word feature w. The word feature extracting module 34 sets the new word feature $y_{new}$ and the word feature w based on the word group data input at Step S400 and stores the set new word feature $y_{new}$ and the word feature w in predetermined storage locations of the feature storage 40 (Step S430). When receiving the new image feature $x_{new}$ and the new word feature $y_{new}$ from the feature storage 40, the learning processing module 35 skips Steps S420 and s430.

After the process of Step S400 or S420, the learning processing module 35 performs the first uncorrelated component obtaining process to obtain the matrices $E_x(n)$, $\Lambda_x(n)$ shown in the above equation (9) and the above new first uncorrelated component u(n) (Step S440), and performs the second uncorrelated component obtaining process to obtain the matrices $E_y(n)$, $\Lambda_y(n)$ shown in the above equation (10) and the above new second uncorrelated component v(n) (Step S450). The parameters required at Step S440 in the equation (29) and the like and the parameters required at Step S450 in the equation (38) and the like are previously calculated at the execution of the initial learning routine and the like before the execution of the first learning information update routine. Further, the learning processing module 35 performs the sequential singular value decomposition of the covariance matrix $C_{uv}$ to obtain the matrices $E_u(n)$, $E_v(n)$ in the above equation (79) (Step S460). In this case, the parameters required at Step S460 in the equations (71)-(73) and the like are previously calculated at the execution of the initial learning routine and the like before the execution of the first learning information update routine. After obtaining the matrices $E_x(n)$, $E_y(n)$, $\Lambda_x(n)$, $\Lambda_y(n)$, the new first and second uncorrelated components u(n) and v(n), and the matrices $E_x(n)$, $E_y(n)$, the learning processing module 35 sets new projection matrices A(n) and B(n) corresponding to the combination of the new first and second feature $x_{new}$ and $y_{new}$ in accordance with the above equation (12) and stores the set projection matrices in the learning storage 41 (Step S470). Further, the learning processing module 35 updates the latent variables $s_i$, the probability density distribution for each latent variable $s_i$, and the probability $P(w|s_i)$ based on the first and second features $x_i$, $y_i$ including the new first and second features $x_{new}$, $y_{new}$, the new projection matrices A(n) and B(n), and stores the updated information in the learning storage 41 (Step S480). Then, the learning processing module terminates the routine.

As has been described above, the image data processing system 20 of the embodiment updates the projection matrices A(n) and B(n) for obtaining the latent variables $s_i$ based on the new first feature $x_{new}$ and $y_{new}$ in response to the occurrence of the new combination of the image data and the word group data, or the occurrence of the combination of the new first feature $x_{new}$ and $y_{new}$ after the annotation of the non-annotated image data. Accordingly, there is no need to perform the canonical correlation analysis for all of the combinations including the combination of the new first feature $x_{new}$ and $y_{new}$ to obtain the projection matrices A(n) and B(n), the latent variables $s_i$, and information for obtaining the probabilities even if the combination of the image feature $x_i$ and the word feature $y_i$ increases to an unlimited extent. Thus, the computational cost of the management computer 30 can be lightened and the projection matrices A(n) and B(n), the latent variables $s_i$, the probability density distribution for each latent variable $s_i$, and the probability $P(w|s_i)$ can be optimally updated every occurrence of the new first and second features $x_{new}$ and $y_{new}$.

Figure 15:
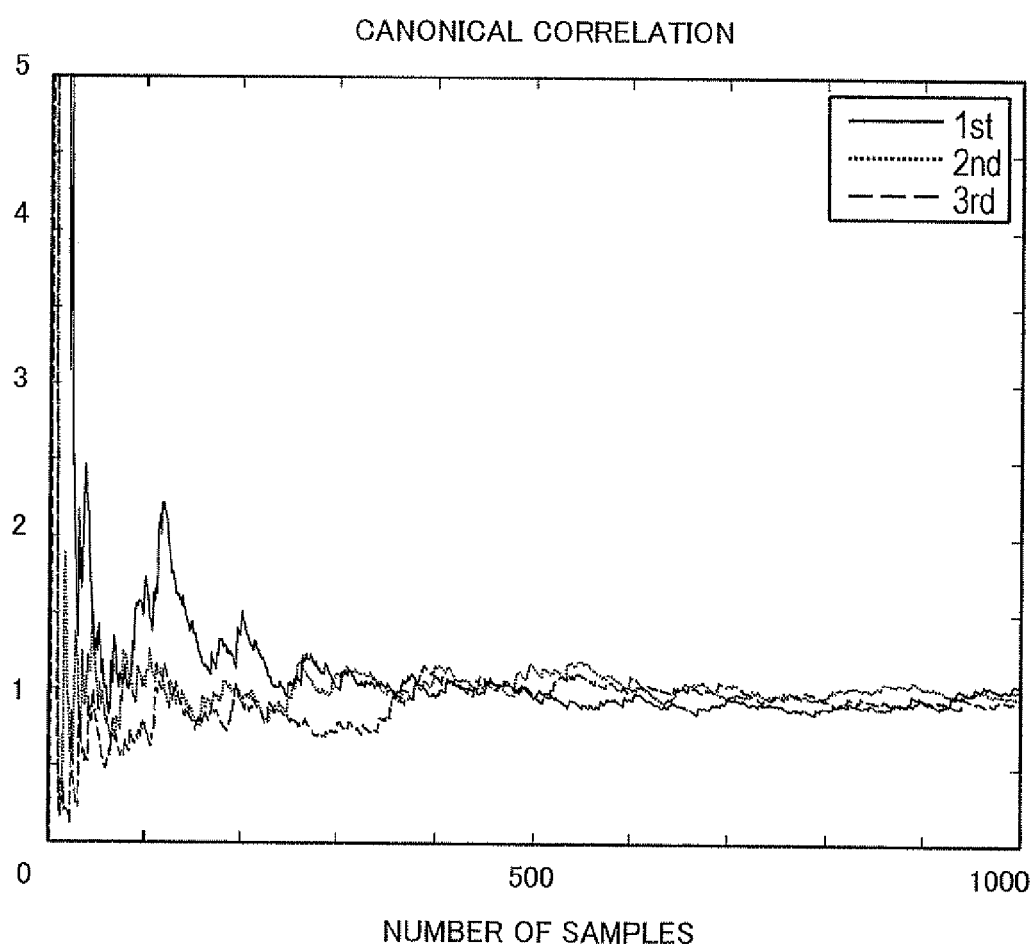
FIG. 15 is a view illustrating evaluative results of correctness of an algorism in the learning information update routine.
Figure 16:
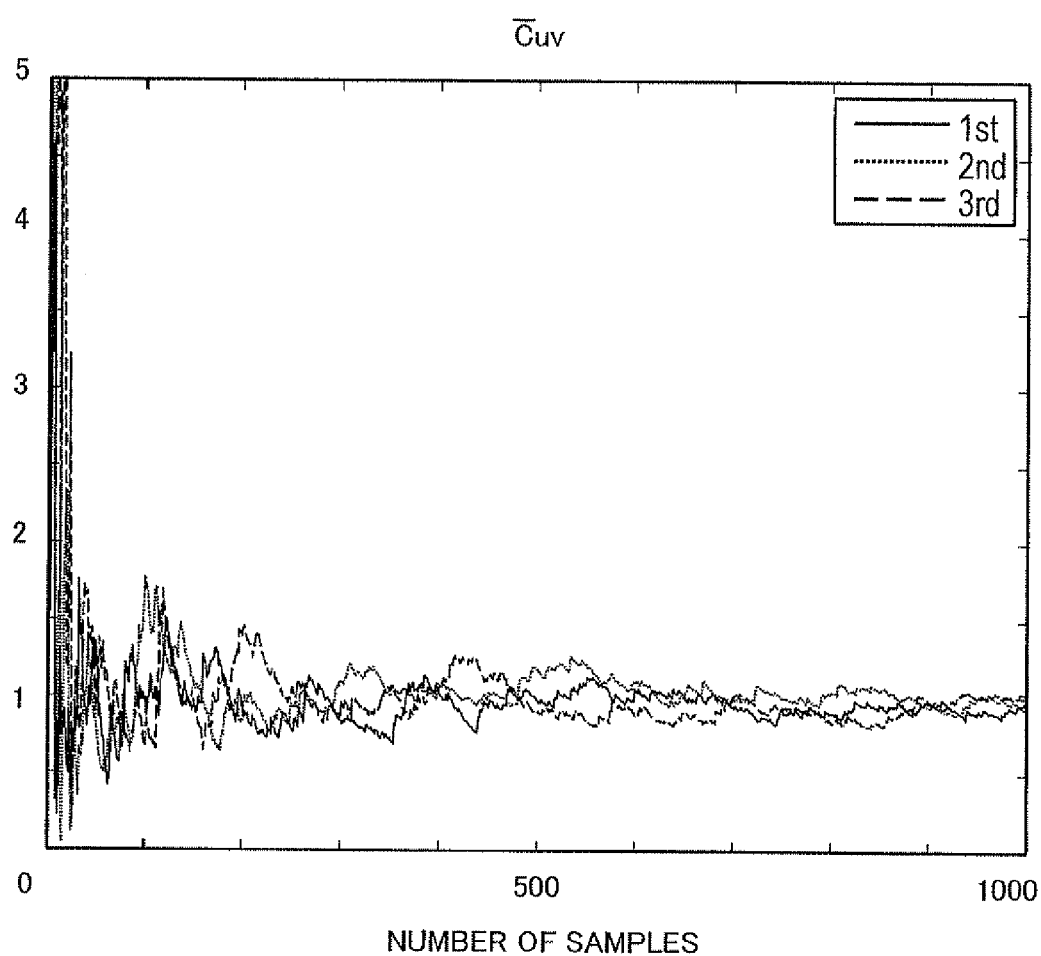
FIG. 16 is a view illustrating evaluative results of correctness of an algorism in the learning information update routine.
Figure 17:
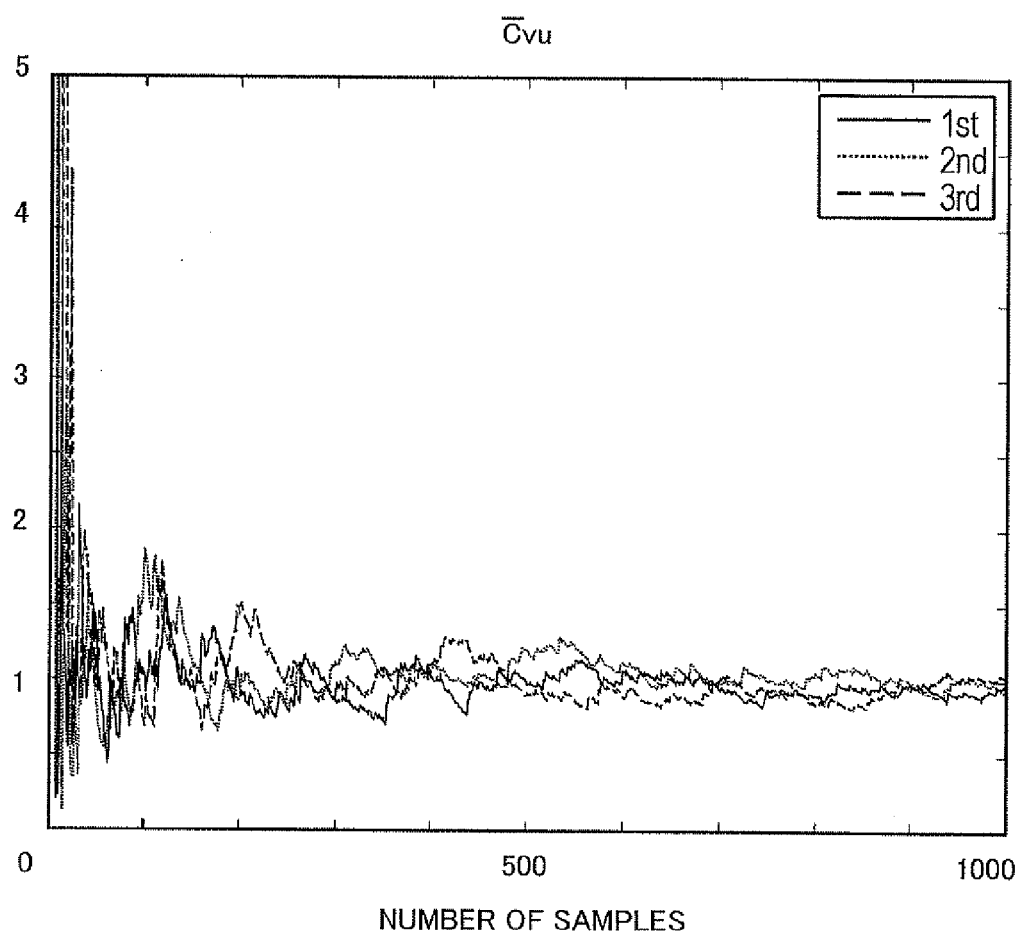
FIG. 17 is a view illustrating evaluative results of correctness of an algorism in the learning information update routine.

FIGS. 15 to 17 illustrate evaluative results of correctness of the algorism in the learning information update routine. The correctness of the algorism is evaluated based on samples of the first and second features x and y as shown in a following equation (83) generated in accordance with the probabilistic canonical correlation analysis framework. In this case, r=p=q, the number of the samples is 1000. Further, matrices obtained by diagonalizing a random value between 0 and 1 and multiplying the diagonal matrix by a value of diag([3 2 1]) are used as $W_x$, $W_y$. $\Gamma_x$ and $\Gamma_y$ represent random values generated from a normal distribution having a mean 0 and n a variance 0.5, and $\mu_x$ and $\mu_y$ represent random values between 0 and 1. FIG. 15 shows a relationship between the number of the samples and the canonical correlation coefficient estimated using the algorism in the learning information update routine. FIG. 16 shows a relationship between the number of the samples and the estimate of the covariance matrix $C_{uv}$ obtained using the algorism in the learning information update routine. FIG. 17 shows a relationship between the number of the samples and the estimate of the covariance matrix $C_{vu}$ obtained using the algorism in the learning information update routine. In FIGS. 16 and 17, the estimates of the covariance matrix $C_{uv}$ and $C_{vu}$ are expressed as an absolute value of the inner product with each column of the unit matrix. Therefore, the canonical correlation coefficient and the estimates of the covariance matrix $C_{uv}$, $C_{vu}$ obtained using the algorism in the learning information update routine becomes value 1 in theory. As shown in FIGS. 15-17, the canonical correlation coefficient and the estimates of the covariance matrix $C_{uv}$, $C_{vu}$ of this evaluation also converge on value 1. Accordingly, it is obvious that the learning information update routine (algorism thereof) can be advantageously used in practical situations.

$$\left.\begin{array}{l} z \sim N(0, I_r), \min\{p, q\} \geq r \geq 1 \\ x|z \sim N(W_x z + \mu_x, \Gamma_x), W_x \in R^{p \times r} \\ y|z \sim N(W_y z + \mu_y, \Gamma_y), W_y \in R^{q \times r} \end{array}\right\} \quad (83)$$

(Modifications)

Next, modifications of the present invention will be described. Hereinafter, in order to avoid duplicate explanations, the same reference numerals (including numbers of Steps) as those of the above image data processing system 20 are used for the modifications and detailed explanations are omitted.

(Modification of Latent Variables)

Figure 18:
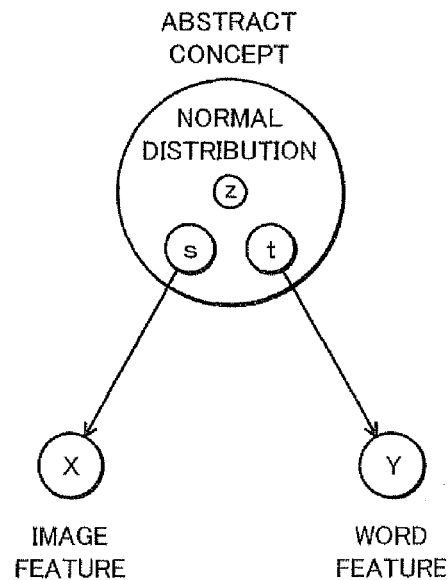
FIG. 18 is a view illustrating another model that introduces the abstract concept between the image feature and the word feature.

As shown in FIGS. 4 and 5, in the above embodiment, one of the first variate s obtained by projecting the image feature x on the canonical space using the transformation f and the second variate t obtained by projecting the word feature y on the canonical space using the transformation g is used as the latent variable indicating the abstract concept L, and the projection matrices A and B as solutions of the eigenvalue problem in the above equation (3) are used as the transformations f and g. The projection matrices A and B maximize the correlation between the first variate s and the second variate t, but can not completely match the first variate s with the second variate t. Accordingly, there is room for improvement of the accuracy of the annotation and the retrieval in the above embodiment that uses one of the first variate s and the second variate t as the latent variable. In the probabilistic canonical correlation analysis framework, one combination of the first feature x (first variate s) and the second feature y (second variate t) forms a normal distribution having a center z and a variance $\Phi$ on the canonical space as shown in FIG. 18. Accordingly, instead of using at least one of the first and second variates s and t as the latent variable, the center z of the normal distribution obtained for each of the combinations of the first and second features x and y can be used as the latent variable, thereby optimizing the abstract concept that connects the real-world information with the symbol corresponding to the real-world information.

When $z_i$ represents the center of the normal distribution defined by one combination of the image feature $x_i$ and the word feature $y_i$ in the canonical space, and $\Phi_{xy}$ represents the variance of the normal distribution, the center $z_i$ can be expressed as the above equation (101), and the variance $\Phi_{xy}$ can be expressed as the above equation (102). In the equations (101) and (102), $\Lambda^2$ represents the diagonal matrix having diagonal elements equal to eigenvalues, and $M_x$ and $M_y$ are arbitrary matrices that satisfy $M_x M_y^T = \Lambda$ and have a spectrum norm of less than value "1". In the embodiment, $M_x$ and $M_y$ are simple matrices that satisfy $M_x \Lambda^\beta$, $M_y = \Lambda^{1-\beta}$ (where $\beta$ is a variable that satisfies $0<\beta<1$ and indicates a weight on the image feature). The probability $P(z|x_i, y_i)$ of occurrence of the arbitrary latent variable $z_i$ from the certain one combination of the image feature $x_i$ and the word feature $y_i$ can be expressed as a following equation (112) as with the equation (6) using the variance $\Phi_{xy}$. Further, the probability $P(z|x)$ of occurrence of the latent variable z from the image feature x can be expressed as a following equation (113) using the variance $\Phi_x$ shown in the above equation (104) and a center zc, where $\Phi_x$ represents the variance of the normal distribution defined by the arbitrary image feature x in the canonical space, and zc represents the center of the normal distribution. Thus, the probability $P(x|z_i)$ of occurrence of the arbitrary first feature x from the latent variable $z_i$ can be expressed as a following equation (114) using the probability $P(z|x_i, y_i)$ and the probability $P(z|x)$. By deforming the equation (114), it is possible to obtain the probability density distribution $P(x|z_i)$ of the equation (103) that indicates the probability of occurrence of the arbitrary first feature x from the latent variable $z_i$.

$$P(z|x_i, y_i) = \frac{1}{\left(\sqrt{2\pi}\right)^m \sqrt{|\Phi_{xy}|}} \exp\left(-\frac{1}{2}(z-z_i)^T \Phi_{xy}^{-1}(z-z_i)\right) \quad (112)$$

$$P(z|x) = \frac{1}{\left(\sqrt{2\pi}\right)^m \cdot \sqrt{|\Phi_x|}} \exp\left(-\frac{1}{2}(z-zc)^T \Phi_x^{-1}(z-zc)\right) \quad (113)$$

$$P(x|z_i) = \int \sqrt{P(z|x_i, y_i) P(z|x)} \, dz \quad (114)$$

Figure 19:
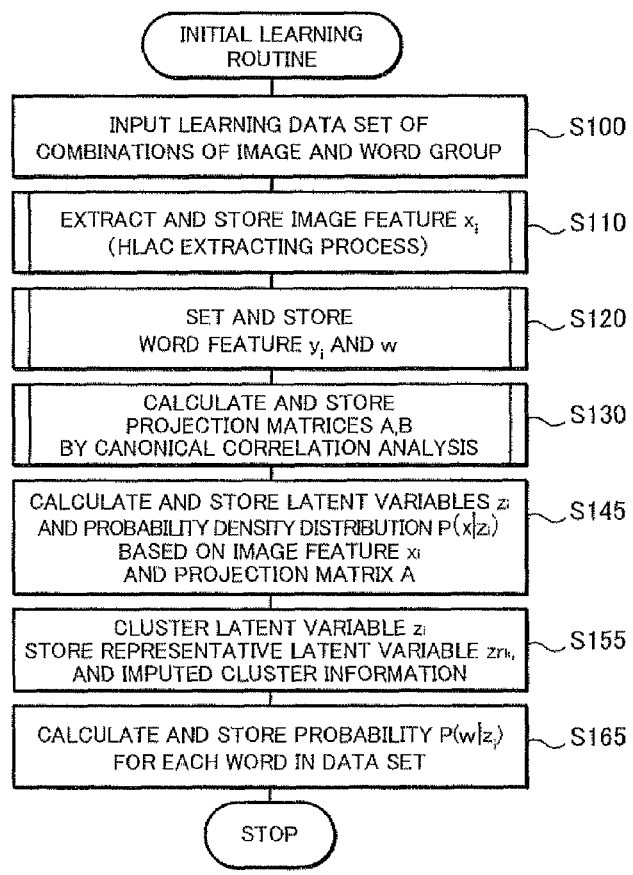
FIG. 19 is a flowchart illustrating an example of the initial learning routine according to a modification of the present invention.

As described above, the center $z_i$ of the normal distribution obtained for each of the combinations of the image feature $x_i$ and the word feature $y_i$ can be used as the latent variable, thereby optimizing the probability of occurrence of the arbitrary image feature x from the latent variable $z_i$. Further, when the center $z_i$ of the normal distribution is used as the latent variable, a weight can be assigned to the image feature in accordance with tasks by appropriately setting the above variable $\beta$. Thus, it is possible to easily and stably tune the parameters. FIG. 19 illustrates the initial learning routine of the modification that can be used when the center $z_i$ of the normal distribution is used as the latent variable. In the initial learning routine of FIG. 19, the latent variable $z_i$ and the probability density distribution $P(x|z_i)$ can be simultaneously obtained at Step S145 after calculating the projection matrices A and B at Step S130. In Step S165 in FIG. 19, the occurrence probability $P(w|z_i)$ for each of all the words included in the word group data input at Step S100, that is, the probability of occurrence of the word feature w from the latent variable $z_i$ may be calculated in accordance with the above equation (7) or (8) as with Step S160 in FIG. 6 (in this case $sz_i$ in the equation (7) or (8) corresponds to $z_i$).

(Speed-Enhancement of Annotation and Retrieval)

The computational cost required for annotating or retrieving one non-annotated image data increases in proportion to the number of already-learned image data (image features) when the above annotation routine or the retrieval routine is executed. Accordingly, the more a size of the image data processing system 20 increases, the more the computational cost required for the annotation and the retrieval increase. The annotation routine in FIG. 10 and the retrieval routine in FIG. 12 obtain the similarity between one non-annotated image data and all of the word features (all words) or all of the latent variables ($s_i$) (Step S230 or S320). However, it seems that most of the multiple word features or the multiple latent variables are located as a distance from the already-learned image data in the canonical space and have no or little influence on the accuracy of the annotation and the retrieval. Therefore, it may be possible to greatly improve computation speed without decreasing the accuracy of the annotation and the retrieval by previously structurizing the canonical space with vector quantization.

Figure 20:
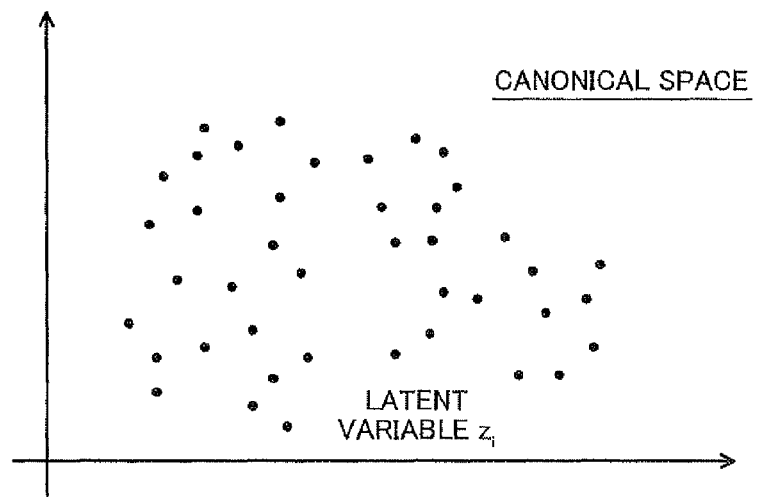
FIG. 20 is a view illustrating a state where multiple latent variables disperse in the canonical space.
Figure 21:
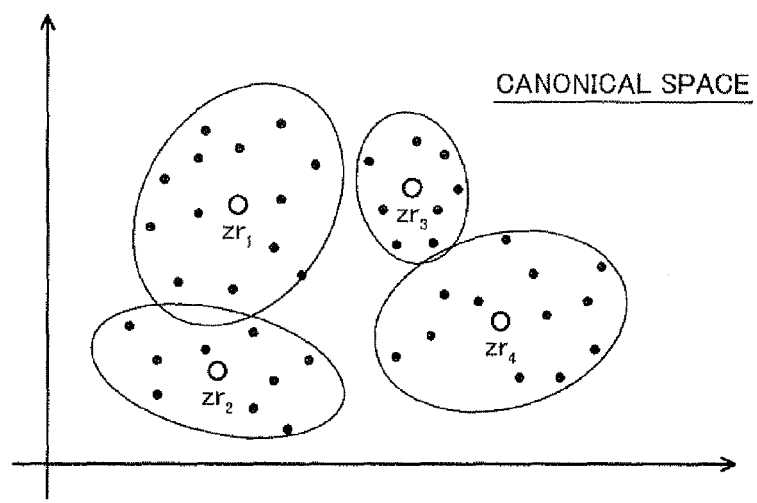
FIG. 21 is a view illustrating a state where multiple discrete latent variables in the canonical space are classified into a plurality of clusters.

In consideration of this, after obtaining the latent variables $z_i$ at Step S145, the learning processing module 35 performs a clustering for all of the latent variables $z_i$ using an appropriate clustering method such as K-means or mean-shift (Step S155). Thus, the multiple latent variables that disperse in the canonical space as shown in FIG. 20 are classified into a plurality of clusters (k-pieces clusters, k<<n) as shown in FIG. 21. At Step S155, representative latent variables $zr_k$ (where, k=1, . . . , k) as representative latent vectors are obtained for each of the plurality of clusters, and information on an imputed cluster of each latent variable $z_i$. The data are stored in predetermined storage locations of the learning storage 41.

Figure 22:
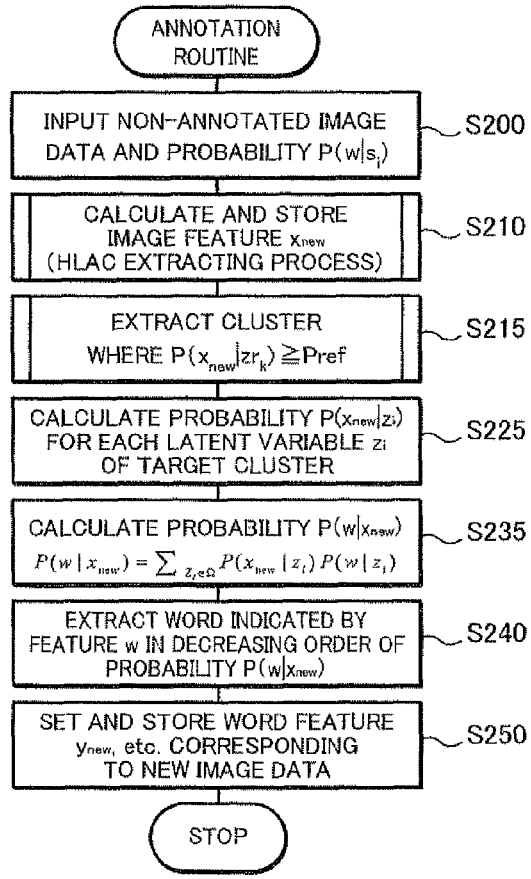
FIG. 22 is a flowchart illustrating an example of the annotation routine according to a modification of the present invention.
Figure 23:
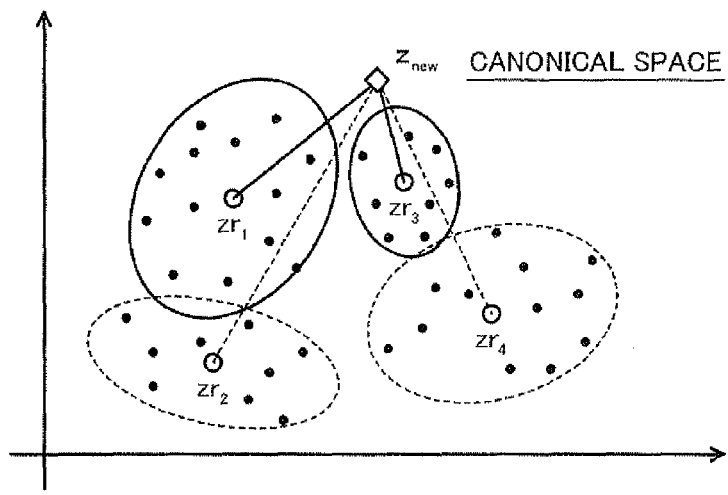
FIG. 23 is a view explaining a process of Step S215 in FIG. 22.

FIG. 22 illustrates the annotation routine of the modification that can be used when the initial learning routine of FIG. 19 has been executed. At a start of the annotation routine of FIG. 22, the annotation processing module 36 executes the data input process (Step S200) as with FIG. 9, and the extraction and storage process of the new image feature $x_{new}$ (Step S210). Then, the annotation processing module 36 calculates the probability $P(x_{new}|zr_k)$ of occurrence of the new image feature $x_{new}$ from the representative latent variables $zr_k$ for each representative latent variables $zr_k$ (for each cluster) in accordance with the above equation (103) and extracts the clusters in which the probability $P(x_{new}|zr_k)$ is equal to or more than a predetermined threshold value Pref (Step S215). As shown in FIG. 23, the probability $P(x_{new}|zr_k)$ indicates a closeness between a latent variable $z_{new}$ obtained by projecting the new image feature $x_{new}$ on the canonical space and the representative latent variables $zr_k$ of each cluster. At the Step S215, the probability $P(x_{new}|zr_k)$ is obtained by substituting $x_{new}$ into x of the equation (103), $zr_k$ into $z_i$ of the equation (103), and $z_{new}$ into zc of the equation (103). The $z_{new}$ is obtained by substituting the new image feature $x_{new}$ into x of the equation (104). That is, the probability $P(x_{new}|zr_k)$ is compared with the threshold value Pref at Step S215 so as to extract the clusters in which the closeness between the latent variable $z_{new}$ corresponding to the new image feature $x_{new}$ and the representative latent variables $zr_k$ is equal to or less than a predetermined degree. In the example of FIG. 23, clusters corresponding to the representative latent variables $zr_1$ and $zr_3$ are extracted from the 4 (four) clusters.

After extracting the clusters in which the probability $P(x_{new}|zr_k)$ is equal to or more than the threshold value Pref, the annotation processing module 36 calculates a probability $P(x_{new}|z_i)$ of occurrence of the new first feature $x_{new}$ from the latent variable $z_i$ for each of all latent variables $z_i$ belonging to the extracted clusters using the above equation (103) (Step S225). Further, the annotation processing module 36 calculates the probability $P(w|x_{new})$ of occurrence of the word feature w from the new first feature $x_{new}$ for each word feature w (for each of all the words) in accordance with a following equation (115) (Step S235). In the equation (115), Ω represents a set of latent variables $z_i$ belonging to the clusters extracted at Step S215. After calculating the probability $P(w|x_{new})$ for each of all the words (each of all the word features w), the annotation processing module 36 extracts the word that is indicated by the word feature w in decreasing order of the probability in accordance with a predetermined determination criteria (Step S240). Then, the annotation processing module 36 sets the new word feature $y_{new}$ and the word feature w corresponding to the new image feature $x_{new}$ and the new word group data corresponding to the new image data based on the extracted words at Step S240 and stores the data in the feature storage 40 and the data storage 21 (Step S250). Then, annotation processing module 36 terminates the routine. As described above, the probability of occurrence of the word feature w for the word from the new image feature $x_{new}$ may be calculated based on the latent variables $z_{new}$ belonging to the clusters in which the probability $P(x_{new}|zr_k)$ of occurrence of the new image feature $x_{new}$ from the representative latent variables $zr_k$ is equal to or more than the threshold value Pref. Thus, it is possible to omit a calculation of the probability with respect to the latent variable $z_i$ (combination of the image feature x and the word feature y) that have no or little influence on the accuracy of the annotation, thereby lightening the computational cost and speeding processes while ensuring the accuracy of the annotation.)

$$P(w|x_{new}) = \Sigma_{Z_i \in \Omega} P(x_{new}|z_i) P(w|z_i) \quad (115)$$

Figure 24:
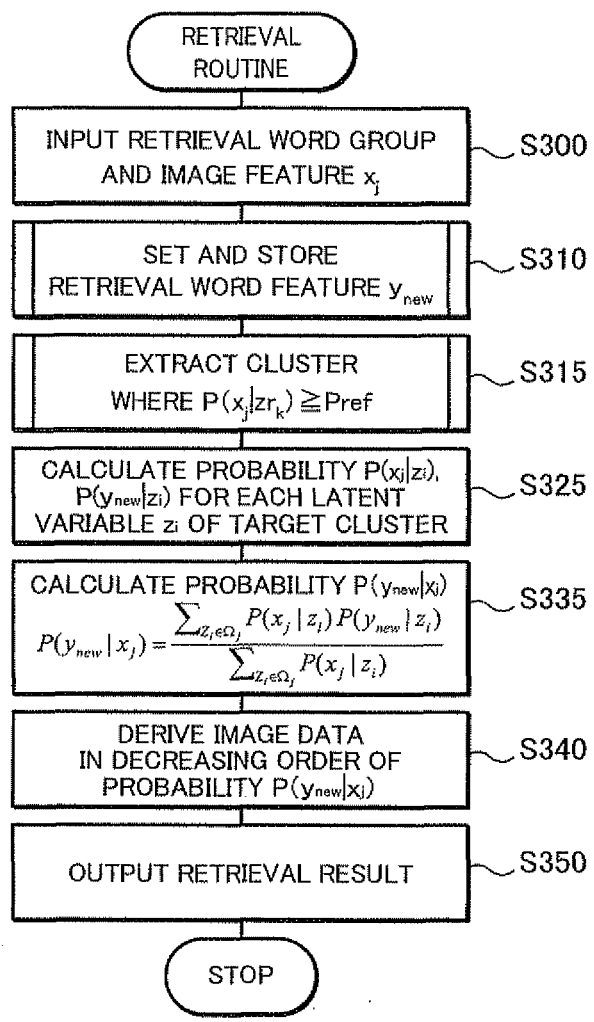
FIG. 24 is a flowchart illustrating an example of a retrieval routine according to a modification of the present invention.

FIG. 24 illustrates the retrieval routine of the modification that can be used when the initial learning routine of FIG. 19 has been executed. At a start of the retrieval routine of FIG. 24, the retrieval processing module 38 executes the data input process (Step S300) as with FIG. 12, and the set and storage process of the retrieval word feature $y_{new}$ (Step S310). Then, the retrieval processing module 38 calculates the probability $P(x_j|zr_k)$ of occurrence of the non-annotated image feature $x_j$ from the representative latent variables $zr_k$ for each representative latent variables $zr_k$ (for each cluster) in accordance with the above equation (103) and extracts the clusters in which the probability $P(x_j|zr_k)$ is equal to or more than a predetermined threshold value Pref (Step S315). The probability $P(x_j|zr_k)$ indicates a closeness between a latent variable $z_j$ obtained by projecting the non-annotated image feature $x_j$ on the canonical space and the representative latent variables $zr_k$ of each cluster. At the Step S315, the probability $P(x_j|zr_k)$ is obtained by substituting $x_j$ into x of the equation (103), $zr_k$ into $z_i$ of the equation (103), and $z_j$ into zc of the equation (103). The $z_j$ is obtained by substituting the non-annotated image feature $x_j$ into x of the equation (104). That is, the probability $P(x_j|zr_k)$ is compared with the threshold value Pref at Step S315 so as to extract the clusters in which the closeness between the latent variable $z_j$ corresponding to the non-annotated image feature $x_j$ and the representative latent variables $zr_k$ is equal to or less than a predetermined degree.

After extracting the clusters in which the probability $P(x_j|zr_k)$ is equal to or more than the threshold value Pref, the retrieval processing module 38 calculates probabilities of $P(x_j|z_i)$ of occurrence of the non-annotated image feature $x_j$ from the latent variable $z_i$ and the probabilities $P(y_{new}|z_i)$ of occurrence of the retrieval word feature $y_{new}$ from the latent variable $z_i$ for all of the latent variables $z_i$ belonging to the extracted clusters (Step S325). Further, the retrieval processing module 38 calculates the probability $P(y_{new}|x_j)$ of occurrence of the retrieval word feature $y_{new}$ from the non-annotated image feature $x_j$ for each non-annotated image feature $x_j$ in accordance with a following equation (115) (Step S335). In the equation (116), $\Omega_j$ represents a set of latent variables $z_i$ belonging to the clusters extracted at Step S315. After calculating the probability $P(y_{new}|x_j)$ for each non-annotated image feature $x_j$, the retrieval processing module 38 derives the non-annotated image data corresponding to the non-annotated image feature $x_j$ from the data storage 21 in decreasing order of the probability $P(y_{new}|x_j)$ in accordance with a predetermined determination criteria (Step S340) and provides the result output module 39 with the derived data. The result output module 39 provides the terminal device and the like as an inquiry with the result of the retrieval process in a predetermined (Step S350). Then, retrieval processing module 38 terminates the routine.

$$P(y_{new}|x_j) = \frac{\sum_{Z_i \in \Omega_j} P(x_j|z_i) P(y_{new}|z_i)}{\sum_{Z_i \in \Omega_j} P(x_j|z_i)} \quad (116)$$

As described above, the probability $P(y_{new}|x_j)$ of occurrence of the retrieval word feature $y_{new}$ from the non-annotated image feature $x_j$ may be calculated based on the latent variables $z_i$ belonging to the clusters in which the probability $P(x_j|zr_k)$ of occurrence of the non-annotated image feature $x_j$ from the representative latent variables $zr_k$ is equal to or more than the threshold value Pref. Thus, it is possible to omit a calculation of the probability with respect to the latent variable $z_i$ (combination of the image feature x and the word feature y) that have no or little influence on the accuracy of the retrieval, thereby lightening the computational cost and speeding processes while ensuring the accuracy of the retrieval. The above explanation is given to the example in which the center $z_i$ of the normal distribution defined by one combination of the image feature $x_i$ and the word feature $y_i$ is used as the latent variable. The initial learning routine of FIG. 19, the annotation routine of FIG. 22 and the retrieval routine of FIG. 24 may be applied to the example in which the first variate $s_i$ or the second variate $t_i$ is used as the latent variable.

(Modification of Learning Information Update Routine)

Figure 25:
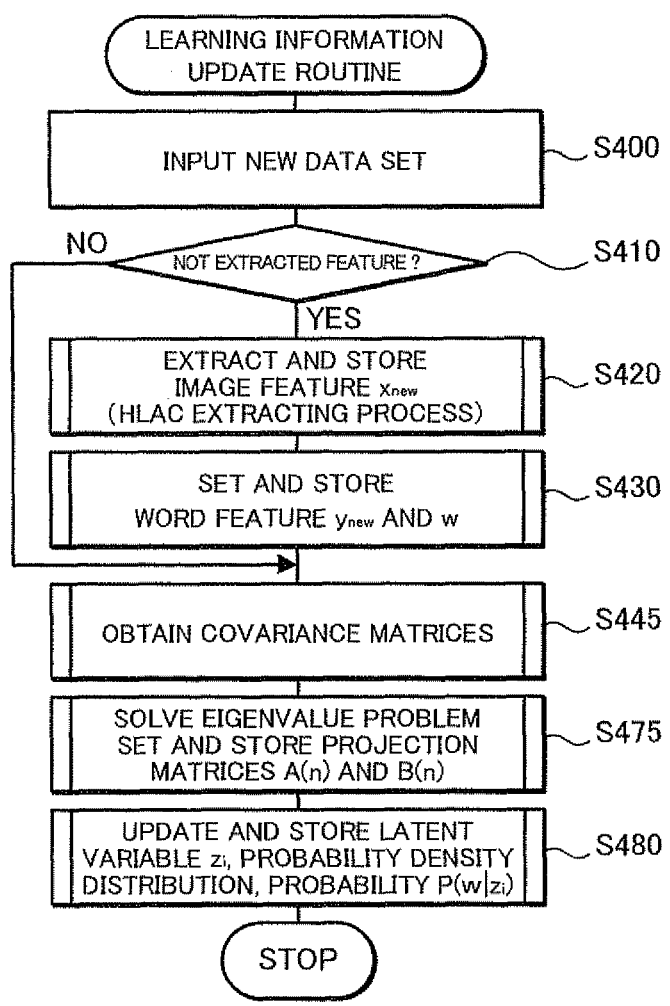
FIG. 25 is a flowchart illustrating an example of a learning information update routine according to a modification of the present invention.

FIG. 25 is a flowchart illustrating the learning information update routine according to the modification. The learning information update routine shown in FIG. 25 is equivalent to the learning information update routine of FIG. 14 in which Steps S440-S470 of are replaced by following Steps S445 and S475. At a start of the learning information update routine, the learning processing module 35 executes the processes of Steps S400-S430. In the routine, it is assumed that there are n−1-pieces combinations of the image features x(1), ..., x(i), ..., x(n−1) and the word feature y(1), ..., y(i), ..., y(n−1), and a n$^{th}$ combination of a new image feature x(n) and a new word feature y(n) when the process of Step S430 is completed.

After the process of Step S430, the learning processing module 35 updates the covariance matrices $C_{xx}$, $C_{yy}$, $C_{xy}$, and $C_{yx}$ in accordance with the above equation (105) at Step S445 when the order q of the word feature y is constant, that is, when the new word feature y(n) does not include the word feature w (brand-new word) that is not stored in the feature storage 40. In this case, n>=2, x~(n) and y~(n) are given in the above equation (106), and $m_x(n)$ and $m_y(n)$ are given in the above equation (107). When the order q of the word feature y increases, that is, when the new word feature y(n) includes the word feature w that is not stored in the feature storage 40 (brand-new word), the learning processing module 35 assumes that the brand-new word feature w is added to a bottom of known feature vectors and updates the covariance matrices relating to the word feature y in accordance with the above equation (108), where $m_y(n)$ is given in the above equation (109). Typically, the order p of the image feature x(n) may not increase with the occurrence of the new image feature x(n) and the new word feature y(n). However, it is also possible to deal with the increase of the order p of the image feature x in accordance with following equations (117) and (118) when the order p of the image feature x increases. After updating the covariance matrices $C_{xx}$, $C_{yy}$, $C_{xy}$, and $C_{yx}$, the learning processing module 35 solves the eigenvalue problem of the above equation (3) so as to set new projection matrices A(n) and B(n) corresponding to the combination of the new image feature $x_{new}$ and the new word feature $y_{new}$, and stores the set projection matrices in the learning storage 41 (Step S475). Further, the learning processing module 35 updates the latent variables $z_i$, the probability density distribution for each latent variable $z_i$, and the probability $P(w|z_i)$ based on the image feature $x_i$ and the word feature $y_i$ including the new image feature $x_{new}$ and the new word feature $y_{new}$, the new projection matrices A(n) and B(n), and stores the updated information in the learning storage 41 (Step S480). Then, the learning processing module terminates the routine.

$$C_{xx}(n) = \frac{n-1-l}{n}\begin{pmatrix} C_{xx}(n-1) & 0 \\ 0 & 0 \end{pmatrix} + \frac{1+l}{n}\tilde{x}(n)\tilde{x}^T(n) \quad (117)$$

$$m_x(n) = \frac{n-1-l}{n}\begin{pmatrix} m_x(n-1) \\ 0 \end{pmatrix} + \frac{1+l}{n}x(n) \quad (118)$$

As described above, only the covariance matrices $C_{xx}$, $C_{yy}$, $C_{xy}$, and $C_{yx}$ may be sequentially updated every occurrence of the combination of the new image feature $x_{new}$ and the new word feature $y_{new}$, thereby improving a convergence and a stability of the processes and optimally updating the projection matrices A(n) and B(n), the latent variables $z_i$, and the probability density distributions. Further, it is possible to deal with the increase of the order q of the word feature y with the occurrence of the new image feature $x_{new}$ and the new word feature $y_{new}$ by sequentially updating only the covariance matrices $C_{xx}$, $C_{yy}$, $C_{xy}$, and $C_{yx}$ and updating the new projection matrices A(n) and B(n) and the like for obtaining the latent variables $z_i$. Essentially, the computational cost required for calculating the covariance matrices $C_{xx}$, $C_{yy}$, $C_{xy}$, and $C_{yx}$ increases in proportion to value $(p^2+q^2+pq)\cdot n$. Therefore, the more the number of the image data, that is value n increases with an increase of the size of the image data processing system 20, the more the computational cost increase because n>>p, q. On the other hand, the computational cost required for calculating the covariance matrices $C_{xx}$, $C_{yy}$, $C_{xy}$, and $C_{yx}$ increases in proportion to value $(p^2+q^2+pq)$ when sequentially updating only the covariance matrices, thereby further decreasing an influence of the number of the image data (value n) on the computational cost. According to the learning information update routine of FIG. 25, it is possible to lighten the computational cost required for the update of the learning information. The learning information update routine of FIG. 25 may be applied to the example in which the first variate $s_i$ or the second variate $t_i$ is used as the latent variable.

(Modification Relating Image Feature)

Basically, the image data processed in the above image data processing system 20 are not created for a purpose of the annotation and the retrieval but are taken under various lighting conditions. Therefore, a pixel value (RGB value) may be influenced by an ambient brightness and an illumination. Accordingly, there is a necessity to remove an influence of lighting conditions as much as possible in order to perform the high-accuracy initial learning, annotation, and retrieval. In order to relieve the influence of lighting conditions, it is preferable to prepare image data in which a threshold processing using a sigmoid function as shown in a following equation (119) is applied to each of pixels in addition to original image data when the color HLAC is extracted as the image feature from the color image for example. The equation (119) is a sigmoid function of 255 levels of gray, where $f_{new}$ represents the pixel value after the processing, f represents each pixel value, ft represents the threshold, and the γ represents a parameter defining a degree of a smoothing. This threshold processing is interpreted as a binary processing in which the smoothing is added to before and after the threshold. According to this threshold processing, it is possible to obtain processed image data robust against a change of the pixel value due to the lighting conditions. Preferably, the color HLAC extracted from the processed image data in which the threshold processing is applied to each of pixels is used as the image feature together with the color HLAC extracted from the original image data. In such a case, the image feature x can be obtained as shown in a following equation (120), where $x_o$ represents the color HLAC extracted from the original image data and $x_p$ represents the color HLAC extracted from the processed image data. Thus, it is possible to performance of the annotation/retrieval in comparison with when only the color HLAC extracted from the original image data used as the image feature.

$$f_{new} = \frac{255}{1+\exp(-\gamma(f-f_t))} \quad (119)$$

$$x = (x_o^T, x_p^T)^T \quad (120)$$

Further, it may be possible to use a luminance gradient direction of each pixel extracted from the image data other than the HLAC as the image feature. By using the luminance gradient direction other than the luminance value itself, it is possible to improve a robustness of the image feature against a change of a whole lightness due to the lighting condition. When (u, v) represents a coordinate of an arbitrary point (pixel), the luminance gradient direction θ of the arbitrary point can be expressed as a following equation (121) for the grayscale image. For the color image, the luminance gradient direction $θ_r$, $θ_g$ and $θ_b$ in each of RGB colors of the arbitrary point can be expressed as a following equation (122). In the equations (121) and (122), I, $I_r$, $I_g$ and $I_b$ respectively represent the pixel value (pixel value of R, G or B). The luminance gradient direction θ ($\theta_r$, $\theta_g$ and $\theta_b$) is calculated for all the target image data and is histgramed by dividing with an appropriate number of bins, thereby obtaining the image feature based on the luminance gradient direction of each pixel of the image data. An order of the image feature based on the luminance gradient direction for the grayscale image is identical with the above number of bins. In the above example, the order for the color image is identical with triple of the number of bins.

$$\theta(u, v) = \tan^{-1} \frac{I(u, v+1) - I(u, v-1)}{I(u+1, v) - I(u-1, v)} \quad (121)$$

$$\left.\begin{aligned}\theta_r(u, v) &= \tan^{-1} \frac{I_r(u, v+1) - I_r(u, v-1)}{I_r(u+1, v) - I_r(u-1, v)} \\ \theta_g(u, v) &= \tan^{-1} \frac{I_g(u, v+1) - I_g(u, v-1)}{I_g(u+1, v) - I_g(u-1, v)} \\ \theta_b(u, v) &= \tan^{-1} \frac{I_b(u, v+1) - I_b(u, v-1)}{I_b(u+1, v) - I_b(u-1, v)}\end{aligned}\right\} \quad (122)$$

The invention is not limited to the system for processing the combination of the image data and the word group data. The first data indicating the real-world information is not limited to visual information such as the image data. The first data may be hearing information or data indicating information relating to the five senses. The second data may be data indicating symbol other than the word as long as it indicates the symbol corresponding to the real-world information. In the above embodiment, the vector indicating the higher-order local auto-correlation feature is used as the image feature (first feature), however, the first feature may indicate another structure other than the higher-order local auto-correlation feature (the higher-order local auto-correlation feature may be used as a feature of the sound data). Further, the word feature is not limited to the feature having the above structure and an arbitrary structure may be used as the second feature. Furthermore, the above embodiment relates to the image data processing system for processing the combination of the image data as the first data indicating the real-world information and the word group data as the second data indicating the symbol corresponding to the real-world information, however, the invention can be applied to a robot apparatus for example.

Figure 26:
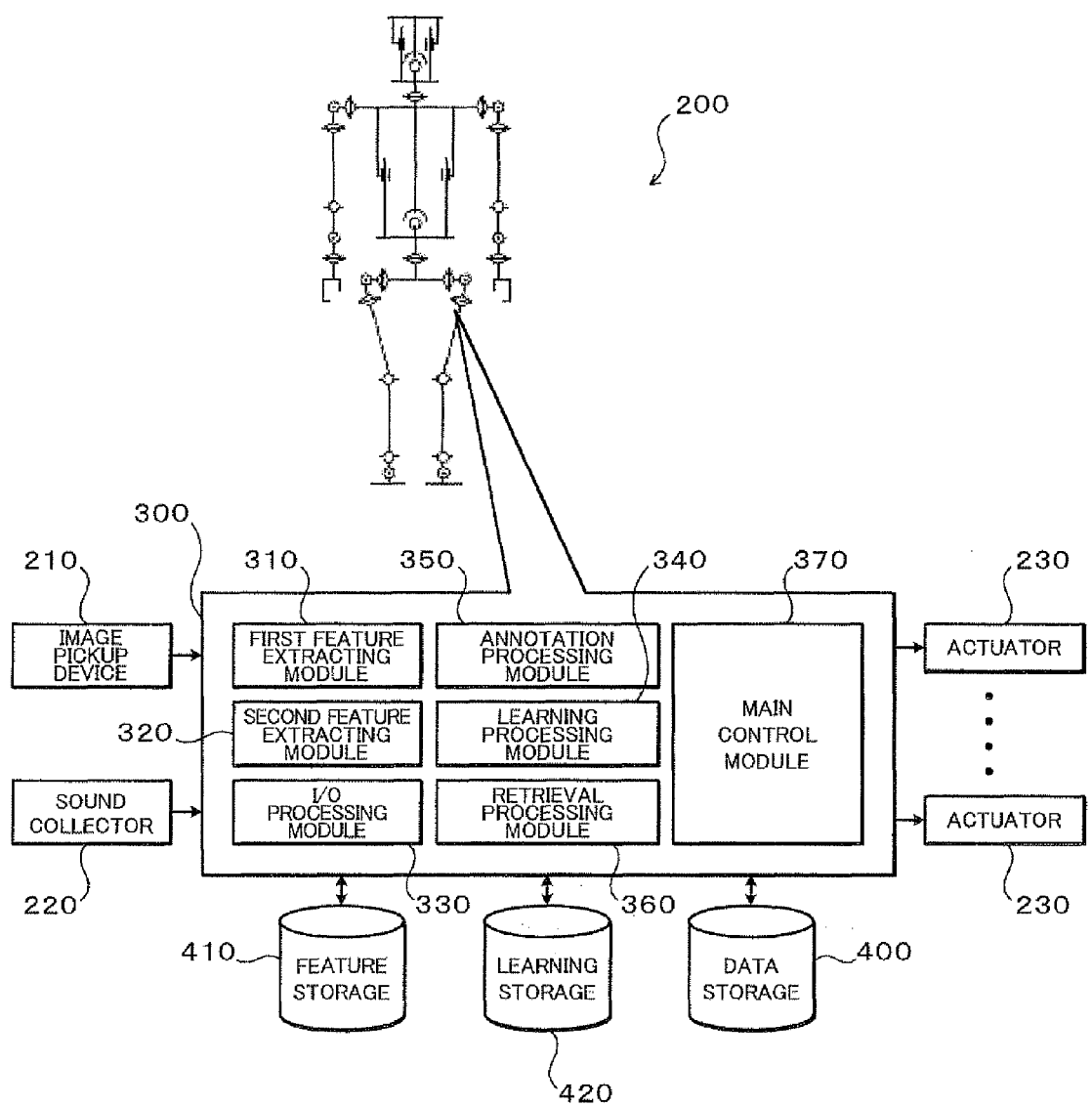
FIG. 26 is a schematic block diagram of a robot apparatus 200 according to another embodiment of the present invention.

FIG. 26 is a schematic block diagram of a robot apparatus 200 according to another embodiment of the present invention. The robot apparatus 200 shown in the figure is a so-called humanoid robot having an artificial intelligence and includes an image pickup device 210 equivalent to an eye of humans, a sound collector 220 equivalent to an ear of humans, multiple actuators 230 that moves movable portions such as manipulators equivalent to a hand of humans, leg portions and the like, a control computer 300 that acts as the artificial intelligence. The control computer 300 includes one or more CPUs, ROMs, RAMs, a system buses, various interfaces, storages and the like. In the control computer 300, one or both of these hardware and the software such as the correspondence learning program, the annotation program and the retrieval program of the invention cooperate to configure a first feature extracting module 310, a second feature extracting module 320, an input and output processing module 330, a learning processing module 340, an annotation processing module 350, a retrieval processing module 360, main control module 370 and the like. Further, the control computer 300 connects with a data storage 400, a feature storage 410 and a learning storage 420.

The first feature extracting module 310 extracts the first feature (for example, the feature based on the HLAC) indicating a feature of data such as the image data obtained by the image pickup device 210 and the sound data obtained by the sound collector 220 from the data and stores the first feature in the feature storage 410. The second feature extracting module 320 extracts the second feature indicating a feature of symbol data indicating the object in the image or meanings of the sound from the symbol data and stores the second feature in the feature storage 410. The input and output processing module 330 processes input and output information from the robot apparatus 200. When the sound collector 220 obtains a command by the sound from the human, the input and output processing module 330 appropriately processes the sound data from the sound collector 220 and provides the main control module 370 with the sound data for example. The learning processing module 340 performs the canonical correlation analysis based on the plurality of combinations of the first and second features so as to learn the correspondence between the image data or the sound data and the symbol data, and obtains learning information necessary for the annotation that assigns the symbol as the metadata to the non-annotated image data and a non-annotated sound data that have no correspondence with the symbol data and the retrieval of the non-annotated image data and the like based on the symbol. Further, the learning processing module 340 updates the learning information in response to the occurrence of the combination of the new image data and a new symbol data. The annotation processing module 350 performs the annotation on the non-annotated image data and the non-annotated sound data based on the learning information stored in the learning information storage 420. The retrieval processing module 360 performs the retrieval of the non-annotated image data and the non-annotated sound data based on the symbol. The main control module 370 determines an operational behavior of the robot apparatus 200 and controls the actuators 230 in accordance with commands from the input and output processing module 330, processing results of the annotation processing module 350, the retrieval processing module 360 and the like.

In the robot apparatus 200 configured above, the above described initial learning routine is executed and the learning information is stored in the learning information storage 420 so as to perform the annotation that assigns the symbol to the image data obtained by the image pickup device 210 and the sound data obtained by the sound collector 220 and update the learning information based on the result of the annotation. Thus, it is possible to let the robot apparatus 200 speedily and accurately understand the obtained real-world information, that is, what it sees and hears. Further, the data storage 400 stores the image data obtained by the image pickup device 210 and the sound data obtained by the sound collector 220, and the stored image and sound data can be retrieved based on the symbol. Thus, it is possible to let the robot apparatus 200 speedily and accurately understand the obtained real-world information, that is, what it sees and hears. Accordingly, by applying the invention to the robot apparatus, it is possible to bring an autonomic movement of the robot apparatus close to a movement of the human and improve an intelligence level of the robot apparatus.

Hereinbefore, the best modes of carrying out the invention have been described with reference to the embodiments, however, the present invention is not limited to the above embodiments. It will be apparent that various modifications can be made to the present invention without departing from the spirit and scope of the present invention.

INDUSTRIAL APPLICABILITY

The present invention is advantageously used in an information processing field treating the real-world information and the symbol corresponding the real-world information.

The invention claimed is:

1. A correspondence learning apparatus that learns a correspondence between real-world information and symbols corresponding to the real-world information, the apparatus comprising:
    a first feature storage that stores a plurality of first features respectively extracted from first data as a feature of the first data that indicates the real-world information;
    a second feature storage that stores a plurality of second features respectively extracted from second data as a feature of the second data that corresponds to the first data and indicates at least one symbol corresponding to the real-world information;
    a canonical correlation analysis module that performs a canonical correlation analysis based on a plurality of combinations of the first and second features so as to obtain a transformation to derive latent variables based on at least one of the first and second features, the latent variables respectively indicating an abstract concept that connects the real-world information with the symbol corresponding to the real-world information;
    an analysis result storage that stores the transformation obtained by the canonical correlation analysis module and the latent variables obtained using the transformation for each of the combinations of the first and second features;
    an information deriving module that derives information required to obtain a probability of occurrence of an arbitrary first feature from the latent variable and a probability of occurrence of an arbitrary second feature from the latent variable for each of the latent variables; and
    an information storage that stores information derived by the information deriving module.

2. A correspondence learning apparatus according to claim 1, wherein a first variate represents a variate obtained by projecting the first feature on a canonical space, a first transformation represents a transformation to obtain the first variate from the first feature, a second variate represents a variate obtained by projecting the second feature on the canonical space, a second transformation represents a transformation to obtain the second variate from the second feature,
    wherein the canonical correlation analysis module obtains the first and second transformations that maximize a correlation between first variates and second variates by the canonical correlation analysis, and
    wherein the analysis result storage stores the obtained first and second transformations, and the first or second variates as the latent variables obtained by projecting the first or second features on the canonical space.

3. A correspondence learning apparatus according to claim 2, wherein $x_i$ (where $i=1, \ldots, n$, the same shall apply hereinafter) represents the first feature, $y_i$ represents the second feature, $s_i$ represents the first variate, and $t_i$ represents the second variate,
    wherein the canonical correlation analysis module assumes that the first transformation satisfies a following equation (1) and the second transformation satisfies a following equation (2) and solves an eigenvalue problem of a following equation (3) to obtain a projection matrix A in the equation (1) as the first transformation and to obtain a projection matrix B in the equation (2) as the second transformation, where, in the equation (3), $\Lambda^2$ represents a diagonal matrix having diagonal elements equal to eigenvalues, I represents a unit matrix, and covariance matrices $C_{xx}$, $C_{yy}$, $C_{xy}$ and $C_{yx}$ are given in a following equation (4):

$$s_i = A^T(x_i - m_x) = A^T \tilde{x}_i \quad \left(\text{where } m_x = 1/n \sum_{i=1}^{n} x_i\right) \quad (1)$$

$$t_i = B^T(y_i - m_y) = B^T \tilde{y}_i \quad \left(\text{where } m_y = 1/n \sum_{i=1}^{n} y_i\right) \quad (2)$$

$$\left. \begin{array}{l} C_{xy} C_{yy}^{-1} C_{yx} A = C_{xx} A \Lambda^2 \quad (A^T C_{xx} A = I) \\ C_{yx} C_{xx}^{-1} C_{xy} B = C_{yy} B \Lambda^2 \quad (B^T C_{yy} B = I) \end{array} \right\} \quad (3)$$

$$\left. \begin{array}{l} C_{xx} = \frac{1}{n}\sum_{i=1}^{n} \tilde{x}_i \tilde{x}_i^T, \quad C_{yy} = \frac{1}{n}\sum_{i=1}^{n} \tilde{y}_i \tilde{y}_i^T \\ C_{xy} = \frac{1}{n}\sum_{i=1}^{n} \tilde{x}_i \tilde{y}_i^T, \quad C_{yx} = \frac{1}{n}\sum_{i=1}^{n} \tilde{y}_i \tilde{x}_i^T \end{array} \right\}. \quad (4)$$

4. A correspondence learning apparatus according to claim 1, wherein a first variate represents a variate obtained by projecting the first feature on a canonical space, a first transformation represents a transformation to obtain the first variate from the first feature, a second variate represents a variate obtained by projecting the second feature on the canonical space, a second transformation represents a transformation to obtain the second variate from the second feature,
    wherein the canonical correlation analysis module obtains the first and second transformations that maximize a correlation between first variates and second variates by the canonical correlation analysis and a center of a normal distribution defined by one combination of the first and second feature in the canonical space, and
    wherein the analysis result storage stores the obtained first and second transformation, and the center of the normal distribution obtained for each of the combinations of the first and second features.

5. A correspondence learning apparatus according to claim 4, wherein $x_i$ represents the first feature, $y_i$ represents the second feature, $s_i$ represents the first variate, $t_i$ represents the second variate, and $z_i$ represents the center of the normal distribution,
    wherein the canonical correlation analysis module assumes that the first transformation satisfies a following equation (1) and the second transformation satisfies a following equation (2) and solves an eigenvalue problem of a following equation (3) to obtain a projection matrix A in the equation (1) as the first transformation and to obtain a projection matrix B in the equation (2) as the second transformation, and
    wherein the canonical correlation analysis module obtains the center $z_i$ of the normal distribution for each combination of the first and second feature $x_i$ and $y_i$ in accordance with a following equation (101), where $\Lambda^2$ in the equation (3) represents a diagonal matrix having diagonal elements equal to eigenvalues, I represents a unit matrix, covariance matrices $C_{xx}$, $C_{yy}$, $C_{xy}$ and $C_{yx}$ are given in a following equation (4), and $M_x$ and $M_y$ are arbitrary matrices that satisfy $M_x M_y^T = \Lambda$ and have a spectrum norm of less than value "1":

$$s_i = A^T(x_i - m_x) = A^T \tilde{x}_i \quad \left(\text{where } m_x = 1/n \sum_{i=1}^{n} x_i\right) \quad (1)$$

$$t_i = B^T(y_i - m_y) = B^T \tilde{y}_i \quad \left(\text{where } m_y = 1/n \sum_{i=1}^{n} y_i\right) \quad (2)$$

$$\left.\begin{array}{l} C_{xy} C_{yy}^{-1} C_{yx} A = C_{xx} A \Lambda^2 \quad (A^T C_{xx} A = I) \\ C_{yx} C_{xx}^{-1} C_{xy} B = C_{yy} B \Lambda^2 \quad (B^T C_{yy} B = I) \end{array}\right\} \quad (3)$$

$$\left.\begin{array}{l} C_{xx} = \dfrac{1}{n} \sum_{i=1}^{n} \tilde{x}_i \tilde{x}_i^T, \quad C_{yy} = \dfrac{1}{n} \sum_{i=1}^{n} \tilde{y}_i \tilde{y}_i^T \\ C_{xy} = \dfrac{1}{n} \sum_{i=1}^{n} \tilde{x}_i \tilde{y}_i^T, \quad C_{yx} = \dfrac{1}{n} \sum_{i=1}^{n} \tilde{y}_i \tilde{x}_i^T \end{array}\right\} \quad (4)$$

$$z_i = \begin{pmatrix} M_x \\ M_y \end{pmatrix}^T \begin{pmatrix} (I - \Lambda^2)^{-1} & -(I - \Lambda^2)^{-1} \Lambda \\ -(I - \Lambda^2)^{-1} \Lambda & (I - \Lambda^2)^{-1} \end{pmatrix} \begin{pmatrix} s_i \\ t_i \end{pmatrix}. \quad (101)$$

6. A correspondence learning apparatus according to claim 1, wherein the information deriving module includes a probability density distribution setting module that sets a probability density distribution indicating a probability of occurrence of the arbitrary first feature from the latent variable for each of the latent variables, and a symbol occurrence probability calculating module that calculates a symbol occurrence probability being a probability of occurrence of the symbol from the latent variable for each of symbols different from each other among all of the second data, and wherein the information storage stores the probability density distribution and the symbol occurrence probability as the information for each of the latent variables.

7. A correspondence learning apparatus according to claim 6, wherein the probability density distribution setting module sets a normal distribution around the latent variable.

8. A correspondence learning apparatus according to claim 7, wherein x represents the arbitrary first feature and $s_i$ represents the latent variable, and wherein the probability density distribution setting module sets a probability density distribution $P(x|s_i)$ indicating a probability of occurrence of the arbitrary first feature x from the latent variable $s_i$ in accordance with a following equation (5), where, in the equation (5), p represents an order of the first feature, and $W_x = C_{xx} A$, and $\xi_x = C_{xx} - W_x W_x^T$:

$$P(x | s_i) = \dfrac{1}{\left(\sqrt{2\pi}\right)^p \sqrt{|\xi_x|}} \exp\left(-\dfrac{1}{2}(x - W_x s_i - \bar{x})^T \xi_x^{-1} (x - W_x s_i - \bar{x})\right). \quad (5)$$

9. A correspondence learning apparatus according to claim 7, wherein x represents the arbitrary first feature, $s_i$ represents the latent variable, and s represents a variate obtained by projecting the arbitrary first feature on the canonical space, and where the probability density distribution setting module sets a probability density distribution $P(x|s_i)$ indicating a probability of occurrence of the arbitrary first feature from the latent variable $s_i$ in accordance with a following equation (6), where, in the equation (6), m represents an order of the canonical space (order of s and $s_i$) and $\Sigma$ represents a variance:

$$P(x | s_i) = \dfrac{1}{\left(\sqrt{2\pi}\right)^m \sqrt{|\Sigma|}} \exp\left(-\dfrac{1}{2}(s - s_i)^T \Sigma^{-1} (s - s_i)\right). \quad (6)$$

10. A correspondence learning apparatus according to claim 4, wherein x represents an arbitrary first feature, y represents an arbitrary second feature, $z_i$ represents the latent variable, and $\Phi_{xy}$ represents a variance of the normal distribution defined by one combination of the first and second feature in the canonical space, wherein the information deriving module includes a probability density distribution setting module that obtains the variance $\Phi_{xy}$ in accordance with a following equation (102) and sets a probability density distribution $P(x|z_i)$ indicating a probability of occurrence of the arbitrary first feature x from the latent variable $z_i$ for each latent variable $z_i$, and a symbol occurrence probability calculating module that calculates a symbol occurrence probability being a probability of occurrence of the symbol from the latent variable $z_i$ for each of symbols different from each other among all of the second data in accordance with a following equation (103), and wherein the information storage stores the probability density distribution $P(x|z_i)$ and the symbol occurrence probability as the information for each latent variable $z_i$, where, in the equation (103), K represents a normalization constant to normalize a sum of the probabilities, $\Phi x$ represents a variance of a normal distribution defined by the arbitrary first feature x in the canonical space and is given in a following equation (104), zc represents a center of the normal distribution and is given in a following equation (104):

$$\Phi_{xy} = I - \begin{pmatrix} M_x \\ M_y \end{pmatrix}^T \begin{pmatrix} (I - \Lambda^2)^{-1} & -(I - \Lambda^2)^{-1} \Lambda \\ -(I - \Lambda^2)^{-1} \Lambda & (I - \Lambda^2)^{-1} \end{pmatrix} \begin{pmatrix} M_x \\ M_y \end{pmatrix} \quad (102)$$

$$P(x | z_i) = K \cdot \exp\left(-\dfrac{1}{8}(zc - z_i)^T \left(\dfrac{\Phi_x + \Phi_{xy}}{2}\right)^{-1} (zc - z_i)\right) \quad (103)$$

$$\left.\begin{array}{l} \Phi_x = I - M_x M_x^T \\ zc = M_x^T A^T (x - m_x) \end{array}\right\} \quad (104)$$

11. A correspondence learning apparatus according to claim 10, wherein w represents the second feature of the second data indicating a single symbol, and $sz_i$ represents the latent variable $s_i$ or $z_i$, and wherein the symbol occurrence probability calculating module calculates a probability $P(w|sz_i)$ of occurrence of the second feature w from the latent variable $sz_i$ for each of symbols different from each other among all of the second data in accordance with a following equation (7) as the symbol occurrence probability, where, in the equation (7), n represent a total number of the symbols occurring in the second data, $n_w$ represents an occurrence number of the symbols corresponding to the second features in all of the second data, $n_{szi}$ represents a total number of the symbols included in the second features corresponding to the latent variables $sz_i$, $\delta_{w,szi}$ represents a variable set to value "1" when the symbol corresponding to the second feature w is included in the second feature corresponding to the latent variable $sz_i$ and set to value "0" when the symbol corresponding to the second feature w is not included in the second feature corresponding to the latent variable $sz_i$, μ represents a real number selected from value "0" to value "1":

$$P(w \mid sz_i) = \mu \frac{\delta_{w,sz_i}}{n_{sz_i}} + (1-\mu)\frac{n_w}{n}. \quad (7)$$

12. A correspondence learning apparatus according to claim 10, wherein $y_i$ represents the second feature, w represents the second feature of the second data indicating a single symbol, $t_i$ represents the second variate obtained by projecting the second feature $y_i$ on the canonical space, and $sz_i$ represents the latent variable $s_i$ or $z_i$, and
    wherein the symbol occurrence probability calculating module calculates a probability $P(w|sz_i)$ of a following equation (8) as the symbol occurrence probability for each of symbols different from each other among all of the second data, where, in the equation (8), q represents an order of the second feature w, $W_y = C_{yy}B$, and $\xi_y C_{yy} - W_y W_y^T$:

$$P(w \mid sz_i) = \frac{1}{(\sqrt{2\pi})^q \sqrt{|\xi_y|}} \exp\left(-\frac{1}{2}(w - W_y t_i - \bar{y})^T \xi_y^{-1}(w - W_y t_i - \bar{y})\right). \quad (8)$$

13. A correspondence learning apparatus according to claim 1, further comprising:
    an information update module that updates at least the transformation to derive the latent variables when a combination of a new first feature and a new second feature corresponding to the new first feature occurs, the information update module updating the transformation based on the new first and second features.

14. A correspondence learning apparatus according to claim 13, wherein a first uncorrelated component represents a component obtained by an uncorrelation of an arbitrary first feature through a principal component analysis and a second uncorrelated component represents a component obtained by an uncorrelation of an arbitrary second feature through the principal component analysis,
    wherein the information update module includes: a first uncorrelated component obtaining module that performs a obtainment process of a new first uncorrelated component being the first uncorrelated component for the new first feature; a second uncorrelated component obtaining module that performs a obtainment process of a new second uncorrelated component being the second uncorrelated component for the new second feature; a singular value decomposition module that performs a singular value decomposition process for covariance matrices for the first and second uncorrelated components based on the obtained the new first and second uncorrelated components; and a transformation update module that updates the transformation to derive the latent variables based on a result of the obtainment processes by the first and second uncorrelated component obtaining modules and a result of the singular value decomposition process by the singular value decomposition module,
    wherein the analysis result storage stores the updated transformation and the latent variables obtained using the updated transformation for each of the combinations of the first and second features, and
    wherein the information deriving module updates the information for each of the obtained latent variables.

15. A correspondence learning apparatus according to claim 14, wherein it is assumed that a $n^{th}$ combination of a new first feature x(n) and a new second feature y(n) occurs in the presence of n−1 combinations of the first features x(1), ..., x(i), ..., x(n−1) and the second feature y(1), ..., y(i), ..., y(n−1), wherein p represents an order of the first feature x(i), q represents an order of the second feature y(i), r represents a smaller one of p and q, l represents a decay rate, u(n) represents the new first uncorrelated component, and v(n) represents the new second uncorrelated component,
    wherein the first uncorrelated component obtaining module obtains a matrix $E_x(n)$ and a diagonal matrix $\Lambda_x(n)$ that are solutions of an eigenvalue problem of $C_{xx}E_x = E_x \Lambda_x$ for n first features x(i) including the new first feature x(n) and the new first uncorrelated component u(n) respectively given in a following equation (9), where, in the equation (9), j=1, ..., p, $x_1^\sim(n) = x(n) - m_x(n)$, and $m_x(n)$ represents a mean value of n first features x(i),
    wherein the second uncorrelated component obtaining module obtains a matrix $E_y(n)$ and a diagonal matrix $\Lambda_y(n)$ that are solutions of an eigenvalue problem of $C_{yy}E_y = E_y \Lambda_y$ for n second features y(i) including the new second feature y(n) and the new second uncorrelated component v(n) respectively given in a following equation (10), where, in the equation (10), j=1, ..., q, $y_1^\sim(n) = y(n) - m_y(n)$, and $m_y(n)$ represents a mean value of n second features y(i),
    wherein the singular value decomposition module obtains matrices $E_u(n)$ and $E_v(n)$ given in a following equation (11) based on the obtained new first uncorrelated component u(n) and the obtained new second uncorrelated component v(n), where, in the equation (11), j=1, ..., r, $Z_{uj}(n)$ represents a $j^{th}$ canonical correlation coefficient vector for the first uncorrelated component based on the n combination of the first and second uncorrelated components, and $Z_{vj}(n)$ represents a $j^{th}$ canonical correlation coefficient vector for the second uncorrelated component based on the n combination of the first and second uncorrelated components, and
    wherein the transformation update module obtains a first transformation A(n) to project the first feature x(i) on the canonical space and a second transformation B(n) to project the second feature y(i) on the canonical space as new transformations based on the matrices $E_x(n), E_y(n)$ and the diagonal matrices $\Lambda_x(n), \Lambda_y(n)$ obtained by the first and second uncorrelated component obtaining modules and the matrices $E_u(n), E_v(n)$ obtained by the singular value decomposition module in accordance with a following equation (12):

$$\left. \begin{aligned} E_x(n) &= (e_{x1}(n), \ldots, e_{xj}(n), \ldots, e_{xp}(n)) \\ \Lambda_x(n) &= \mathrm{diag}(\lambda_{x1}(n), \ldots, \lambda_{xj}(n), \ldots, \lambda_{xp}(n)) \\ u(n) &= \Lambda_x^{-1/2}(n) E_x^T(n) \tilde{x}_1(n) \end{aligned} \right\} \quad (9)$$

$$\left. \begin{aligned} E_y(n) &= (e_{y1}(n), \ldots, e_{yj}(n), \ldots, e_{yq}(n)) \\ \Lambda_y(n) &= \mathrm{diag}(\lambda_{y1}(n), \ldots, \lambda_{yj}(n), \ldots, \lambda_{yq}(n)) \\ v(n) &= \Lambda_y^{-1/2}(n) E_y^T(n) \tilde{y}_1(n) \end{aligned} \right\} \quad (10)$$

-continued $$E_u(n) = (e_{u1}(n), \ldots, e_{uj}(n), \ldots, e_{ur}(n))$$
$$E_v(n) = (e_{v1}(n), \ldots, e_{vj}(n), \ldots, e_{vr}(n))$$
$$e_{uj}(n) = \frac{z_{uj}(n)}{\|z_{uj}(n)\|}$$
$$e_{vj}(i) = \frac{z_{vj}(n)}{\|z_{vy}(n)\|}$$
(11)

$$A(n) = E_x(n)\Lambda_x^{-1/2}(n)E_u(n)$$
$$B(n) = E_y(n)\Lambda_y^{-1/2}(n)E_v(n)$$
(12)

16. A correspondence learning apparatus according to claim 5, further comprising:
a information update module that updates the covariance matrices $C_{xx}$, $C_{yy}$, $C_{xy}$ and $C_{yx}$ in accordance with a following equation (105) and solves the eigenvalue problem of the equation (3) to obtain the transformation to derive the latent variables when a $n^{th}$ combination of a new first feature $x(n)$ and a new second feature $y(n)$ occurs in the presence of n−1 combinations of the first features $x(1), \ldots, x(i), \ldots, x(n-1)$ and the second feature $y(1), \ldots, y(i), \ldots, y(n-1)$, where n>=2, l represents a decay rate, $\tilde{x}(n)$ and $\tilde{y}(n)$ are given in a following equation (106), $m_x(n)$ and $m_y(n)$ are given in a following equation (107):

$$C_{xx}(n) = \frac{n-1-l}{n}C_{xx}(n-1) + \frac{1+l}{n}\tilde{x}(n)\tilde{x}^T(n)$$
$$C_{yy}(n) = \frac{n-1-l}{n}C_{yy}(n-1) + \frac{1+l}{n}\tilde{y}(n)\tilde{y}^T(n)$$
$$C_{xy}(n) = \frac{n-1-l}{n}C_{xy}(n-1) + \frac{1+l}{n}\tilde{x}(n)\tilde{y}^T(n)$$
$$C_{yx}(n) = C_{xy}^T(n)$$
(105)

$$\tilde{x}(n) = x(n) - m_x(n)$$
$$\tilde{y}(n) = y(n) - m_y(n)$$
(106)

$$m_x(n) = \frac{n-1-l}{n}m_x(n-1) + \frac{1+l}{n}x(n)$$
$$m_y(n) = \frac{n-1-l}{n}m_y(n-1) + \frac{1+l}{n}y(n)$$
(107)

17. A correspondence learning apparatus according to claim 16, wherein the information update module updates the covariance matrices associated with the second feature in accordance with a following equation (108) when the order of the second feature increases with an occurrence of the new first feature $x(n)$ and the new second feature $y(n)$, where $m_y(n)$ is given in a following equation (109):

$$C_{yy}(n) = \frac{n-1-l}{n}\begin{pmatrix} C_{yy}(n-1) & 0 \\ 0 & 0 \end{pmatrix} + \frac{1+l}{n}\tilde{y}(n)\tilde{y}^T(n)$$
$$C_{xy}(n) = \frac{n-1-l}{n}(C_{xy}(n-1)\ 0) + \frac{1+l}{n}\tilde{x}(n)\tilde{y}^T(n)$$
(108)

$$m_y(n) = \frac{n-1-l}{n}\begin{pmatrix} m_y(n-1) \\ 0 \end{pmatrix} + \frac{1+l}{n}y(n).$$
(109)

18. A correspondence learning apparatus according to claim 1, wherein the first feature indicates a higher-order local auto-correlation feature of the first data.

19. A correspondence learning apparatus according to claim 1, wherein the first data is image data, and wherein the first feature is generated based on a luminance gradient direction of each pixel of the image data.

20. A correspondence learning apparatus according to claim 1, wherein the second features are generated by assigning a predetermined value other than value "0" to an arrangement of the symbols that are different from each other and are extracted from all of the second data when a target second data includes a target symbol, and setting value "0" to the arrangement of the symbols when the target second data does not includes a target symbol.

21. A correspondence learning apparatus according to claim 1, wherein the first data is image data, and wherein the second data includes at least one word indicating an object in an image of the image data as the symbol.

22. A correspondence learning apparatus according to claim 1, further comprising:
a clustering module that classifies a plurality of latent variables obtained for each of the combinations of the first and second features into a plurality of clusters and obtains a representative latent variable of each of the plurality of clusters,
wherein the information storage stores the representative latent variables and information on an imputed cluster of the latent variable.

23. A correspondence learning method for learning a correspondence between real-world information and symbols corresponding to the real-world information, the method comprising the steps of:
(a) performing a canonical correlation analysis based on a plurality of combinations of first and second features so as to obtain a transformation to derive latent variables based on at least one of the first and second features, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;
(b) obtaining the latent variables for each of the combinations of the first and second features using the transformation obtained at Step (a); and
(c) deriving information required to obtain a probability of occurrence of an arbitrary first feature from the latent variable and a probability of occurrence of an arbitrary second feature from the latent variable for each of the latent variables.

24. A correspondence learning program that causes a computer to function as an apparatus that learns a correspondence between real-world information and symbols corresponding to the real-world information, the program comprising:
a transformation obtaining module that performs a canonical correlation analysis based on a plurality of combinations of first and second features so as to obtain a transformation to derive latent variables based on at least one of the first and second features, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;

a latent variable obtaining module that obtains the latent variables for each of the combinations of the first and second features using the obtained transformation; and an information deriving module that derives information required to obtain a probability of occurrence of an arbitrary first feature from the latent variable and a probability of occurrence of an arbitrary second feature from the latent variable for each of the latent variables.

25. An annotation apparatus that assigns a symbol as metadata to real-world information, the apparatus comprising:

a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;

an input reception module that receives an input of a new first data;

a first feature extracting module that extracts a new first feature indicating a feature of the new first data based on the received new first data;

a probability calculating module that calculates a probability of occurrence of the second feature of the second data indicating a single symbol from the extracted new first feature based on the learning information stored in the learning information storage; and a symbol assignment module that assigns the symbol to the new first data based on the probability calculated by the probability calculating module.

26. An annotation apparatus according to claim 25, wherein the latent variable is a first or second variate obtained by projecting the first or second feature on the canonical space, wherein $s_i$ represents the latent variable, $x_{new}$ represents the extracted new first feature, w represents the second feature of the second data indicating a single symbol, and $P(w|x_{new})$ represents a probability of occurrence of the second feature w from the new first feature $x_{new}$, and wherein the probability calculating module calculates a probability $P(w|x_{new})$ in accordance with a following equation (13), where, in the equation (13), $P(x_{new}|s_i)$ represents a probability of occurrence of the new first feature $x_{new}$ from the latent variable $s_i$, and $P(w|s_i)$ represents a probability of occurrence of the second feature w from the latent variable $s_i$:

$$P(w \mid x_{new}) = \sum_{i=1}^{n} P(x_{new} \mid s_i) P(w \mid s_i). \tag{13}$$

27. An annotation apparatus according to claim 25, wherein the latent variable is a center of a normal distribution defined by one combination of the first and second feature in the canonical space, wherein $z_i$ represents the latent variable, $x_{new}$ represents the extracted new first feature, w represents the second feature of the second data indicating a single symbol, and $P(w|x_{new})$ represents a probability of occurrence of the second feature w from the new first feature $x_{new}$, and wherein the probability calculating module calculates a probability $P(w|x_{new})$ in accordance with a following equation (110), where, in the equation (110), $P(x_{new}|z_i)$ represents a probability of occurrence of the new first feature $x_{new}$ from the latent variable $z_i$, and $P(w|z_i)$ represents a probability of occurrence of the second feature w from the latent variable $z_i$:

$$P(w \mid x_{new}) = \sum_{i=1}^{n} P(x_{new} \mid z_i) P(w \mid z_i). \tag{110}$$

28. An annotation apparatus according to claim 25, wherein a plurality of latent variables obtained for each of the combinations of the first and second features are classified into a plurality of clusters and a representative latent variable is obtained for each of the plurality of clusters, wherein the learning information storage stores the representative latent variables and information on an imputed cluster of the latent variable, and wherein the probability calculating module calculates the probability of occurrence of the second feature of the second data indicating a single symbol from the new first feature based on the latent variables belonging to the cluster in which a probability of occurrence of the new first feature from the representative latent variable is equal to or more than a predetermined threshold value.

29. An annotation apparatus according to claim 25, wherein the symbol assignment module extracts the symbol indicated by the second feature of the second data indicating the single symbol in decreasing order of the probability in accordance with a predetermined criterion and generates a new second feature corresponding to the new first feature based on the extracted symbol.

30. An annotation apparatus according to claim 25, further comprising:

an information update module that updates the learning information based on the new first and second features.

31. An annotation method for assigning a symbol as metadata to real-world information, the method comprising the steps of:

(a) storing learning information in a storage, the learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;

(b) calculating a probability of occurrence of the second feature of the second data indicating a single symbol from a new first feature extracted as a feature of a new first data based on the learning information; and (c) assigning the symbol to the new first data based on the probability calculated at Step (b).

32. An annotation program that causes a computer to function as an apparatus that assigns a symbol as metadata to real-world information, the computer including a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information, the program comprising:

a probability calculating module that calculates a probability of occurrence of the second feature of the second data indicating a single symbol from a new first feature extracted as a feature of a new first data based on the learning information; and a symbol assignment module that assigns the symbol to the new first data based on the calculated probability.

33. A retrieval apparatus capable of retrieving real-world information to which a symbol as metadata is not assigned based on the symbol, the apparatus comprising:

a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;

a non-annotated first data storage that stores at least one non-annotated first data being the first data that has no correspondence with the second data;

a non-annotated first feature storage that stores a non-annotated first feature extracted from the non-annotated first data as a feature of the non-annotated first data;

an input reception module that receives at least one symbol as a retrieval query;

a retrieval second feature setting module that sets a retrieval second feature to the second feature of the second data indicating the received at least one symbol based on the at least one symbol;

a probability calculating module that calculates a probability of occurrence of the set retrieval second feature from the non-annotated first feature based on the learning information stored in the learning information storage; and a data retrieving module that retrieves the non-annotated first data based on the calculated probability from the non-annotated first data storage.

34. A retrieval apparatus according to claim 33, wherein the latent variable is a first or second variate obtained by projecting the first or second feature on the canonical space, wherein $s_i$ represents the latent variable, $y_{new}$ represents the retrieval second feature, $x_j$ represents the non-annotated first feature (where j=1, . . . , N, N represents total numbers of the non-annotated first features), and $P(y_{new}|x_j)$ represents a probability of occurrence of the retrieval second feature $y_{new}$ from the non-annotated first feature $x_j$, and wherein the probability calculating module calculates a probability $P(y_{new}|x_j)$ in accordance with a following equation (14), where, in the equation (14), $P(x_j|s_i)$ represents a probability of occurrence of the non-annotated first feature $x_j$ from the latent variable $s_i$, and $P(y_{new}|s_i)$ represents a probability of occurrence of the retrieval second feature $y_{new}$ from the latent variable $s_i$:

$$P(y_{new}|x_j) = \frac{\sum_{i=1}^{n} P(x_j|s_i)P(y_{new}|s_i)}{\sum_{i=1}^{n} P(x_j|s_i)}. \tag{14}$$

35. An retrieval apparatus according to claim 33, wherein the latent variable is a center of a normal distribution defined by one combination of the first and second feature in the canonical space, wherein $z_i$ represents the latent variable, $y_{new}$ represents the retrieval second feature, $x_j$ represents the non-annotated first feature (where j=1, . . . , N, N represents total numbers of the non-annotated first features), and $P(y_{new}|x_j)$ represents a probability of occurrence of the retrieval second feature $y_{new}$ from the non-annotated first feature $x_j$, and wherein the probability calculating module calculates a probability $P(y_{new}|x_j)$ in accordance with a following equation (111), where, in the equation (111), $P(x_j|z_i)$ represents a probability of occurrence of the non-annotated first feature $x_j$ from the latent variable $z_i$, and $P(y_{new}|z_i)$ represents a probability of occurrence of the retrieval second feature $y_{new}$ from the latent variable $z_i$:

$$P(y_{new}|x_j) = \frac{\sum_{i=1}^{n} P(x_j|z_i)P(y_{new}|z_i)}{\sum_{i=1}^{n} P(x_j|z_i)}. \tag{111}$$

36. An retrieval apparatus according to claim 33, wherein a plurality of latent variables obtained for each of the combinations of the first and second features are classified into a plurality of clusters and a representative latent variable is obtained for each of the plurality of clusters,
   wherein the learning information storage stores the representative latent variables and information on an imputed cluster of the latent variable, and
   wherein the probability calculating module calculates the probability of occurrence of the set retrieval second feature from the non-annotated first feature based on the latent variables belonging to the cluster in which a probability of occurrence of the non-annotated first feature from the representative latent variable is equal to or more than a predetermined threshold value.

37. A retrieval method capable of retrieving real-world information to which a symbol as metadata is not assigned based on the symbol, the method comprising the steps of:
   (a) storing learning information in a storage, the learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information;
   (b) setting a retrieval second feature to the second feature of the second data indicating at least one designated symbol based on the at least one symbol;
   (c) calculating a probability of occurrence of the set retrieval second feature from a non-annotated first feature based on the learning information, the non-annotated first feature extracted from a non-annotated first data as a feature of the non-annotated first data that has no correspondence with the second data; and
   (d) retrieving the non-annotated first data based on the probability calculated at Step (c) from the storage.

38. A retrieval program that causes a computer to function as an apparatus capable of retrieving real-world information to which a symbol as metadata is not assigned based on the symbol, the computer including a learning information storage that stores learning information including a transformation obtained by a canonical correlation analysis based on a plurality of combinations of first and second features to derive latent variables based on at least one of the first and second features, latent variables obtained for each of the combinations of the first and second features using the transformation, and information required to obtain a probability of occurrence of an arbitrary first feature from the latent variable and a probability of occurrence of an arbitrary second feature from the latent variable for each of the latent variables, the first features respectively extracted from first data as a feature of the first data that indicates the real-world information, the second features respectively extracted from second data as a feature of the second data that corresponds to the first data, the latent variables respectively indicating an abstract concept that connects the real-world information with the symbol corresponding to the real-world information, the program comprising:
   a retrieving second feature setting module that sets a retrieval second feature to the second feature of the second data indicating at least one designated symbol based on the at least one symbol;
   a probability calculating module that calculates a probability of occurrence of the set retrieval second feature from a non-annotated first feature based on the learning information, the non-annotated first feature extracted from a non-annotated first data as a feature of the non-annotated first data that has no correspondence with the second data; and
   a data retrieving module that retrieves the non-annotated first data based on the calculated probability.

* * * * *